US00RE47820E

(19) United States
(12) Reissued Patent
Schneider et al.

(10) Patent Number: US RE47,820 E
(45) Date of Reissued Patent: Jan. 14, 2020

(54) APPARATUS AND METHOD FOR PROVIDING A LOUDSPEAKER-ENCLOSURE-MICROPHONE SYSTEM DESCRIPTION

(71) Applicant: FRAUNHOFER-GESELLSCHAFT ZUR FOERDERUNG DER ANGEWANDTEN FORSCHUNG E.V., Munich (DE)

(72) Inventors: Martin Schneider, Erlangen (DE); Walter Kellermann, Eckental (DE)

(73) Assignee: FRAUNHOFER-GESELLSCHAFT ZUR FOERDERUNG DER ANGEWANDTEN FORSCHUNG E.V., Munich (DE)

(21) Appl. No.: 15/962,792

(22) Filed: Apr. 25, 2018

Related U.S. Patent Documents

Reissue of:

(64) Patent No.: 9,326,055
Issued: Apr. 26, 2016
Appl. No.: 14/600,768
Filed: Jan. 20, 2015

U.S. Applications:

(63) Continuation of application No. PCT/EP2012/064827, filed on Jul. 27, 2012.

(51) Int. Cl.
*H04R 1/20* (2006.01)
*H04R 1/02* (2006.01)
(Continued)

(52) U.S. Cl.
CPC ..... *H04R 1/02* (2013.01); *H04R 1/08* (2013.01); *H04S 7/301* (2013.01);
(Continued)

(58) Field of Classification Search
CPC .. H04R 1/02; H04R 1/08; H04S 7/301; H04S 2420/11; H04S 2400/09; H04S 2420/13
See application file for complete search history.

(56) References Cited

U.S. PATENT DOCUMENTS 6,925,176 B2 * 8/2005 Myllyla ..... H04M 9/082 379/406.05
6,959,096 B2 * 10/2005 Boone ..... H04S 3/00 381/152
(Continued)

OTHER PUBLICATIONS

Bethlehem et al. Theory and design of sound field reproduction in reverberant rooms. The Journal of the Acoustical Society of America 117, pp. 2100-2111 (2005).*
(Continued)

*Primary Examiner* — Colin M Larose
(74) *Attorney, Agent, or Firm* — Squire Patton Boggs (US) LLP

(57) ABSTRACT

An apparatus for providing a current loudspeaker-enclosure-microphone system description of a loudspeaker-enclosure-microphone system is provided. The apparatus has a first transformation unit for generating a plurality of wave-domain loudspeaker audio signals. Moreover, the apparatus has a second transformation unit for generating a plurality of wave-domain microphone audio signals. Furthermore, the apparatus has a system description generator for generating the current loudspeaker-enclosure-microphone system description based on the plurality of wave-domain loudspeaker audio signals, based on the plurality of wave-domain microphone audio signals, and based on a plurality of coupling values, wherein the system description generator is configured to determine each coupling value assigned to a wave-domain pair of a plurality of wave-domain pairs by determining a relation indicator indicating a relation between a loudspeaker-signal-transformation value and a microphone-signal-transformation value.

20 Claims, 16 Drawing Sheets

(51) Int. Cl.
*H04R 1/08* (2006.01)
*H04S 7/00* (2006.01)

(52) U.S. Cl.
CPC ..... *H04S 2400/09* (2013.01); *H04S 2420/11* (2013.01); *H04S 2420/13* (2013.01)

(56) References Cited

U.S. PATENT DOCUMENTS

| | | | | |
|---|---|---|---|---|
| 6,961,422 | B2 * | 11/2005 | Boland | H04M 9/082 379/406.05 |
| 7,336,793 | B2 * | 2/2008 | Horbach | H04R 29/002 381/103 |
| 7,684,578 | B2 * | 3/2010 | Roeder | H04S 3/002 381/123 |
| 7,706,544 | B2 * | 4/2010 | Melchior | H04R 3/12 381/17 |
| 7,809,453 | B2 * | 10/2010 | Reichelt | H04S 3/008 381/182 |
| 8,218,774 | B2 * | 7/2012 | Buchner | H04S 5/005 381/17 |
| 8,219,409 | B2 * | 7/2012 | Vetterli | G10L 19/008 704/200 |
| 8,565,415 | B2 * | 10/2013 | Schmidt | H04M 9/082 379/390.03 |
| 2002/0006206 | A1 * | 1/2002 | Scofield | H04S 3/002 381/27 |
| 2012/0163607 | A1 * | 6/2012 | Van Dongen | G10L 19/008 381/22 |
| 2014/0294211 | A1 * | 10/2014 | Schneider | H04S 7/301 381/303 |

OTHER PUBLICATIONS

Peretti et al. A novel approach to active noise control based on wave domain adaptive filtering. IEEE Workshop on Applications of Signal Processing to Audio and Acoustics, pp. 307-310 (2007).*

Ali, Murtaza; "Stereophonic Acoustic Echo Cancellation System Using Time-Varying All-Pass Filtering for Signal Decorrelation," *Proceedings of the 1998 IEEE International Conference on Acoustics, Speech and Signal Processing*, May 12-15, 1998, Seattle, Washington; 6:3689-3692.

Benesty et al.; "A Better Understanding and an Improved Solution to the Specific Problems of Stereophonic Acoustic Echo Cancellation," *IEEE Transactions on Speech and Audio Processing*, Mar. 1998; 6(2):156-165.

Berkhout et al.; "Acoustic control by wave field synthesis," *J. Acoust. Soc. Am.* 93, May 1993; 5:2764-2778.

Breining et al.; "Acoustic Echo Control—An Application of Very High Order Adaptive Filters," *IEEE Signal Processing Magazine*, Jul. 1999; 16(4):42-69.

Buchner et al.; "A General Derivation of Wave-Domain Adaptive Filtering and Application to Acoustic Echo Cancellation," *42nd Asilomar Conference on Signals, Systems and Computers*, Oct. 26-29, 2008, Pacific Grove, California; pp. 816-823.

Buchner et al.; "Robust Extended Multidelay Filter and Double-Talk Detector for Acoustic Echo Cancellation," *IEEE Transactions on Audio, Speech, and Language Processing*, Sep. 2006; 14(5):1633-1644.

Buchner et al.; "Wave-Domain Adaptive Filtering: Acoustic Echo Cancellation for Full-Duplex Systems Based on Wave-Field Synthesis," *IEEE International Conference on Acoustics, Speech, and Signal Processings* (*ICASSP*), May 17-21, 2004, Montreal, Canada; 4:iv-117-iv-120.

Daniel, Jérôme; "Spatial Sound Encoding Including Near Field Effect: Introducing Distance Coding Filters and a Viable, New Ambisonic Format," *23rd International Conference of the Audio Eng. Soc.*, May 23-25, 2003, Copenhagen, Denmark; pp. 1-15.

Gansler et al.; "Influence of audio coding on stereophonic acoustic echo cancellation," *Proceedings of the 1998 IEEE International Conference on Acoustics Speech and Signal Processing*, May 12-15, 1998, Seattle, Washington; 6:3649-3652.

Gilloire et al.; "Using auditory properties to improve the behaviour of stereophonic acoustic echo cancellers," *Proceedings of the 1998 IEEE International Conference on Acoustics, Speech and Signal Processing*, May 12-15, 1998, Seattle, Washington; 6:3681-3684.

Goetze et al.; "Multi-Channel Listening-Room Compensation using a Decoupled Filtered-X LMS Algorithm," *42nd Asilomar Conference on Signals, Systems and Computers*, Oct. 26-29, 2008, Pacific Grove, CA; pp. 811-815.

Herre et al.; "Acoustic Echo Cancellation for Surround Sound Using Perceptually Motivated Convergence Enhancement," *IEEE International Conference on Acoustics, Speech, and Signal Processing* (*ICASSP*), Apr. 15-20, 2007, Honolulu, Hawaii; 1:I-17-I-20.

International Search Report in co-pending PCT Application No. PCT/EP2012/064827, 2 pages.

Kingsbury et al.; "Recognizing reverberant speech with RASTA-PLP," *International Conference on Acoustics, Speech, and Signal Processing—ICASSP*, 1997; 2:1259-1262.

Kirkeby et al.; "Fast Deconvolution of Multichannel Systems Using Regularization," *IEEE Transactions on Speech and Audio Processing*, Mar. 1998; 6(2):189-194.

Morgan et al.; "Investigation of Several Types of Non-linearities for Use in Stereo Acoustic Echo Cancellation," *IEEE Transactions on Speech and Audio Processing*, Sep. 2001; 9(6):686-696.

Schneider et al.; "A wave-domain model for acoustic MIMO systems with reduced complexity," *2011 Joint Workshop on Hands-free Speech Communication and Microphone Arrays* (*HSCMA*), May 30, 2011, Edinburgh, United Kingdom; pp. 133-138.

Schneider et al.; "Adaptive listening room equalization using a scalable filtering structure in the wave domain," *IEEE International Conference on Acoustics, Speech, and Signal Processing* (*ICASSP 2012*), Mar. 25-30, 2012, Kyoto, Japan; pp. 13-16.

Shimauchi et al.; "Stereo Echo Cancellation Algorithm Using Imaginary Input-Output Relationships," *IEEE International Conference on Acoustics, Speech, and Signal Processing* (*ICASSP*), May 7-10, 1996, Atlanta, Georgia; 2:941-944.

Sondhi et al.; "Silencing echoes on the telephone network," *Proceedings of the IEEE-PIEEE*, 1980; 68(8):948-963.

Sondhi et al.; "Stereophonic acoustic echo cancellation—an overview of the fundamental problem," *Signal Processing Letters, IEEE*, Aug. 1995; 2(8):148-151.

Spors et al.; "A novel approach to active listening room compensation for wave field synthesis using wave-domain adaptive filtering," *Acoustics, Speech, and Signal Processing, 2004, Proceedings* (*ICASSP '04*), *IEEE International Conference*, May 17-21, 2004, Montreal, Quebec, Canada; 4:29-32.

Spors et al.; "Active listening room compensation for massive multichannel sound reproduction systems using wave-domain adaptive filtering," *J. Acoust. Soc. Am.*, Jul. 2007; 122(1):354-369.

Spors et al.; "Efficient Massive Multichannel Active Noise Control using Wave-Domain Adaptive Filtering," *3rd International Symposium on Communications, Control and Signal Processing* (*ISCCSP*), Mar. 12-14, 2008, St. Julians; pp. 1480-1485.

* cited by examiner

Illustration (c)

W

Illustration (b)

W

Illustration (a)

W

APPARATUS AND METHOD FOR PROVIDING A LOUDSPEAKER-ENCLOSURE-MICROPHONE SYSTEM DESCRIPTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation of copending International Application No. PCT/EP2012/064827, filed Jul. 27, 2012, which is incorporated herein by reference in its entirety.

BACKGROUND OF THE INVENTION

The present invention relates to audio signal processing and, in particular, to an apparatus and method for identifying a loudspeaker-enclosure-microphone system.

Spatial audio reproduction technologies become increasingly important. Emerging spatial audio reproduction technologies, such as wave field synthesis (WFS) (see [1]) or higher-order Ambisonics (see [2]) aim at creating or reproducing acoustic wave fields that provide a perfect spatial impression of the desired acoustic scene in an extended listening area. Reproduction technologies like WFS or HOA provide a high-quality spatial impression to the listener, utilizing a large number of reproduction channels. To this end, typically, loudspeaker arrays with dozens to hundreds of elements are used. The combination of these techniques with spatial recording systems opens up new fields of applications such as immersive telepresence and natural acoustic human/machine interaction. To obtain a more immersive user experience, such reproduction systems may be complemented by a spatial recording system to approach new application fields or to improve the reproduction quality. The combination of the loudspeaker array, the enclosing room and the microphone array is referred to as loudspeaker-enclosure-microphone system and is identified in many application scenarios by observing the present loudspeaker and microphone signals. As an example, the local acoustic scene in a room is often recorded in a room where another acoustic scene is played back by a reproduction system.

However, the desired microphone signals of the local acoustic scene cannot be observed without the echo of the loudspeakers in such scenarios. In a teleconference, the resulting signals would annoy the far-end party [3], while a speech recognizer in a voice-based human/machine front end will generally exhibit poor recognition rates [4]. Acoustic echo cancellation (AEC) is commonly used to remove the unwanted loudspeaker echo from the recorded microphone signals while preserving the desired signals of the local acoustic scene without quality degradation. To this end, the loudspeaker-enclosure-microphone system (LEMS) is modeled by an adaptive filter which produces an estimate of the loudspeaker echos contained in the microphone signals which is subtracted from the actual microphone signals. This task comprises an identification of the LEMS, ideally leading to a unique solution. In the following, the term LEMS refers to a MIMO LEMS (Multiple-Input Multiple-Output LEMS).

AEC is significantly more challenging in the case of multichannel (MC) reproduction compared to the single-channel case, because the nonuniqueness problem [5] will generally occur: Due to the strong cross-correlation between the loudspeaker signals (e.g., those for the left and the right channel in a stereo setup), the identification problem is ill-conditioned and it may not be possible to uniquely identify the impulse responses of the corresponding LEMSs [6]. The system identified instead, denotes only one of infinitely many solutions defined by the correlation properties of the loudspeaker signals. Therefore the true LEMS is only incompletely identified. The nonuniqueness problem is already known from the stereophonic AEC (see, e.g. [6]) and becomes severe for massive multichannel reproduction systems like, e. g., wavefield synthesis systems.

An incompletely identified system still describes the behavior of the true LEMS for the present loudspeaker signals and may therefore be used for different adaptive filtering applications, although the identified impulse responses may differ from the true impulse responses. In the case of AEC, the obtained impulse responses describe the LEMS sufficiently well to significantly suppress the loudspeaker echo.

However, when the cross-correlation properties of the loudspeaker signals change, this is no longer true and the behavior of systems relying on adaptive filters may in fact be uncontrollable. When there is a change in the cross-correlation of the loudspeaker signals, a breakdown of the echo cancellation performance is the typical consequence. This lack of robustness constitutes a major obstacle for the application of MCAEC. Moreover, other applications, such as listen room equalization (also called listening room equalization) or active noise cancellation (also called active noise control) do also rely on a system identification and are strongly affected in a similar way.

To increase robustness under these conditions, the loudspeaker signals are often altered to achieve a decorrelation so that the true LEMS can be uniquely identified. A decorrelation of the loudspeaker signals is a common choice.

For this purpose, three options are known: Adding mutually independent noise signals to the loudspeaker signals [5,7,8] different nonlinear preprocessing [6,9] or differently time-varying filtering [10,11] for each loudspeaker signal. Although perfect solutions are unknown, a time-varying phase modulation has been shown to be applicable even to high-quality audio. [11]. While the mentioned techniques should ideally not impair the perceived sound quality, an application of these approaches for the mentioned reproduction techniques might not be an optimum choice: As the loudspeaker signals for WFS and HOA are analytically determined, time-varying filtering might significantly distort the reproduced wave field and when aiming at high-quality audio reproduction, a listener will probably not accept the addition of noise signals or non-linear preprocessing.

There might be scenarios where an alteration of the loudspeaker signals is unwanted or impractical. An example is given by WFS, where the loudspeaker signals are determined according to the underlying theory and a deviation in phase would distort the reproduced wave field. Another example is the extension of reproduction systems, where the loudspeaker signals are observable, but cannot be altered. However, in such cases it is still possible to mitigate the consequences of the nonuniqueness problem by heuristic approaches to improve the system description. Such heuristics can be based on knowledge about the transducer positions and the resulting impulse responses of the LEMS. For a stereophonic AEC in a symmetric array setup this was proposed by Shimauchi et al. [12], assuming that the symmetric array setup results in a symmetry of the impulse responses for the corresponding loudspeaker-to-microphone paths.

Allowing no alteration of the loudspeaker signals, it is still possible to improve system description when the nonuniqueness problem occurs, although this possibility has barely been investigated in the past. To this end, knowledge of the LEMS geometry can be used to derive additional constraints to choose an improved solution for the system description in a heuristic sense. One such approach was presented in [12] where the symmetry of a stereophonic array setup was exploited accordingly.

However, in [12] no solution is presented for systems with large numbers of loudspeakers and microphones, such as loudspeaker-enclosure-microphone systems.

Wave-domain adaptive filtering was proposed by Buchner et al. in 2004 for various adaptive filtering tasks in acoustic signal processing, including multichannel acoustic echo cancellation (MCAEC) [13], multichannel listening room equalization [27] and multichannel active noise control [28]. In 2008, Buchner and Spors published a formulation of the generalized frequency-domain adaptive filtering (GFDAF) algorithm [15] with application to MCAEC [14] for the use with wave-domain adaptive filtering (WDAF), however, disregarding the nonuniqueness problem [15].

SUMMARY

According to an embodiment, an apparatus for providing a current loudspeaker-enclosure-microphone system description of a loudspeaker-enclosure-microphone system, wherein the loudspeaker-enclosure-microphone system has a plurality of loudspeakers and a plurality of microphones, may have: a first transformation unit for generating a plurality of wave-domain loudspeaker audio signals, wherein the first transformation unit is configured to generate each of the wave-domain loudspeaker audio signals based on a plurality of time-domain loudspeaker audio signals and based on one or more of a plurality of loudspeaker-signal-transformation values, said one or more of the plurality of loudspeaker-signal-transformation values being assigned to said generated wave-domain loudspeaker audio signal, a second transformation unit for generating a plurality of wave-domain microphone audio signals, wherein the second transformation unit is configured to generate each of the wave-domain microphone audio signals based on a plurality of time-domain microphone audio signals and based on one or more of a plurality of microphone-signal-transformation values, said one or more of the plurality of microphone-signal-transformation values being assigned to said generated wave-domain loudspeaker audio signal, and a system description generator for generating the current loudspeaker-enclosure-microphone system description based the plurality of wave-domain loudspeaker audio signals, and based on the plurality of wave-domain microphone audio signals, wherein the system description generator is configured to generate the loudspeaker-enclosure-microphone system description based on a plurality of coupling values, wherein each of the plurality of coupling values is assigned to one of a plurality of wave-domain pairs, each of the plurality of wave-domain pairs being a pair of one of the plurality of loudspeaker-signal-transformation values and one of the plurality of microphone-signal-transformation values, and wherein the system description generator is configured to determine each coupling value assigned to a wave-domain pair of the plurality of wave-domain pairs by determining for said wave-domain pair at least one relation indicator indicating a relation between one of the one or more loudspeaker-signal-transformation values of said wave-domain pair and one of the microphone-signal-transformation values of said wave-domain pair to generate the loudspeaker-enclosure-microphone system description.

According to another embodiment, a system may have: a plurality of loudspeakers of a loudspeaker-enclosure-microphone system, a plurality of microphones of the loudspeaker-enclosure-microphone system, and an apparatus for providing a current loudspeaker-enclosure-microphone system description of a loudspeaker-enclosure-microphone system as mentioned above, wherein the plurality of loudspeakers are arranged to receive a plurality of loudspeaker input signals, wherein the above apparatus is arranged to receive the plurality of loudspeaker input signals, wherein the plurality of microphones are configured to record a plurality of microphone input signals, wherein the above apparatus is arranged to receive the plurality of microphone input signals, and wherein the above apparatus is configured to adjust a loudspeaker-enclosure-microphone system description based on the received loudspeaker input signals and based on the received microphone input signals.

According to another embodiment, a system for generating filtered loudspeaker signals for a plurality of loudspeakers of a loudspeaker-enclosure-microphone system may have: a filter unit, and an apparatus for providing a current loudspeaker-enclosure-microphone system description of a loudspeaker-enclosure-microphone system as mentioned above, wherein the above apparatus is configured to provide a current loudspeaker-enclosure-microphone system description of the loudspeaker-enclosure-microphone system to the filter unit, wherein the filter unit is configured to adjust a loudspeaker signal filter based on the current loudspeaker-enclosure-microphone system description to obtain an adjusted filter, wherein the filter unit is arranged to receive a plurality of loudspeaker input signals, and wherein the filter unit is configured to filter the plurality of loudspeaker input signals by applying the adjusted filter on the loudspeaker input signals to obtain the filtered loudspeaker signals.

According to still another embodiment, a method for providing a current loudspeaker-enclosure-microphone system description of a loudspeaker-enclosure-microphone system, wherein the loudspeaker-enclosure-microphone system has a plurality of loudspeakers and a plurality of microphones, may have the steps of: generating a plurality of wave-domain loudspeaker audio signals by generating each of the wave-domain loudspeaker audio signals based on a plurality of time-domain loudspeaker audio signals and based on one or more of a plurality of loudspeaker-signal-transformation values, said one or more of the plurality of loudspeaker-signal-transformation values being assigned to said generated wave-domain loudspeaker audio signal, generating a plurality of wave-domain microphone audio signals by generating each of the wave-domain microphone audio signals based on a plurality of time-domain microphone audio signals and based on one or more of a plurality of microphone-signal-transformation values, said one or more of the plurality of microphone-signal-transformation values being assigned to said generated wave-domain loudspeaker audio signal, and generating the current loudspeaker-enclosure-microphone system description based the plurality of wave-domain loudspeaker audio signals, and based on the plurality of wave-domain microphone audio signals, wherein the loudspeaker-enclosure-microphone system description is generated based on a plurality of coupling values, wherein each of the plurality of coupling values is assigned to one of a plurality of wave-domain pairs, each of the plurality of wave-domain pairs being a pair of one of the plurality of loudspeaker-signal-transformation values and one of the plurality of microphone-signal-transformation values, and wherein each coupling value assigned to a wave-domain pair of the plurality of wave-domain pairs is determined by determining for said wave-domain pair at least one relation indicator indicating a relation between one of the one or more loudspeaker-signal-transformation values of said wave-domain pair and one of the microphone-signal-transformation values of said wave-domain pair to generate the loudspeaker-enclosure-microphone system description.

According to another embodiment, a method for determining at least two filter configurations of a loudspeaker signal filter for at least two different loudspeaker-enclosure-microphone system states, wherein the loudspeaker signal filter is arranged to filter a plurality of loudspeaker input signals to obtain a plurality of filtered loudspeaker signals for steering a plurality of loudspeakers of a loudspeaker-enclosure-microphone system, may have the steps of: determining a first loudspeaker-enclosure-microphone system description of a loudspeaker-enclosure-microphone system according to the above method for providing a current loudspeaker-enclosure-microphone system description of a loudspeaker-enclosure-microphone system, when the loudspeaker-enclosure-microphone system has a first state, determining a first filter configuration of the loudspeaker signal filter based on the first loudspeaker-enclosure-microphone system description, storing the first filter configuration in a memory, determining a second loudspeaker-enclosure-microphone system description of the loudspeaker-enclosure-microphone system according to the above method, when the loudspeaker-enclosure-microphone system second a second state, determining a second filter configuration of the loudspeaker signal filter based on the second loudspeaker-enclosure-microphone system description, and storing the second filter configuration in the memory.

Another embodiment may have a computer program for implementing the above method for providing a current loudspeaker-enclosure-microphone system description of a loudspeaker-enclosure-microphone system or the above method for determining at least two filter configurations of a loudspeaker signal filter for at least two different loudspeaker-enclosure-microphone system states when being executed by a computer or processor.

Embodiments provide a wave-domain representation for the LEMS, where the relative weights of the true mode couplings depict a predictable structure to a certain extend. An adaptive filter is used, where the adaptation algorithm for adapting the LEMS identification is modified in a way such that the mode coupling weights of the identified LEMS show the same structure as it can be expected for the true LEMS represented in the wave-domain. A wave-domain representation is characterized by using fundamental solutions of the wave-equation as basis functions for the loudspeaker and microphone signals.

In embodiments, concepts for multichannel Acoustic Echo Cancellation (MCAEC) systems are provided, which maintain robustness in the presence of the nonuniqueness problem without altering the loudspeaker signals. To this end, wave-domain adaptive filtering (WDAF) concepts are provided which use solutions of the wave equation as basis functions for a transform domain for the adaptive filtering. Consequently, the considered signal representations can be directly interpreted in terms of an ideally reproduced wave field and an actually reproduced wave field within the loudspeaker-enclosure-microphone system (LEMS). Using the fact that the relation between these two wave fields is predictable to a certain extent, additional nonrestrictive assumptions for an improved system description in the wave domain are provided. These assumptions are used to provide a modified version of the generalized frequency-domain adaptive filtering algorithm which was previously introduced for MCAEC. Moreover, a corresponding algorithm along with the necessitated transforms and the results of an experimental evaluation are provided.

Embodiments provide concepts to mitigate the consequences of the nonuniqueness problem by using WDAF with a modified version of the GFDAF algorithm presented in [14]. The system description in the wave domain according to the provided embodiment leads to an increased robustness to the nonuniqueness problem. In embodiments, a wave-domain model is provided which reveals predictable properties of the LEMS. It can be shown that this approach significantly improves the robustness of an AEC for reproduction systems with many reproduction channels. Major benefits will also result for other applications by applying the proposed concepts. According to embodiments, predictable wave-domain properties are provided to improve the system description when the nonuniqueness problem occurs. This can significantly increase the robustness to changing correlation properties of the loudspeaker signals, while the loudspeaker signals themselves are not altered. Any technique necessitating a MIMO system description with a large number of reproduction channels can benefit from the provided embodiments. Notable examples are active noise control (ANC), AEC and listening room equalization.

BRIEF DESCRIPTION OF THE DRAWINGS

Embodiments of the present invention will be explained with reference to the drawings, in which.

DETAILED DESCRIPTION OF THE INVENTION

Figure 1A:
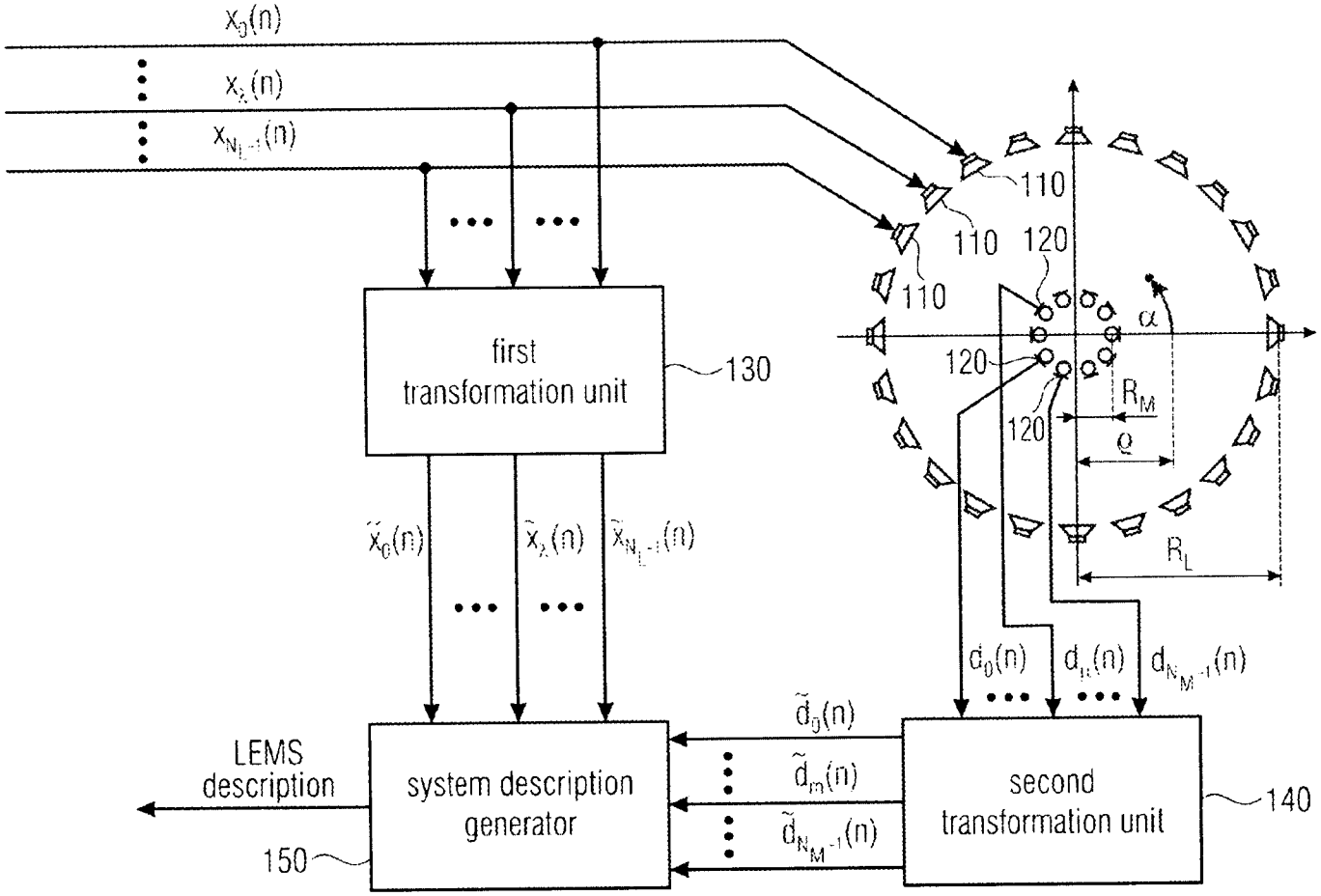
FIG. 1a illustrates an apparatus for identifying a loudspeaker-enclosure-microphone system according to an embodiment.

FIG. 1a illustrates an apparatus for providing a current loudspeaker-enclosure-microphone system description of a loudspeaker-enclosure-microphone system according to an embodiment. In particular, an apparatus for providing a current loudspeaker-enclosure-microphone system description ($\tilde{H}(n)$) of a loudspeaker-enclosure-microphone system is provided. The loudspeaker-enclosure-microphone system comprises a plurality of loudspeakers (110; 210; 610) and a plurality of microphones (120; 220; 620).

The apparatus comprises a first transformation unit (130; 330; 630) for generating a plurality of wave-domain loudspeaker audio signals ($\tilde{x}_0(n), \ldots \tilde{x}_l(n), \ldots, \tilde{x}_{N_L-1}(n)$), wherein the first transformation unit (130; 330; 630) is configured to generate each of the wave-domain loudspeaker audio signals ($\tilde{x}_0(n), \ldots \tilde{x}_l(n), \ldots, \tilde{x}_{N_L-1}(n)$) based on a plurality of time-domain loudspeaker audio signals ($x_0(n), \ldots x_\lambda(n), \ldots, x_{N_L-1}(n)$) and based on one or more of a plurality of loudspeaker-signal-transformation values (l; l'), said one or more of the plurality of loudspeaker-signal-transformation values (l; l') being assigned to said generated wave-domain loudspeaker audio signal.

Moreover, the apparatus comprises a second transformation unit (140; 340; 640) for generating a plurality of wave-domain microphone audio signals ($\tilde{d}_0(n), \ldots \tilde{d}_m(n), \ldots, \tilde{d}_{N_M-1}(n)$), wherein the second transformation unit (330) is configured to generate each of the wave-domain microphone audio signals ($\tilde{d}_0(n), \ldots \tilde{d}_m(n), \ldots, \tilde{d}_{N_M-1}(n)$) based on a plurality of time-domain microphone audio signals ($d_0(n), \ldots d_\mu(n), \ldots, d_{N_M-1}(n)$) and based on one or more of a plurality of microphone-signal-transformation values (m, m'), said one or more of the plurality of microphone-signal-transformation values (m; m') being assigned to said generated wave-domain loudspeaker audio signal.

Furthermore, the apparatus comprises a system description generator (150) for generating the current loudspeaker-enclosure-microphone system description based the plurality of wave-domain loudspeaker audio signals ($\tilde{x}_0(n), \ldots \tilde{x}_l(n), \ldots, \tilde{x}_{N_L-1}(n)$), and based on the plurality of wave-domain microphone audio signals ($\tilde{d}_0(n), \ldots \tilde{d}_m(n), \ldots, \tilde{d}_{N_M-1}(n)$)

The system description generator (150) is configured to generate the loudspeaker-enclosure-microphone system description based on a plurality of coupling values, wherein each of the plurality of coupling values is assigned to one of a plurality of wave-domain pairs, each of the plurality of wave-domain pairs being a pair of one of the plurality of loudspeaker-signal-transformation values (l; l') and one of the plurality of microphone-signal-transformation values (m; m').

Moreover, the system description generator (150) is configured to determine each coupling value assigned to a wave-domain pair of the plurality of wave-domain pairs by determining for said wave-domain pair at least one relation indicator indicating a relation between one of the one or more loudspeaker-signal-transformation values of said wave-domain pair and one of the microphone-signal-transformation values of said wave-domain pair to generate the loudspeaker-enclosure-microphone system description.

Figure 1B:
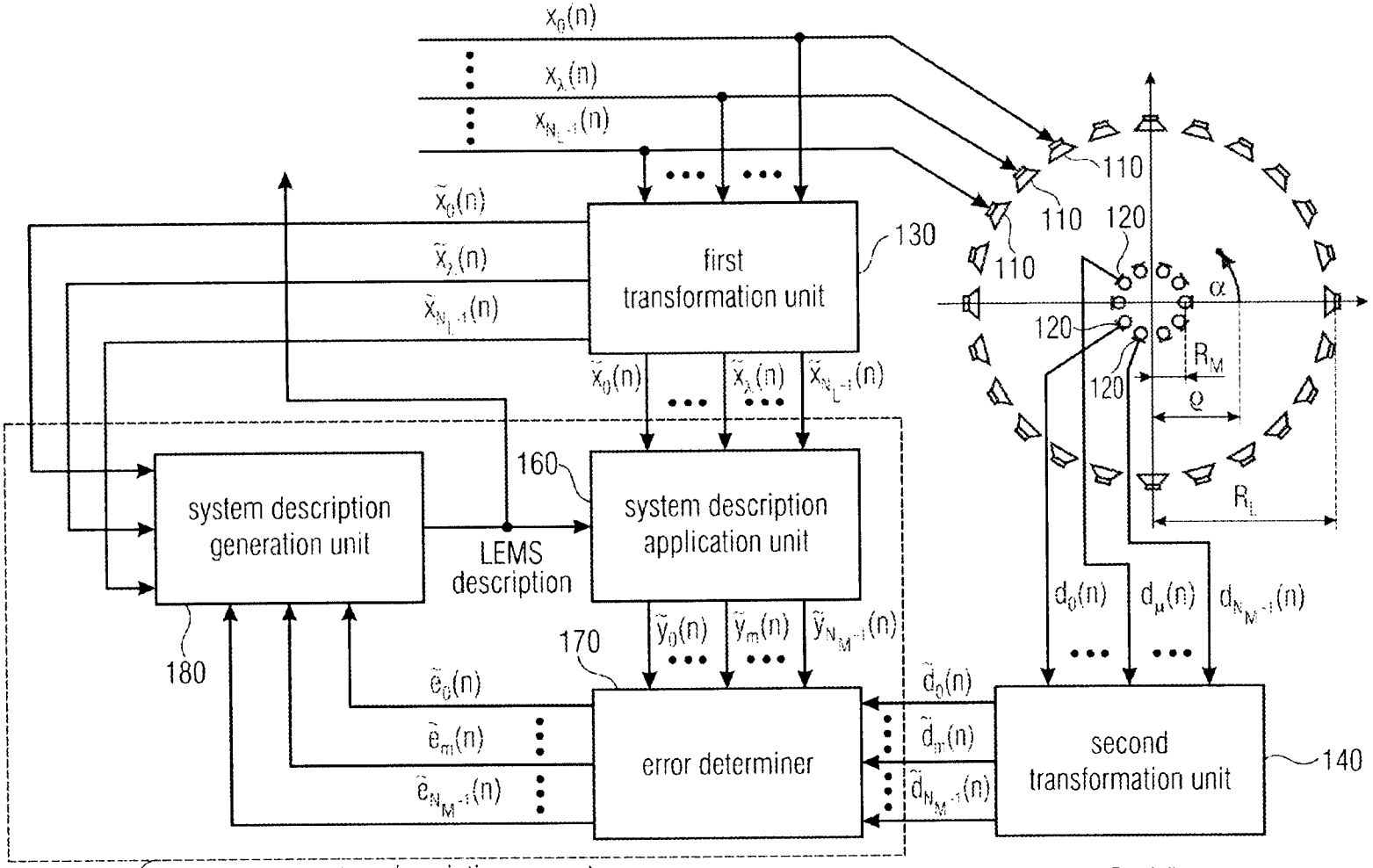
FIG. 1b illustrates an apparatus for identifying a loudspeaker-enclosure-microphone system according to another embodiment.

FIG. 1b illustrates an apparatus for providing a current loudspeaker-enclosure-microphone system description of a loudspeaker-enclosure-microphone system according to another embodiment. The loudspeaker-enclosure-microphone system comprises a plurality of loudspeakers and a plurality of microphones.

A plurality of time-domain loudspeaker audio signals $x_0(n), \ldots, x_\lambda(n), \ldots, x_{N_L-1}(n)$ are fed into a plurality of loudspeakers 110 of a loudspeaker-enclosure-microphone system (LEMS). The plurality of time-domain loudspeaker audio signals $x_0(n), \ldots, x_\lambda(n), \ldots, x_{N_L-1}(n)$ is also fed into a first transformation unit 130. Although, for illustrative purposes, only three time-domain loudspeaker audio signals are depicted in FIG. 1b, it is assumed that all loudspeakers of the LEMS are connected to time-domain loudspeaker audio signals and these time-domain loudspeaker audio signals are also fed into the first transformation unit 130.

The apparatus comprises a first transformation unit 130 for generating a plurality of wave-domain loudspeaker audio signals $\tilde{x}_0(n), \ldots \tilde{x}_l(n), \ldots, \tilde{x}_{N_L-1}(n)$, wherein the first transformation unit 130 is configured to generate each of the wave-domain loudspeaker audio signals $\tilde{x}_0(n), \ldots \tilde{x}_l(n), \ldots, \tilde{x}_{N_L-1}(n)$, based on the plurality of time-domain loudspeaker audio signals $x_0(n), \ldots, x_\lambda(n), \ldots, x_{N_L-1}(n)$ and based on one of a plurality of loudspeaker-signal-transformation mode orders (not shown). In other words: The mode order employed determines how the first transformation unit 130 conducts the transformation to obtain the corresponding wave domain loudspeaker audio signal. The loudspeaker-signal-transformation mode order employed is a loudspeaker-signal-transformation value.

Furthermore, the plurality of microphones 120 of the LEMS record a plurality of time-domain microphone audio signals $d_0(n), \ldots, d_\mu(n), \ldots, d_{N_M-1}(n)$, Although, for illustrative purposes, only three time-domain audio signals $d_0(n), \ldots, d_\mu(n), \ldots, d_{N_M-1}(n)$ recorded by three microphones 120 of the LEMS are shown, it is assumed that each microphone 120 of the LEMS records a time-domain microphone audio signal and all these microphone audio signals are fed into a second transformation unit 140.

The second transformation unit 140 is adapted to generate a plurality of wave-domain microphone audio signals $\tilde{d}_0(n), \ldots \tilde{d}_m(n), \ldots, \tilde{d}_{N_M-1}(n)$, wherein the second transformation unit 140 is configured to generate each of the wave-domain microphone audio signals $\tilde{d}_0(n), \ldots \tilde{d}_m(n), \ldots, \tilde{d}_{N_M-1}(n)$ based on a plurality of time-domain microphone audio signals $d_0(n), \ldots, d_\mu(n), \ldots, d_{N_M-1}(n)$ and based on one of a plurality of microphone-signal-transformation mode orders (not shown). In other words: The mode order employed determines how the second transformation unit 140 conducts the transformation to obtain the corresponding wave domain microphone audio signal. The microphone-signal-transformation mode order employed is a microphone-signal-transformation value.

Furthermore, the apparatus comprises a system description generator 150. The system description generator 150 comprises a system description application unit 160, an error determiner 170 and a system description generation unit 180.

The system description application unit 160 is configured to generate a plurality of wave-domain microphone estimation signals $\tilde{y}_0(n), \ldots, \tilde{y}_m(n), \ldots, \tilde{y}_{N_M-1}(n)$ based on the wave-domain loudspeaker audio signals $\tilde{x}_0(n), \ldots \tilde{x}_l(n), \ldots, \tilde{x}_{N_L-1}(n)$ and based on a previous loudspeaker-enclosure-microphone system description of the loudspeaker-enclosure-microphone system.

The error determiner 170 is configured to determine a plurality of wave-domain error signals $\underline{\tilde{d}}_0(n), \ldots \tilde{d}_m(n), \ldots, \underline{\tilde{d}}_{N_M-1}(n)$ based on the plurality of wave-domain microphone audio signals $\tilde{d}_0(n), \ldots \tilde{d}_m(n), \ldots, \tilde{d}_{N_M-1}(n)$ and based on the plurality of wave-domain microphone estimation signals $\tilde{y}_0(n), \ldots, \tilde{y}_m(n), \ldots, \tilde{y}_{N_M-1}(n)$.

The system description generation unit 180 is configured to generate the current loudspeaker-enclosure-microphone system description based on the wave-domain loudspeaker audio signals $\tilde{x}_0(n), \ldots \tilde{x}_l(n), \ldots, \tilde{x}_{N_L-1}(n)$ and based on the plurality of error signals $\underline{\tilde{d}}_0(n), \ldots \underline{\tilde{d}}_m(n), \ldots, \underline{\tilde{d}}_{N_M-1}(n)$.

The system description generation unit 180 is configured to generate the loudspeaker-enclosure-microphone system description based on a first coupling value $\beta_1$ of the plurality of coupling values, when a first relation value indicating a first difference between a first loudspeaker-signal-transformation mode order l of the plurality of loudspeaker-signal mode orders (l; l') and a first microphone-signal-transformation mode order m of the plurality of microphone-signal mode orders (m; m') has a first difference value. Moreover, the system description generation unit 180 is configured to assign the first coupling value $\beta_1$ to a first wave-domain pair of the plurality of wave-domain pairs, when the first relation value has the first difference value. In this context, the first wave-domain pair is a pair of the first loudspeaker-signal mode order and the first microphone-signal mode order, and wherein the first relation value is one of the plurality of relation indicators.

Furthermore, the system description generation unit 180 is configured to generate the loudspeaker-enclosure-microphone system description based on a second coupling value $\beta_2$ of the plurality of coupling values, when a second relation value indicating a second difference between a second loudspeaker-signal-transformation mode order l of the plurality of loudspeaker-signal-transformation mode orders l and a second microphone-signal-transformation mode order m of the plurality of microphone-signal-transformation mode orders m has a second difference value, being different from the first difference value. Moreover, the system description generation unit 180 is configured to assign the second coupling value $\beta_2$ to the second wave-domain pair of the plurality of wave-domain pairs, when the second relation value has the second difference value. In this context, the second wave-domain pair is a pair of the second loudspeaker-signal mode order of the plurality of loudspeaker-signal mode orders and the second microphone-signal mode order of the plurality of microphone-signal mode orders, wherein the second wave-domain pair is different from the first wave-domain pair, and wherein the second relation value is one of the plurality of relation indicators.

An example for coupling values is, for example provided in formula (60) below, wherein $c_q(n)$ are coupling values. In particular, in formula (60), $\beta_1$ is a first coupling value, $\beta_2$ is a second coupling value, and 1 is a third coupling value.

See formula (60):

$$c_q(n) = \begin{cases} \beta_1 & \text{when } \Delta m(q) = 0, \\ \beta_2 & \text{when } \Delta m(q) = 1, \\ 1 & \text{elsewhere,} \end{cases} \tag{60}$$

An example for relation indicators is provided in formulae (60) and formulae (61) below, wherein $\Delta m(q)$ represents relation indicators. In particular, a first relation value being a relation indicator may have the value $\Delta m(q)=0$ and a second relation value being a relation indicator may have the value $\Delta m(q)=1$.

As can be seen in formula (61) below, the relation values represented by $\Delta m(q)$ indicates a relation between one of the one or more loudspeaker-signal-transformation values and one of the one or more microphone-signal-transformation values, e.g. a relation between the loudspeaker-signal-transformation mode order l and the microphone-signal-transformation mode order m. In particular, $\Delta m(q)$ represents a difference of the mode orders l' and m'.

See formula (61):

$$\Delta m(q)=\min(|\lfloor q/L_H\rfloor-m|,|\lfloor q/L_H\rfloor-N_L) \tag{61}$$

wherein the microphone-signal-transformation mode order is m, and wherein the loudspeaker-signal-transformation mode order I is defined by:

$$l=\lfloor q/L_H\rfloor$$

As can be seen in formulae (60) and (61), when the absolute difference between the third loudspeaker-signal-transformation mode order ($1=q/L_H$) and the third microphone-signal-transformation mode order (m) is greater than the predefined threshold value (here: greater than 1.0), then the coupling value is a third value (1.0), being different from the first coupling value ($\beta_1$) and the second coupling value ($\beta_2$).

The coupling value determined by employing formulae (60) and (61) may then, for example be employed in formula (58):

$$\underline{\tilde{h}}_m(n)=\underline{\tilde{h}}_m(n-1)+(1-\lambda_\alpha)(\underline{S}(n)+\underline{C}_m(n))^{-1}\cdot(\underline{W}_{10}{}^H\underline{X}^H(n)\ \underline{W}_{10}{}^H\tilde{e}_m(n)-\underline{C}_m(n)\underline{\tilde{h}}_m(n-1)). \tag{58}$$

to obtain an updated LEMS description (see below).

For more details regarding formulae (58), (60) and (61) see the explanations provided below.

In other embodiments, the loudspeaker-signal transformation values are not mode orders of circular harmonics, but mode indices of spherical harmonics, see below.

In further embodiments, the loudspeaker-signal transformation values are not mode orders of circular harmonics, but components representing a direction of plane waves, for example $\tilde{k}_x$, $\tilde{k}_y$, and $\tilde{k}_z$ explained below with reference to formula (6k).

In the following, an overview of basic concepts of embodiments is provided.

Afterwards, a prototype will be described in general terms. Later on, embodiments are described in more detail.

At first, an overview of basic concepts of embodiments is provided. Please note that in the following l and m are used instead of l' and m' to increase readability of the formulae.

Figure 2:
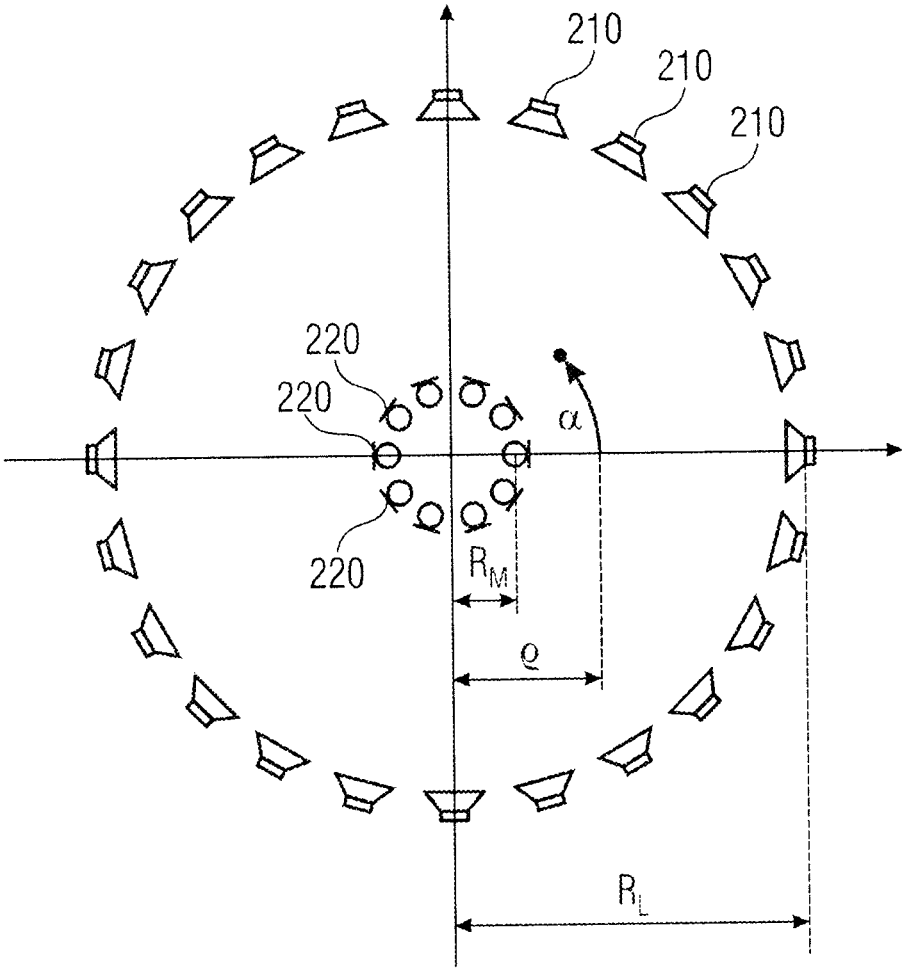
FIG. 2 illustrates a loudspeaker and microphone setup used in the LEMS to be identified, wherein the z=0 plane is depicted in cylindrical coordinates.

FIG. 2 illustrates a loudspeaker and microphone setup used in the LEMS to be identified, wherein the z=0 plane is depicted in cylindrical coordinates. A plurality of loudspeakers 210 and a plurality of microphones 220 are depicted. It is assumed that the LEMS comprises $N_L$ loudspeakers and $N_M$ microphones. Angle $\alpha$ and radius $\varrho$ describe polar coordinates.

Figure 3:
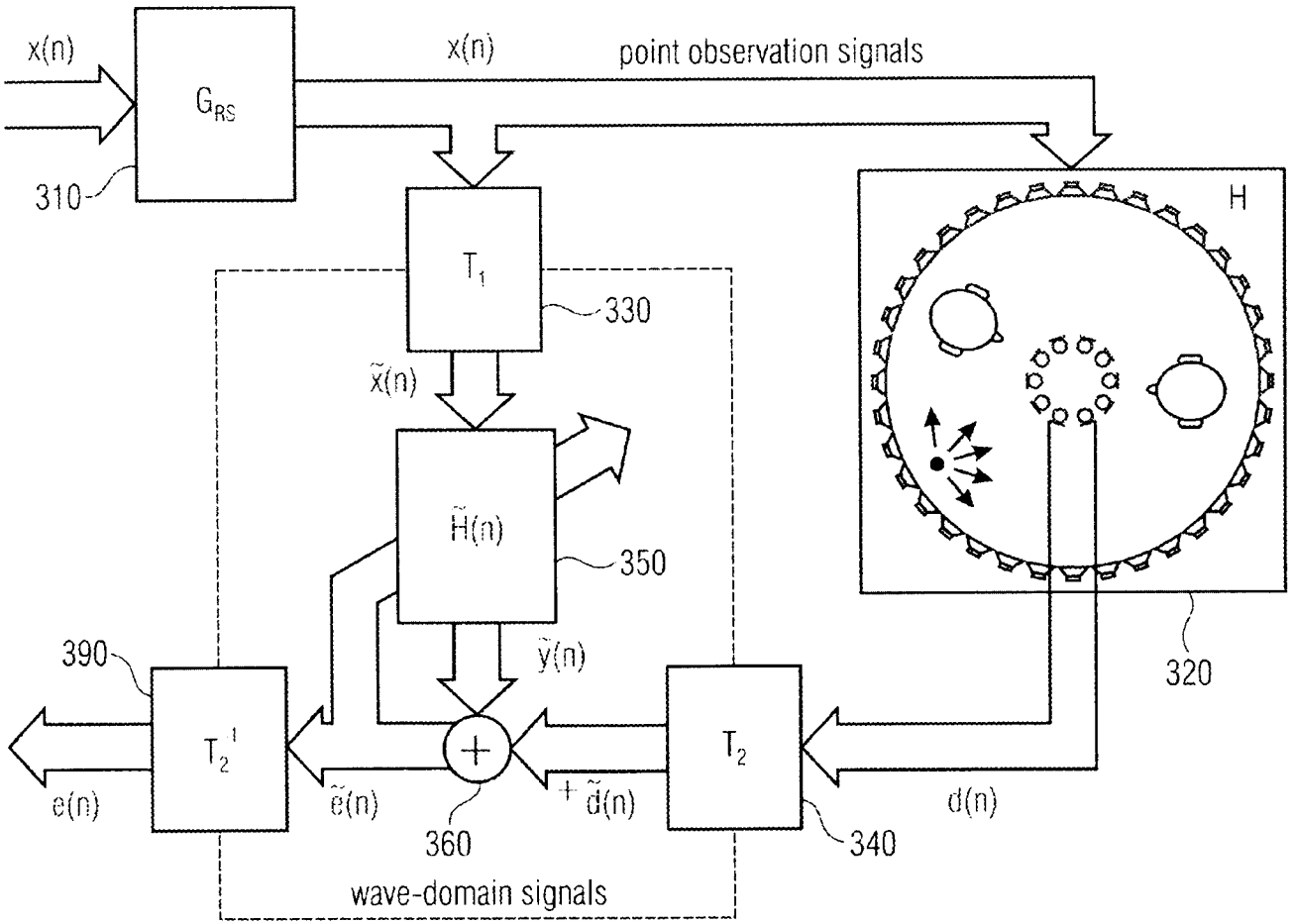
FIG. 3 illustrates a block diagram of a WDAF AEC system. $G_{RS}$ illustrates a reproduction system, H illustrates a LEMS, $T_1$,$T_2$, and $T_2^{-1}$ illustrate transforms to and from the wave domain, and $\tilde{H}(n)$ illustrates an adaptive LEMS model in the wave domain.

FIG. 3 illustrates a block diagram of a corresponding WDAF AEC system for identifying a LEMS. $G_{RS}$ (310) illustrates a reproduction system, H (320) illustrates a LEMS, $T_1$ (330),$T_2$ (340), and $T_2^{-1}$ (350) illustrate transforms to and from the wave domain, and $\tilde{H}(n)$ (360) illustrates an adaptive LEMS model in the wave domain.

When considering the sound pressure $P_\lambda^{(x)}(j\omega)$ emitted by the loudspeaker $\lambda$ and the sound pressure $P_\mu^{(d)}(j\omega)$ measured by microphone p in the frequency domain, a LEMS can be modeled through $$P_\mu^{(d)}(j\omega) = \sum_{\lambda=0}^{N_L-1} P_\lambda^{(x)}(j\omega)H_{\mu,\lambda}(j\omega),\ \mu = 0, 1, \ldots, N_M - 1, \tag{1}$$

where $H_{\mu,\lambda}(j\omega)$ denotes the frequency responses between all $N_L$ loudspeakers and $N_M$ microphones. For many applications, the LEMS has to be identified, e.g., $H_{\mu,\lambda}(j\omega)\forall\lambda, \mu$ have to be estimated. To this end, the present $P_\lambda^{(x)}(j\omega)$ and $p^{(d)}(j\omega)$ are observed and the filter $\hat{H}_{\mu,\lambda}(j\omega)\forall\lambda, \mu$ is adapted, so that the $P_\mu^{(d)}(j\omega)$ can be obtained by filtering $P_\lambda^{(x)}(j\omega)$. Often, the loudspeaker signals are strongly cross-correlated, so estimating $H_{\mu,\lambda}(j\omega)$ is an underdetermined problem and the nonuniqueness problem occurs. When the observed signals are the only considered information, as present for the vast majority of system description approaches, this problem cannot be solved without altering the loudspeaker signals. However, even when leaving the loudspeaker signals untouched, it is possible to exploit additional knowledge to narrow the set of plausible estimates for $H_{\mu,\lambda}(j\omega)$, so that an estimate near the true solution can be heuristically determined. Corresponding concepts are provided in the following.

Modeling the LEMS in the wave domain uses knowledge about the transducer array geometries to exploit certain properties of the LEMS. For a wave-domain model of the LEMS, the loudspeaker signals $P_\lambda^{(x)}(j\omega)$ and the microphone signals $P_\mu^{(d)}(j\omega)$ are transformed to their wave-domain representations. The wave-domain representation of the microphone signals, the so-called measured wave field, describes the sound pressure measured by the microphones using fundamental solutions of the wave equation. The wave-domain representation of the loudspeaker signals is called free-field description as it describes the wave field as it was ideally excited by the loudspeakers in the free-field case. This is done at the microphone positions using the same basis functions as for the measured wave field. The class of wave-domain basis functions includes (but is not limited to) plane waves, spherical harmonics and circular harmonics. For the sake of brevity, in the following, the description relates to circular harmonics and transform $P_\lambda^{(x)}(j\omega)$ to $\tilde{P}_l^{(x)}(j\omega)$ and $P_\mu^{(d)}(j\omega)$ to $\tilde{P}_m^{(d)}(j\omega)$ according to [23]. Other embodiments cover plane waves, spherical harmonics.

The sound pressure $P(\alpha, \varrho, j\omega)$ at angle $\alpha$ and radius $\varrho$ describing polar coordinates is represented according to $$P(\alpha, \varrho, j\omega) = \sum_{l=-\infty}^{\infty} \left(\tilde{P}_l^{(1)}(j\omega)\mathcal{H}_l^{(1)}\left(\frac{\omega}{c}\varrho\right) + \tilde{P}_1^{(2)}(j\omega)\mathcal{H}_l^{(2)}\left(\frac{\omega}{c}\varrho\right)\right)e^{jl\alpha}, \tag{2}$$

where $\tilde{P}_l^{(1)}(j\omega)$ and $\tilde{P}_l^{(2)}(j\omega)$ are spectra of outgoing and incoming waves, respectively. Both signal representations, $\tilde{P}_l^{(x)}(j\omega)$ and $\tilde{P}_m^{(d)}(j\omega)$ result from a superposition of $\tilde{P}_l^{(1)}(j\omega)$ and $\tilde{P}_l^{(2)}(j\omega)$ as described in [23]. This choice of this basis functions was motivated by the circular array setup considered in [23], which is illustrated by FIG. 2. Circular harmonics are just one example of a whole class of basis functions which can be used for a wave-domain representation. Other examples are plane waves [13], cylindrical harmonics, or spherical harmonics, as they all denote fundamental solutions of the wave equation.

Figure 4:
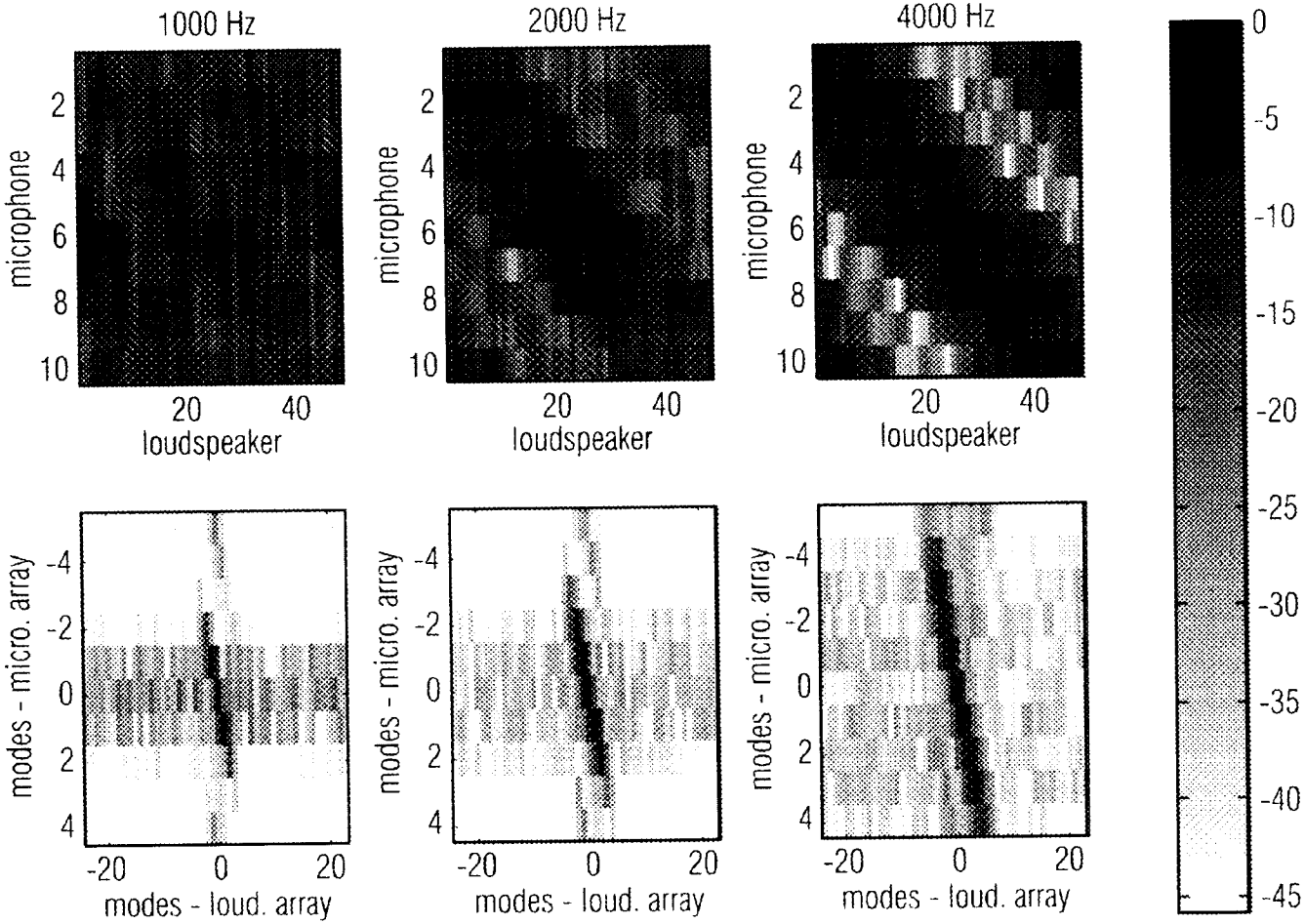
FIG. 4 illustrates logarithmic magnitudes (absolute values) of $H_{\mu,\lambda}(j\omega)$ and $\tilde{H}_{m',l'}(j\omega)$ in dB with $\mu=0, \ldots, N_M-1$, $\lambda=0, \ldots, N_L-1$, and $m'=-4, \ldots, 5$, $l'=-23, \ldots, 24$, for different frequencies $\omega=2\pi f$,f=1 kHz, 2 kHz, 4 kHz normalized to the maximum of the subfigures in each row.

Using the wave-domain signal representations, an equivalent to (1) may be formulated by $$\tilde{P}_\mu^{(d)}(j\omega) = \sum_{l=N_L/2+1}^{N_L/2} H_{m,l}(j\omega)\tilde{P}_l^{(x)}(j\omega), \quad m = -N_M/2+1, \ldots, N_M/2 \tag{3}$$

where $\tilde{H}_{m,l}(j\omega)$ describes the coupling of mode l in $\tilde{P}_l^{(x)}(j\omega)$ and mode m in $\tilde{P}_m^{(d)}(j\omega)$. An example of $H_{\mu,\lambda}(j\omega)$ and $\tilde{H}_{m,l}(j\omega)$ for an LEMS with $N_L$=48 loudspeakers on a circle of radius $R_L$=1.5 m, $N_M$=10 microphones on a circle of radius $R_M$=0.05 m, and a real room with a reverberation time $T_{60}$ of 0.3 s is shown in FIG. 4 to illustrate the different properties of both models. While the weights of $H_{\mu,\lambda}(j\omega)$ appear to be similar for all $\lambda$ and $\mu$, $\tilde{H}_{m,l}(j\omega)$ shows a clearly distinguishable structure with dominant $\tilde{H}_{m,l}(j\omega)$ for certain combinations of m and l. For a wave-domain model, this structure may be formulated for any LEMS, in contrast to a conventional model, where the weights may differ significantly, depending on the loudspeaker and microphone positions. This property has already been used to obtain an approximate model for the LEMS to increase computational efficiency [13, 23].

Embodiments exploit this property in a different way. As the weights of $\tilde{H}_{m,l}(j\omega)$ are predictable to a certain extent, they allow to assess the plausibility of a particular estimate. Moreover, it is possible to modify adaptation algorithms for system description so that estimates of $\tilde{H}_{m,l}(j\omega)$ depicting similar weights to the true solution are obtained. Those estimates can then be expected to be close to the true solution. For a system description in the wave domain without following the proposed approach, an estimate $\hat{H}_{m,l}(j\omega)$ would be implicitly determined for $\tilde{H}_{m,l}(j\omega)$ by obtaining a least squares estimate for $\tilde{P}_m^{(d)}(j\omega)$ with a model according to (3). One possibility to realize the proposed approach is to modify the resulting least squares cost function, which originally only considered the deviation of $\tilde{P}_m^{(d)}(j\omega)$ from its estimate. Such a modification can be the addition of a term representing $$\int_{-\infty}^{\infty} |\hat{H}_{m,l}(j\omega)|^2 C(|m-l|)d\omega \tag{4a}$$

with $C(|m-l|)$ being a monotonically growing cost function for increasing $|m-l|$ for the considered example of circular harmonics. For other wave-domain basis functions $C(|m-l|)$ is replaced by an appropriate function, possibly depending on multiple variables. Such a modification regularizes the problem of system description in a physically motivated manner, but is in general independent of a possibly used regularization of the underlying adaptation algorithm.

Figure 5:
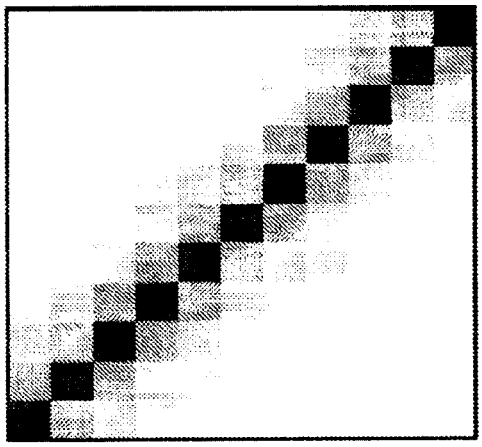
FIG. 5 is an exemplary illustration of mode coupling weights and additionally introduced cost. Illustration (a) of FIG. 5 depicts weights of couplings of the wave field components for the true LEMS $\tilde{H}_{m,l}(j\omega)$ illustration (b) of FIG. 5 depicts the additional cost introduced by formula (4), and illustration (c) of FIG. 5 depicts the resulting weights of the identified LEMS $\hat{H}_{m,l}(j\omega)$.
Figure 5:
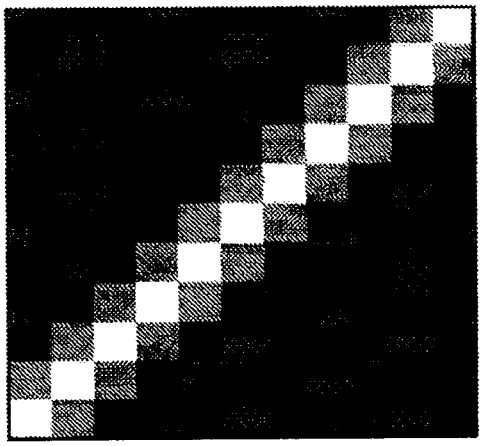
Figure 5:
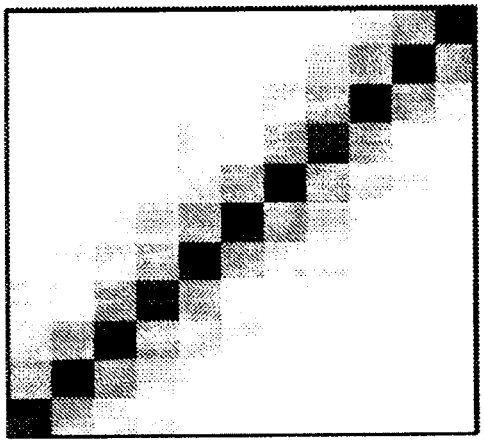

A minimization of the modified cost function leads to an estimate $\hat{H}_{m,l}(j\omega)$ depicting similar weights than shown for $\tilde{H}_{m,l}(j\omega)$ in FIG. 4. An illustration of mode coupling weight and corresponding cost is shown in FIG. 5. A modification according to (4a) is just one of several ways to implement the concepts provided by embodiments As the set of possible estimates $\hat{H}_{m,l}(j\omega)$ is still unbounded, we refer to this modification as introducing a non-restrictive constraint.

Another possibility is to necessitate an estimate $\hat{H}_{m,l}(j\omega)$ to fulfill $$\int_{-\infty}^{\infty}\left|\hat{H}_{m,l_1}(j\omega)\right|^2 d\omega > \int_{-\infty}^{\infty}\left|\hat{H}_{m,l_2}(j\omega)\right|^2 d\omega \forall\ |l_2-m| > |l_1-m| \tag{4b}$$

which would then be a restrictive constraint.

According to embodiments, a variety of constraints may be formulated, where (4a) and (4b) describe just two possible realizations.

In the following, a prototype is described in general terms.

The prototype of an AEC according to an embodiment is briefly described and an excerpt of its experimental evaluation is given. AEC is commonly used to remove the unwanted loudspeaker echo from the recorded microphone signals while preserving the desired signals of the local acoustic scene without quality degradation. This is necessitated to use a reproduction system in communication scenarios like teleconferencing and acoustic human-machine-interaction.

FIG. 3 illustrates a block diagram depicting the signal model of a wave-domain AEC according to an embodiment. There, the continuous frequency-domain quantities used in the previous section are represented by vectors of discrete-time signals with the block time index n. The signal quantities $x(n)$ and $d(n)$ correspond to $P_\lambda^{(x)}(j\omega)$ and $P_\mu^{(d)}(j\omega)$, respectively. Similarly, the wave-domain representation $\tilde{x}(n)$ and $\tilde{d}(n)$ correspond to $P_l^{(x)}(j\omega)$ to $P_m^{(d)}(j\omega)$, respectively. The wave-domain representation $\tilde{y}(n)$ denotes an estimate for $\tilde{d}(n)$ and $\tilde{e}(n)=\tilde{d}(n)-\tilde{y}(n)$ is the adaptation error in the wave-domain. This error is transformed back to the microphone signal domain, where it is denoted as $e(n)$. The transforms $T_1$, $T_2$ and $T_2^{-1}$ denote transforms to and from the wave domain, $H$ corresponds to $H_{\mu,\lambda}(j\omega)$ and $\tilde{H}(n)$ to its wave-domain estimate $\hat{H}_{m,l}(j\omega)$ In the following, an excerpt of an experimental evaluation of the mentioned AEC will be provided. To this end, the two most important measures for an AEC are considered. The so-called "Echo Return Loss Enhancement" (ERLE) provides a measure for the achieved echo cancellation and is here defined as $$\mathrm{ERLE}(n) = 10\log_{10}\left(\frac{\|\tilde{d}(n)\|_2^2}{\|\tilde{e}(n)\|_2^2}\right) = 10\log_{10}\left(\frac{\|d(n)\|_2^2}{\|e(n)\|_2^2}\right), \tag{5a}$$

where $\|\cdot\|_2$ stands for the Euclidean norm. The normalized misalignment is a metric to determine the distance of the identified LEMS from the true one, e.g., the distance of $\hat{H}_{m,l}(j\omega)$ and $\tilde{H}_{m,l}(j\omega)$. For the system described here, this measure can be formulated as follows:

$$\Delta_H(n) = 10\log_{10}\left(\frac{\|T_2H - \tilde{H}(n)T_1\|_F^2}{\|T_2H\|_F^2}\right), \tag{5b}$$

where $\|\cdot\|_F$ stands for the Frobenius norm.

Figure 8:
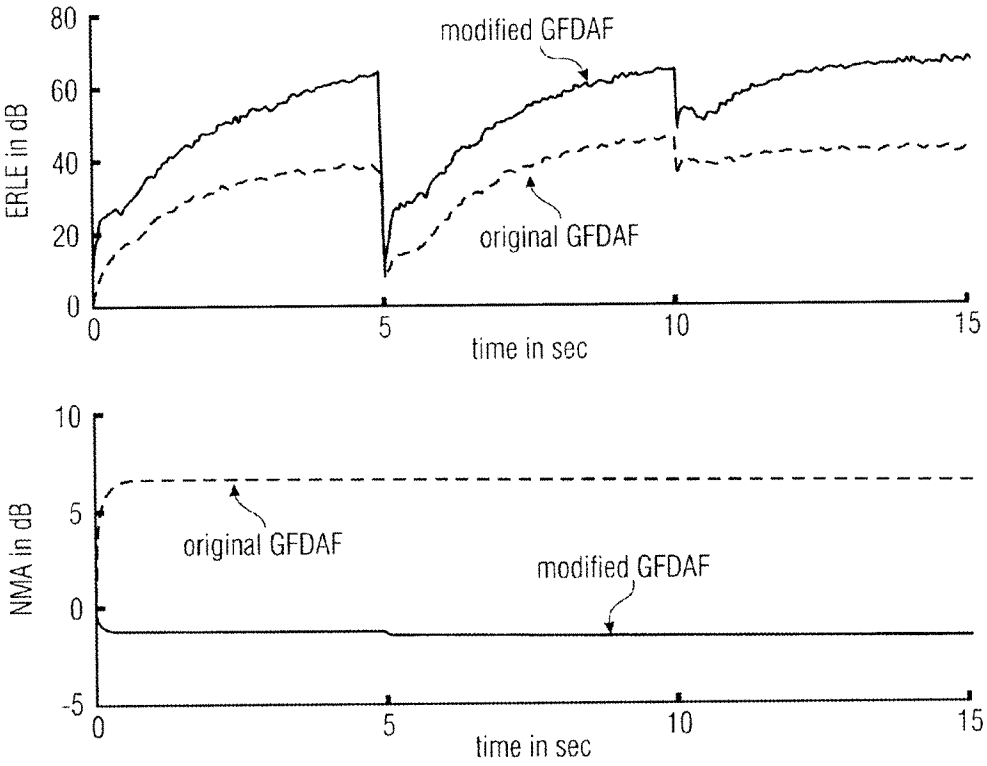
FIG. 8 illustrates ERLE and the normalized misalignment (NMA) for a WDAF AEC with a suboptimal initialization value $\underline{S}(0)$.

FIG. 8 shows ERLE and normalized misalignment for the built prototype in comparison to a conventional generation of a system description. In this scenario, two plane waves were synthesized by a WFS system, first alternatingly and then simultaneously. Within the first five seconds the first plane wave with an incidence angle of $\varphi=0$ was synthesized, during the following five seconds, the second plane wave with an incidence angle of $\varphi=\pi/2$ was synthesized. Within the last five seconds, both plane waves were simultaneously synthesized. Mutually uncorrelated white noise signals were used as source signals for the plane waves. The considered LEMS was already described above. The parameters for the adaptive filters can be considered as being nearly optimal.

The most attention in this discussion is given to the normalized misalignment, because a lower misalignment denotes a better system description. As the 48 loudspeaker signals were obtained from only two source signals, the identification of the LEMS is a severely underdetermined problem. Consequently, the achieved absolute normalized misalignment cannot be expected to be very low. However, the AEC implementing the proposed invention shows a significant improvement. We can see that the adaption algorithm with the modified cost function achieves a misalignment of −1.6 dB while the original adaptation algorithm only achieves −0.2 dB. Please note that a value of −0.2 dB is almost the minimal misalignment which can be expected, when only considering microphone and loudspeaker signals in such a scenario. Even though this experiment was conducted under optimal conditions, e.g., in absence of noise or interferences in the microphone signal, the better system description already leads to a better echo cancellation. The anticipated breakdown of the ERLE when the activity of both plane waves switches is less pronounced for the modified adaptation algorithm than for the original approach. Moreover, the modified algorithm is able to achieve a larger steady-state ERLE, which points to the fact the considered original algorithm is trapped in a local minimum due to the frequency-domain approximation [14], which is necessitated for both algorithms.

Figure 9:
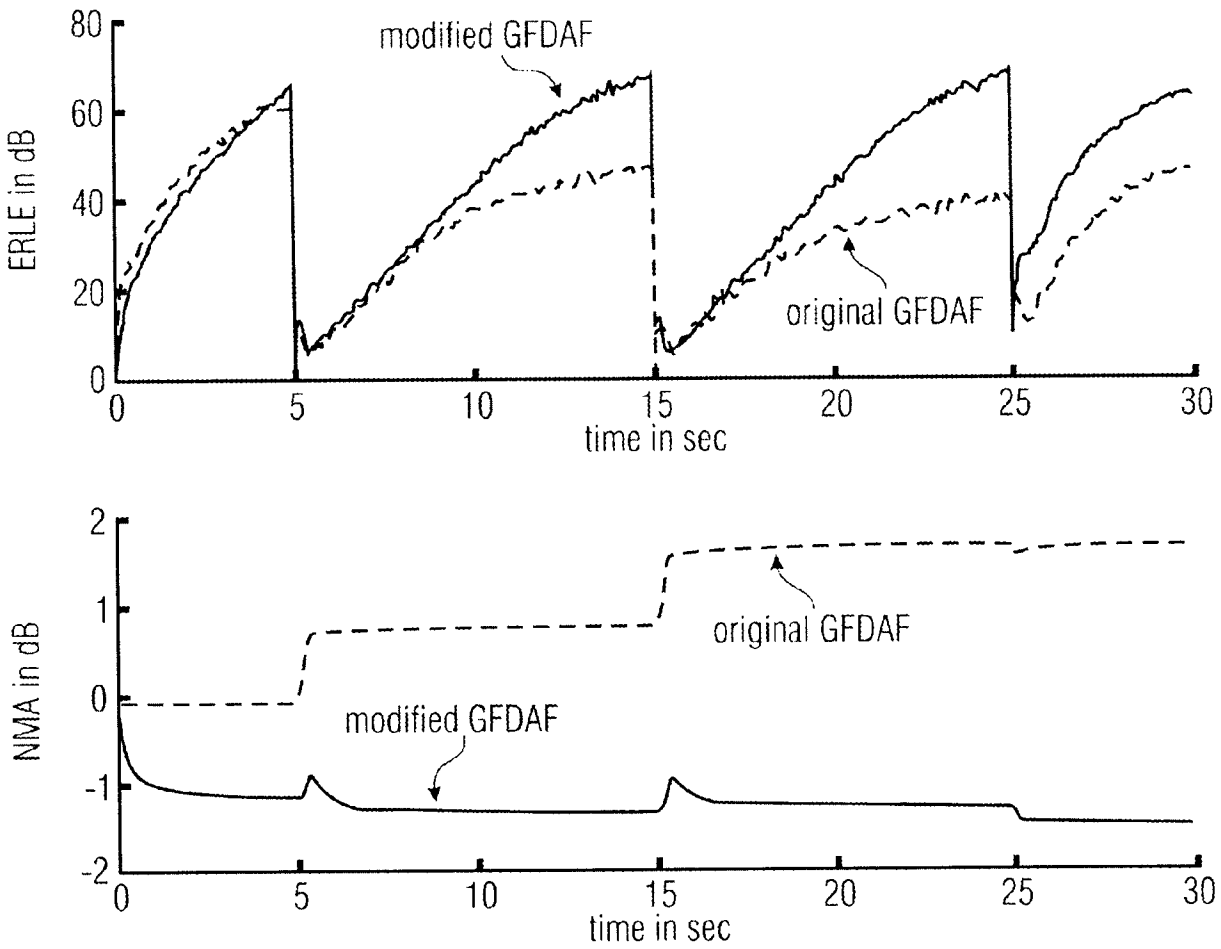
FIG. 9 illustrates ERLE and the normalized misalignment (NMA) for a WDAF AEC in the presence of short interfering signals, wherein the interferers are present at t=5 s and t=15 s for 50 ms, and wherein at t=25 s the incidence angle of the synthesized plane wave was changed.

In practice, benevolent laboratory conditions, as described in the previous experiment, are typically not present. One problem for the system description can be a double-talk situation, e.g., the simultaneous activity of the loudspeaker signals and the local acoustic scene. The adaptation of the filters is then typically stalled under such conditions to avoid a diverging system description. However, such a situation cannot always be reliably detected and adaptation steps during double-talk may occur. Therefore, an experiment was conducted to study the behavior of an AEC in this case. To this end, a similar scenario as in the previous experiment was considered, where the first plane wave was synthesized during the first 25 seconds and the second plane wave was synthesized within the last 5 seconds. To simulate an undetected double-talk situation, short noise bursts we introduced into the microphone signal, leading to approximately two mislead adaptation steps. The results are shown in FIG. 9. Considering the misalignment it can be seen that both algorithms are negatively affected due to this adaptation steps. The modified adaptation algorithm can, however, recover quickly from the divergence, in contrast to the original algorithm. Regarding the ERLE, both algorithms show a significant breakdown and a following recovery with every disturbance. For the original algorithm, we can see that the steady-state ERLE worsens with every recovery, while the steady-state performance of the modified algorithm remains not significantly affected. When the activity of both plane waves changes, the ERLE breakdown of the original algorithm is clearly more pronounced than for the modified algorithm.

The shown increase of robustness is expected to be also beneficial for other applications, e.g., listening room equalization.

In the following, embodiments will be provided, wherein different WDAF basis functions will be employed. Moreover, in the following, we use $\tilde{l}=l'$ and $\tilde{m}=m'$. The explanations in the following will be focused on circular harmonics, spherical harmonics and plane waves as WDAF basis functions. It should be noted that the present invention is equally applicable with other WDAF basis functions, such as, for example, cylindrical harmonics.

At first, a LEMS description using different WDAF basis functions is provided. For WDAF, the considered loudspeaker and microphone signals are represented by a superposition of chosen basis functions which are fundamental solutions of the wave equation valuated at the microphone positions. Consequently, the wave-domain signals describe a sound field within a spatial continuum. Each individual considered fundamental solution of the wave equation is referred to as a wave field component and is uniquely identified by one or more mode orders, one or more wave numbers or any combination thereof.

The wave-domain loudspeaker signals describe the wave field as it was ideally excited at the microphone positions in the free field case decomposed into its wave field components. The wave-domain microphone signals describe the sound pressure measured by the microphones in terms of the chosen basis functions.

In the wave-domain, a LEMS is described by the way it distorts the reproduced wave field with respect to the wave field which would ideally be excited in the free field case. Consequently, this description is formulated as couplings of the wave-domain loudspeaker signals and the wave-domains microphone signals.

In the free field case, there is no distortion of the reproduced wave field and only the wave field components of the wave domain loudspeaker and microphone signals are coupled, which share identical mode orders or wave numbers. For typical room shapes with no significant obstacles between loudspeakers and microphones, the reproduced wave field is only moderately distorted. So the couplings between wave field components of the transformed loudspeaker signals and wave field components of the transformed microphone signals which describe similar sound fields are stronger than the coupling of wave field components describing very different sound fields. The difference of the sound field described by different wave field components is measured by a distance function which is described below after the review of different basis functions for WDAF.

For WDAF, different fundamental solutions of the wave equation can be used. Examples are: circular harmonics, plane waves and spherical harmonics. Those basis functions are used to describe the sound pressure $P(\vec{x},j\omega)$ at the position $\vec{x}$, here described in the continuous frequency domain, where $\omega$ is the angular frequency. Alternatively, cylindrical harmonics may be used.

At first, circular harmonics are considered. When using circular harmonics, we describe $\vec{x}=(\alpha, \varrho)^T$ in polar coordinates with an angle $\alpha$ and a radius $\varrho$ and we obtain the following superposition to describe the sound pressure at this point $$P(\alpha, \varrho, j\omega) = \sum_{\tilde{m}=-\infty}^{\infty} \left(\tilde{P}_{\tilde{m}}^{(1)}(j\omega)\mathcal{H}_{\tilde{m}}^{(1)}\left(\frac{\omega}{c}\varrho\right) + \tilde{P}_{\tilde{m}}^{(2)}(j\omega)\mathcal{H}_{\tilde{m}}^{(2)}\left(\frac{\omega}{c}\varrho\right)\right)e^{j\tilde{m}\alpha} \tag{6a}$$

where and are spectra of outgoing and incoming waves, respectively. Here, $H_{\tilde{m}}^{(1)}(x)$ and $H_{\tilde{m}}^{(2)}(x)$ are Hankel functions of the first and second kind and order $\tilde{m}$, respectively, c is the speed of sound, and j is used as the imaginary unit. Assuming no acoustic sources in the coordinate origin, we may reduce our consideration to a superposition of incoming and outgoing waves.

$$P(\alpha, \varrho, j\omega) = \sum_{\tilde{m}=-\infty}^{\infty} \tilde{P}_{\tilde{m}}^{(d)}(j\omega)\mathcal{B}_{\tilde{m}}(j\omega)e^{j\tilde{m}\alpha} \tag{6b}$$

where $B_{\tilde{m}}(j\omega)$ depends on the presence of a scatterer within the microphone array, and is equal to the ordinary Bessel function of the first kind $I_{\tilde{m}}(j\omega)$ in the free field [19]. A single wave field component describes the contribution $$\tilde{P}_{\tilde{m}}^{(d)}(j\omega)B_{\tilde{m}}(j\omega)e^{j\tilde{m}\alpha} \tag{6c}$$

to the resulting sound field and is identified by its mode order $\tilde{m}$. So we denote the transformed microphone signals with $\tilde{P}_{\tilde{m}}^{(d)}(j\omega)$ and the transformed loudspeaker signals with $\tilde{P}_{\tilde{l}}^{(x)}(j\omega)$. The wave-domain model is then described by $$\tilde{P}_{\tilde{m}}^{(d)}(j\omega) = \sum_{\tilde{l}=\infty}^{\infty} \tilde{H}_{\tilde{m},\tilde{l}}(j\omega)\tilde{P}_{\tilde{l}}^{(x)}(j\omega). \tag{6d}$$

Now, spherical harmonics are considered. For spherical harmonics, we describe $\vec{x}=(\alpha, \nu, \varrho)^T$ in spherical coordinates with an azimuth angle $\alpha$, a polar angle $\delta$ and a radius $\zeta$ and we obtain the following superposition to describe the sound pressure at this point $$P(\alpha, \vartheta, \varrho, j\omega) = \sum_{\tilde{n}=0}^{\infty}\sum_{\tilde{m}=-\tilde{n}}^{\tilde{n}} \left(\hat{p}_{\tilde{m},\tilde{n}}^{(1)}(j\omega)h_{\tilde{n}}^{(1)}\left(\frac{\omega}{c}\varrho\right) + \hat{p}_{\tilde{m},\tilde{n}}^{(2)}(j\omega)h_{\tilde{n}}^{(2)}\left(\frac{\omega}{c}\varrho\right)\right)Y_{\tilde{n}}^{\tilde{m}}(\vartheta, a) \tag{6e}$$

Here, $h_{\tilde{n}}^{(1)}(x)$ and $h_{\tilde{n}}^{(2)}(x)$ are spherical Hankel functions of the first and second kind and order n, respectively and the spherical basis functions are given by $$Y_{\tilde{n}}^{\tilde{m}}(\vartheta, \varphi) = \sqrt{\frac{2\tilde{n}+1}{4\pi}\frac{(\tilde{n}-\tilde{m})!}{(\tilde{n}+\tilde{m})!}}\,\mathcal{P}_{\tilde{n}}^{\tilde{m}}(\cos(\vartheta))e^{j\tilde{m}\varphi} \tag{6f}$$

with the associated Legendre polynomials $$\mathcal{P}_{\tilde{n}}^{\tilde{m}}(z) = \frac{(-1)^{\tilde{m}}}{2^{\tilde{n}}\tilde{n}!}(1-z^2)^{\tilde{m}/2}\frac{d^{\tilde{m}+\tilde{n}}}{dz^{\tilde{m}+\tilde{n}}}(z^2-1)^{\tilde{n}} \tag{6g}$$

for $\tilde{m} \geq 0$. For negative $\tilde{m}$, the associated Legendre polynomials are defined by $$\mathcal{P}_{\tilde{n}}^{-\tilde{m}}(z) = (-1)^{\tilde{n}}\frac{(\tilde{n}-\tilde{m})!}{(\tilde{n}+\tilde{m})!}\mathcal{P}_{\tilde{n}}^{\tilde{m}}(z) \tag{6h}$$

As it can be seen from formula (6e) to (6g), the spherical harmonics are identified by two mode order indices $\tilde{m}$ and $\tilde{n}$. Again, $\tilde{p}_{\tilde{m},\tilde{n}}^{(1)}(j\omega)$ and $\tilde{p}_{\tilde{m},\tilde{n}}^{(2)}(j\omega)$ describe spectra of incoming and outgoing waves with respect to the origin and we consider the superposition of both. So each spherical harmonic wave field component describes a contribution to the sound field according to $$\hat{p}_{\tilde{m},\tilde{n}}^{(d)}(j\omega)b_{\tilde{n}}\left(\frac{\omega}{c}\varrho\right)Y_{\tilde{n}}^{\tilde{m}}(\theta,\alpha), \tag{6i}$$

where $$b_{\tilde{n}}\left(\frac{\omega}{c}\varrho\right)$$

is dependent on the boundary conditions at the coordinate origin, similar to $$\mathcal{B}_{\tilde{m}}\left(\frac{\omega}{c}\varrho\right)$$

for the circular harmonics. So we denote the transformed microphone signals with $\tilde{p}_{\tilde{m},\tilde{n}}^{(d)}(j\omega)$ and the transformed loudspeaker signals with $\tilde{p}_{\tilde{l},\tilde{k}}^{(x)}(j\omega)$. The wave-domain model is then described by $$\hat{p}_{\tilde{m},\tilde{n}}^{(d)}(j\omega) = \sum_{\tilde{k}=0}^{\infty}\sum_{\tilde{l}=-\tilde{k}}^{\tilde{k}}\hat{H}_{\tilde{m},\tilde{n},\tilde{l},\tilde{k}}(j\omega)\hat{p}_{\tilde{l},\tilde{k}}^{(x)}(j\omega), \tag{6j}$$

Now, plane waves are considered. For a plane wave signal representation in the wave domain, we describe $$P(x,y,z,j\omega)=\int_{-\infty}^{\infty}\int_{-\infty}^{\infty}\int_{-\infty}^{\infty}\tilde{P}(\tilde{k}_x,\tilde{k}_y,\tilde{k}_z)e^{-j(x\tilde{k}_x+y\tilde{k}_y+z\tilde{k}_z)}d\tilde{k}_z d\tilde{k}_y d\tilde{k}_x) \tag{6k}$$

where $\tilde{P}(\tilde{k}_x, \tilde{k}_y, \tilde{k}_z, j\omega)$ describes the plane wave representation of the sound field and is only non-zero if $$\tilde{k}_x^2 + \tilde{k}_y^2 + \tilde{k}_z^2 = \frac{\omega^2}{c^2}.$$

Now, model discretization is described. The number of components describing a real-world sound field is typically not limited. However, for a realization of an adaptive filter, we have to restrict our considerations to a subset of all available wave field components. For circular harmonics, this is simply done by limiting the considered mode order $|\tilde{n}|$. When using plane waves, $\tilde{k}_x$, $\tilde{k}_y$, and $\tilde{k}_z$ describe continuous values in contrast to the integer mode orders of circular or spherical harmonics. Furthermore, $\tilde{k}_x$, $\tilde{k}_y$, and $\tilde{k}_z$ are bounded by $$\tilde{k}_x^2 + \tilde{k}_y^2 + \tilde{k}_z^2 = \frac{\omega^2}{c^3}.$$

Consequently, they are discretized within their boundaries. Considering only plane waves traveling in the x-y-plane, an example of such a discretization can be $$\begin{pmatrix}\tilde{k}_x\\ \tilde{k}_y\\ \tilde{k}_z\end{pmatrix} = \begin{pmatrix}\frac{\omega}{c}\cos(\varphi)\\ \frac{\omega}{c}\sin(\varphi)\\ 0\end{pmatrix}, \varphi = \frac{p2\pi}{P}, p = 0, 1, \ldots, P-1. \tag{7a}$$

The microphone signals are then described by $\tilde{P}^{(d)}(\tilde{k}_x^{(d)}, \tilde{k}_y^{(d)}, \tilde{k}_z^{(d)}, j\omega$, and the loudspeaker signals by $\tilde{P}^{(x)}(\tilde{k}_x^{(x)}, \tilde{k}_y^{(x)}, \tilde{k}_z^{(x)}, j\omega$. Given a suitable discretization, we may also describe the LEMS system by a sum $$\tilde{P}^{(d)}(\tilde{k}_x^{(d)}, \tilde{k}_y^{(d)}, \tilde{k}_z^{(d)}, j\omega) = \sum_{(\tilde{k}_x^{(x)},\tilde{k}_y^{(x)},\tilde{k}_z^{(x)})\in K}\tilde{H}(\tilde{k}_x^{(d)}, \tilde{k}_y^{(d)}, \tilde{k}_z^{(d)}, \tilde{k}_x^{(x)}, \tilde{k}_y^{(x)}, \tilde{k}_z^{(x)}, j\omega)\cdot \tilde{P}^{(x)}(\tilde{k}_x^{(x)}, \tilde{k}_y^{(x)}, \tilde{k}_z^{(x)}, j\omega) \tag{7b}$$

where the K is the set of $(\tilde{k}_x^{(x)}, \tilde{k}_y^{(x)}, \tilde{k}_z^{(x)})$ considered for the model discretization, for example, as described by (7a).

In the following, realizations of improved system identification for different basis Functions according to embodiments are described. In particular, it is explained how the invention can be applied for WDAF systems using different basis functions. As mentioned above, the distortion of the reproduced wave field can be described by couplings of the wave field components in the transformed loudspeaker signals and in the transformed microphone signals (see formulae (6d), (6j), and (7b)). The couplings of the wave field components describing similar sound fields are stronger than the couplings of wave field components describing completely different sound fields. A measure of similarity can be given by the following functions.

For circular harmonics, we can simply use the absolute difference of the mode orders given by $$D(\tilde{m},\tilde{l})=|\tilde{m}-\tilde{l}|. \tag{8a}$$

For spherical harmonics, we have to consider two mode indices for each wave-domain signal and obtain $$D(\tilde{m},\tilde{n},\tilde{l},\tilde{k})=|\tilde{m}-\tilde{l}|+|\tilde{n}-\tilde{k}|. \tag{8b}$$

independently of the chosen sampling of the wave numbers.

For system identification typically, a cost function penalizing and the difference between an estimate of the microphone signal and their estimates is minimized. One way to realize the invention is to modify an adaptation algorithm such that the obtained weights of the wave field component couplings are also considered. This can be done by simply adding an additional term to the cost function which grows with an increasing D( . . . ), resulting in $$\int_{-\infty}^{\infty}|\tilde{H}_{\tilde{m},\tilde{l}}(j\omega)|^2 C(D(\tilde{m},\tilde{l})d\omega \tag{8c}$$

$$\int_{-\infty}^{\infty}|\tilde{H}_{\tilde{m},\tilde{n},\tilde{l},\tilde{k}}(j\omega)|^2 C(D(\tilde{m},\tilde{n},\tilde{l},\tilde{k})d\omega \tag{8d}$$

$$\int_{-\infty}^{\infty}|\tilde{H}(|^2 C(D((\tilde{k}_x^{(d)},\tilde{k}_y^{(d)},\tilde{k}_z^{(d)},\tilde{k}_x^{(x)},\tilde{k}_y^{(x)},\tilde{k}_z^{(x)},j\omega)d\omega \tag{8e}$$

for circular harmonics, spherical harmonics and plane waves, respectively. Here, $\hat{H}_{m,l}(j\omega)$ represents the estimate of estimate of $\tilde{H}_{m,l}(j\omega)$,$\tilde{H}_{m,l}(j\omega)$,$\tilde{H}_{\tilde{m},\tilde{n},\tilde{l},\tilde{k}}(j\omega)$ represents the estimate of $\tilde{H}_{\tilde{m},\tilde{n},\tilde{l},\tilde{k}}(j\omega)$ and $\tilde{H}(k_x^{(d)}, k_y^{(d)}, k_z^{(d)}, \tilde{k}_x^{(x)}, \tilde{k}_y^{(x)}, \tilde{k}_z^{(x)}, j\omega)$ represents the estimate of $\tilde{H}(k_x^{(d)}, k_y^{(d)}, k_z^{(d)}, \tilde{k}_x^{(x)}, \tilde{k}_y^{(x)}, \tilde{k}_z^{(x)}, j\omega)$. The cost function C(x) is a monotonically increasing function.

In the following, the concepts on which embodiments rely, and the embodiments themselves are described in more detail.

At first, the problem of multichannel acoustic echo cancellation (MCAEC) is briefly reviewed.

AEC uses observations of loudspeaker and microphone signals to estimate the loudspeaker echo in the microphone signals. Although extraction of the desired signals of the local acoustic scene is the actual motivation for AEC, it will be assumed for the analysis that the local sources are inactive. This does not limit the applicability of the obtained results, since in most practical systems the adaptation of the filters is stalled during activity of local desired sources (e.g. in a double-talk situation) [16]. For the actual detection of double-talk, see, e.g., [17].

Now, the signal model is presented. The structure of a wave-domain AEC according to FIG. 3 will be described. There are two types of signal representations used in this context: so-called point observation signals, corresponding to sound pressure measured at points in space, and wave-domain representations, corresponding to wave-field components which can be observed over a continuum in space. The latter will be discussed later on.

At first, point observation signals will be described. For block-wise processing of signals, vectors of signal samples are introduced with the block-time index n as argument. The reproduction system $G_{RS}$ shown in FIG. 3 is not part of the AEC system, but is considered for describing the nonuniqueness problem below.

As input for the reproduction system we have a set of $N_S$ uncorrelated source signals $\hat{x}_s(k)$ captured by $$\tilde{x}(n)=(\tilde{x}_0^T(n), \ldots \tilde{x}_1^T(n), \ldots ,\tilde{x}_{N_S-1}^T(n))^T,$$

$$\tilde{x}_s(n)=(\tilde{x}_s(nL_B-L_S+1),\tilde{x}_s(nL_B-L_S+2), \ldots ,\tilde{x}_s(nL_B))^T,\quad s=0,1, \ldots ,N_S-1 \tag{9}$$

where $\cdot^T$ denotes the transposition, s denotes the source index, $L_B$ denotes the relative block shift between data blocks, $L_S$ denotes the length of the individual components $x_s(n)$, and $\ddot{x}_s(k)$ denotes a time-domain signal sample of source s at the time instant k. The loudspeaker signals are then determined by the reproduction system according to $$x(n)=G_{RS}x(n), \tag{10a}$$

where x(n) can be decomposed into $$\tilde{x}(n)=(\tilde{x}_0^T(n), \ldots \tilde{x}_1^T(n), \ldots ,\tilde{x}_{N_L-1}^T(n))^T,$$

$$\tilde{x}_\lambda(n)=(\tilde{x}_\lambda(nL_B-L_X+1),\tilde{x}_\lambda(nL_B-L_X+2), \ldots ,\tilde{x}_\lambda(nL_B))^T,\quad \lambda=0,1, \ldots ,N_L-1 \tag{9}$$

with the loudspeaker index λ, the number of loudspeakers $N_L$, and the length $L_X$ of the individual components $x_\lambda(n)$ which capture the time-domain samples $x_\lambda(k)$ of the respective loudspeaker signals. The $L_X \cdot N_L \times L_S \cdot N_S$ matrix $G_{RS}$ describes an arbitrary linear reproduction system, e.g., a WFS system, whose output signals are described by $$x_\lambda(k) = \sum_{s=1}^{N_{S-1}} \sum_{\kappa=0}^{L_G-1} \ddot{x}_s(k-\kappa)g_{\lambda,s}(\kappa), \tag{11}$$

where $g_{\lambda,s}(k)$ is the impulse response of length $L_G$ used by the reproduction system to obtain the contribution of source s to the loudspeaker signal λ.

The loudspeaker signals are then fed to the LEMS. The $N_M$ microphone signals are described by the vector d(n) which is given by $$d(n)=Hx(n), \tag{12a}$$

$$d(n)=(d_0^T(n),d_1^T(n), \ldots ,d_{N_M-1}^T) \tag{12b}$$

$$d_\mu(n)=(d_\mu(nL_B-L_B+1),d_\mu(nL_B-L_B+2), \ldots ,d_\mu(nL_B))^T,\quad \mu=0,1, \ldots ,N_M-1 \tag{12c}$$

where μ is the index of the microphone, $d_\mu(k)$ a time-domain sample of the microphone signal μ, and H describes the LEMS. The $L_B \cdot N_M \times L_X \cdot N_L$ matrix H is structured such that $$d_\mu(k) = \sum_{\lambda=1}^{N_L} \sum_{\kappa=0}^{L_H-1} x_\lambda(k-\kappa)h_{\mu,\lambda}(\kappa), \tag{13}$$

where $h_{\mu,\lambda}(k)$ is the discrete-time impulse response of the LEMS from loudspeaker b to microphone μ of length $L_H$. During double-talk, d(n) would also contain the signal of the local acoustic scene. From (9) to (13) follow $L_X \geq L_B+L_H-1$ and $L_S=L_X+L_G-1$ with the given lengths $L_G$, $L_H$, and $L_B$. The option to choose $L_X$ larger than $L_B+L_H-1$ is necessitated to maintain consistency in the notation within this paper.

Now, wave-domain signal representations are explained which are specific to WDAF. The tilde will be used to distinguish the wave-domain representations from others in this paper. From the loudspeaker signals we obtain the so-called free-field description $\tilde{x}(n)$ using transform $T_1$:

$$\tilde{x}(n)=T_1x(n). \tag{14a}$$

The vector $\tilde{x}(n)$ exhibits the same structure as x(n), replacing the segments $x_\lambda(n)$ by $\tilde{x}_l(n)$ and the components $x_\lambda(k)$ by $\tilde{x}_l(k)$ being the time-domain samples of the $N_L$ individual wave field components with the wave field component index l. From the microphone signals the so-called measured wave field will be obtained in the same way using transform $T_2$:

$$\tilde{d}(n)=T_2d(n). \tag{14b}$$

Here, $\tilde{d}(n)$ is structured like d(n) with the segments $d_\mu(n)$ replaced by $\tilde{d}_m(n)$ and the components $d_\mu(k)$ replaced by $d_m(k)$ denoting the time-domain samples of the $N_M$ individual wave field components of the measured wave field, indexed by m. The frequency-independent unitary transforms $T_1$ and $T_2$ will be derived [in Sec. III] *as described later*. Replacing them with identity matrices of the appropriate dimensions leads to the description of an MCAEC without a spatial transform as a special case of a WDAF AEC [15]. This type of AEC will be referred to as conventional AEC in the following.

In the wave domain, y(n) is obtained as an estimate for d(n) by using $$\tilde{y}(n)=\tilde{H}(n)\tilde{x}(n), \tag{14c}$$

where $\tilde{y}(n)$ is structured like d(n) and the $L_B \cdot N_M \times L_X \cdot N_L$ matrix $\tilde{H}(n)$ is a wave-domain estimate for H so that the time-domain samples comprised by $\tilde{y}(n)$ are given through $$\tilde{y}_m(k) = \sum_{l=1}^{N_L} \sum_{\kappa=0}^{L_H-1} \tilde{x}_l(k-\kappa)\tilde{h}_{m,l}(n,\kappa). \tag{14d}$$

Again, the vectors $\tilde{h}_{m,l}(k)$ describe impulse responses of length $L_H$ which are (in contrast to $h_{\mu,\lambda}(k)$) also dependent on the block index n. This is necessitated since later, an iterative update of those impulse responses will be described. Please note that $\tilde{h}_{m,l}(n,k)$ and $h_{\mu,\lambda}(k)$ are assumed to have the same length for the analysis conducted here. As a consequence, the effects of a possibly unmodeled impulse response tail [16] are not considered. Finally, the error in the wave domain can be defined by $$\tilde{e}(n)=\tilde{d}(n)-\tilde{y}(n), \tag{15}$$

which shares the structure with $\tilde{d}(n)$, comprising the segments $\tilde{e}_m(n)$. These signals can be transformed back to error signals compatible to the microphone signals d(n) by using $$e(n)=T_2^{-1}\tilde{e}(n). \tag{16}$$

An AEC aims for a minimization of the error e(n) with respect to a suitable norm. The most commonly used norm in this regard is the Euclidean norm $\|e(n)\|_2$. This motivated the choice of a unitary matrix $T_2$ leading to an equivalent error criterion in the wave domain and for the point observation signals, $\|e(n)\|_2=\|\tilde{e}(n)\|_2$. The so-called "Echo Return Loss Enhancement" (ERLE) provides a measure for the achieved echo cancellation. During inactivity of the local acoustic sources it can be defined by $$\mathrm{ERLE}(n) = 10\log_{10}\left(\frac{\|\tilde{d}(n)\|_2^2}{\|\tilde{e}(n)\|_2^2}\right) = 10\log_{10}\left(\frac{\|d(n)\|_2^2}{\|e(n)\|_2^2}\right). \tag{17}$$

Now the nonuniqueness problem for the MCAEC, which is already known from the stereophonic AEC will be shortly reviewed. After determining the conditions for the occurrence of the nonuniqueness problem, it will be explained why the residual echo is not the only important measure for an AEC and that the mismatch of the identified impulse responses to the true impulse responses of the LEMS has to be considered as well.

At first, the conditions for the occurrence of the nonuniqueness problem are determined by considering the idealized case of an AEC where the residual echo vanishes. By using (12a), (14a), (14b), and (15) the error may be written as $$\tilde{e}(n)=(T_2H-\tilde{H}(n)T_1)\times(n). \tag{18}$$

In the ideal case the LEMS can be perfectly modeled and local acoustic sources are inactive. As a consequence, an optimal solution in the sense of minimizing any norm $\|\tilde{e}(n)\|$ also achieves $\tilde{e}(n)=0$. Under these conditions, the nonuniqueness problem may be discussed independently from the algorithm used for system description.

If $\tilde{e}(n)=0$ is necessitated for all possible x(n), the unique solution $$\tilde{H}(n)T_1=T_2H, \tag{19}$$

is obtained, where $\tilde{H}(n)$ fully identifies the room described by H in the vector space spanned by $T_2$. This will be referred to as the perfect solution in the following, which can be identified in theory given the observed vectors d(n) for a sufficiently large set of linearly independent vectors x(n). However, according to (10a) x(n) originates from $\hat{x}(n)$, so that the set of observable vectors x(n) is limited by $G_{RS}$. Using (10a) and (18) we obtain $$\tilde{e}(n)=(T_2H-\tilde{H}(n)T_1)G_{RS}\tilde{x}(n), \tag{20}$$

so that necessitating $\tilde{e}(n)=0$ for all $\hat{x}(n)$ does no longer guarantee a unique solution for $\tilde{H}(n)$. In the following, conditions for nonunique solutions are investigated. Without loss of generality we may assume $L_B=1$ leading to $L_X=L_H$ for the remainder of this section, leaving no constraints on the structures of $\tilde{H}(n)$ and H(n). Obviously, the matrix $G_{RS}$ has a rank of $\min\{N_L \cdot L_H, N_S \cdot (L_H+L_G-1)\}$ when being full-rank, as we will assume in the following. Whenever this rank is less than the column dimension of the term $(T_2H-\tilde{H}(n)T_1)$, there are multiple solutions $(T_2H-\tilde{H}(n)T_1)\neq 0$ fulfilling $\tilde{e}(n)=0$, and the problem of identifying H is underdetermined. So the solution is only unique if $$N_L \cdot L_H \leq N_S \cdot (L_H+L_G-1). \tag{21}$$

It can be seen that the relation of the number of used loudspeakers and active signal sources is the most decisive property regarding the nonuniqueness problem. Whenever there are at least as many source signals as loudspeakers, e.g., $N_S \geq N_L$ the nonuniqueness problem does not occur. On the other hand, a long impulse response of the reproduction system may also prevent occurring the nonuniqueness problem. This result generalizes the results of Huang et al. [16] who analyzed the case $L_H=L_G$, $N_S=1$ for a least squares minimization of $\tilde{e}(n)$. For reproduction systems like WFS an $N_L \gg N_S$ and a limited $L_G$ are typical parameters, so the nonuniqueness problem is relevant in most practical situations.

Now, the consequences of the nonuniqueness problem are discussed. Since all solutions achieving $\tilde{e}(n)=0$ cancel the echo optimally, it is not immediately evident why obtaining a solution different from the perfect solution can be problematic. This changes, when regarding the reproduction system $G_{RS}$ as being time-variant in practice. As an example, consider a WFS system synthesizing a plane wave with a suddenly changing incidence angle, modeled by two different matrices $G_{RS}$, one for the first incidence angle and another for the second. When the problem of finding $\tilde{H}(n)$ is underdetermined, an adaptation algorithm will converge to one of many solutions for each of both $G_{RS}$. Without further objectives than minimizing $\tilde{e}(n)$, these solutions may be arbitrarily distinct to another. So a solution found for one $G_{RS}$ is not optimal for another $G_{RS}$ and an instantaneous breakdown in ERLE at the time instant of change is the consequence [5,11].

This breakdown in ERLE may become quite significant in practice. There, noise, interference, double-talk, an unsuitable choice of parameters, or an insufficient model will cause divergence. Consequently, the adaptation algorithm may be driven to virtually any of the possible solutions. As the solutions for $\tilde{H}(n)$ given a specific $G_{RS}$ do not form a bounded set whenever the nonuniqueness problem occurs, a solution for one $G_{RS}$ may be arbitrarily different to any of the solutions for another $G_{RS}$. This makes the breakdown in ERLE in fact uncontrollable and constitutes a major problem for the robustness of an MCAEC.

If the perfect solution is obtained, there will be no breakdown in ERLE for any change of $G_{RS}$, as this solution is independent from $G_{RS}$. This makes solutions in the vicinity of the perfect solution favorable in order to reduce the amount of ERLE loss following changes of $G_{RS}$. The normalized misalignment is a metric to determine the distance of a solution from the perfect solution given in (19). For the system described here, this measure can be formulated as follows:

$$\Delta_H(n) = 10\log_{10}\left(\frac{\|T_2H - \tilde{H}(n)T_1\|_F^2}{\|T_2H\|_F^2}\right), \tag{22}$$

where $\|\cdot\|_F$ stands for the Frobenius norm. The smaller the normalized misalignment, the smaller is the expected breakdown in ERLE when $G_{RS}$ changes. Still, the minimization of the error signal is the most important criterion regarding the perceived echo but, in order to increase the robustness of an AEC, minimization of normalized misalignment remains the ultimate goal. Since one cannot observe H, a direct minimization of the normalized misalignment is not possible. Hence, a method to heuristically minimize this distance is presented in this work.

By considering (20) we may calculate the number of singular values of $\tilde{H}(n)$ that can be uniquely determined necessitating $\tilde{e}(n)=0$ for a given number of sources $N_S$. Assuming all singular values of $\tilde{H}(n)$ to have an equal influence on $\Delta_H(n)$ and all non-unique values to be zero, a coarse approximation of the lower bound for the normalized misalignment can be obtained. From (20) and (22) we obtain $$\min\{\Delta_H(n)\} \approx 10\log_{10}\left(1 - \frac{N_S(L_H + L_G - 1)}{N_L L_H}\right) \tag{23}$$

given that the observed signals provide the only available information about the LEMS.

In the following, the wave-domain signal and system representations are provided. An explicit definition of the necessitated transforms is given and the exploited wave-domain properties of the LEMS are described.

At first, the wave-domain signal representations as key concepts of WDAF are presented. First the transforms to the wave domain will be introduced, so that we the properties of the LEMS in the wave domain can then be discussed. For the derivation of the transforms, we a fundamental solution of the wave equation will be used. Since this solution is given in the continuous frequency domain, compatibility to the discrete-time and discrete-frequency signal representations as described above should be achieved.

At first, the transforms of the point observation signals to the wave domain are derived. There are a variety of fundamental solutions of the wave equation available for the wave-domain signal representations. Some examples are plane waves [13], spherical harmonics, or cylindrical harmonics [18]. A choice can be made by considering the array setup, which is a concentric planar setup of two uniform circular arrays within this work, as it is depicted in FIG. 2. For this setup, the positions of the $N_L$ loudspeakers may be described in polar coordinates by a circle with radius $R_L$ and the angles determined by the loudspeaker index λ:

$$\vec{l}_\lambda = \left(\lambda \cdot \frac{2\pi}{N_L}, R_L\right)^T, \lambda = 0, \ldots, N_L - 1. \tag{24}$$

In the same way the positions of the $N_M$ microphones positioned on a circle with radius $R_M$ are given by $$\vec{m}_\mu = \left(\mu \cdot \frac{2\pi}{N_M}, R_M\right)^T, \mu = 0, \ldots, N_M - 1, \tag{25}$$

with the microphone index μ. Limiting the considerations to two dimensions, the sound pressure may be described in the vicinity of the microphone array using so-called circular harmonics [18]

$$P(\alpha, \varrho, j\omega) = \sum_{m'=-\infty}^{\infty} \left(\tilde{P}_{m'}^{(1)}(j\omega)\mathcal{H}_{m'}^{(1)}\left(\frac{\omega}{c}\varrho\right) + \tilde{P}_{m'}^{(2)}(j\omega)\mathcal{H}_{m'}^{(2)}\left(\frac{\omega}{c}\varrho\right)\right)e^{jm'\alpha}, \tag{26}$$

where $H_{m'}^{(1)}(x)$ and $H_{m'}^{(2)}(x)$ are Hankel functions of the first and second kind and order m, respectively, $\omega=2\pi f$ denotes the angular frequency, c is the speed of sound, j is used as the imaginary unit, and $\varrho$ and α describe a point in polar coordinates as shown in FIG. 2. We will refer to the wave field components indexed by m' in (26) et sqq. as modes. The quantities $\tilde{P}_{m'}^{(1)}(j\omega)$ and $\tilde{P}_{m'}^{(2)}(j\omega)$ may be interpreted as spectra of an incoming and an outgoing wave (relative to the origin). Assuming the absence of acoustic sources within the microphone array, $\tilde{P}_{m'}^{(2)}(j\omega)$ is determined by $\tilde{P}_{m'}^{(1)}(j\omega)$ and the scatterer within the microphone array. Consequently, we may limit our considerations to $\tilde{P}_{m'}^{(s)}(j\omega)$ describing the superposition of $\tilde{P}_{m'}^{(1)}(j\omega)$ and $\tilde{P}_{m'}^{(2)}(j\omega)$:

$$\tilde{P}_{m'}^{(s)}(j\omega)B_{m'}\left(\frac{\omega}{c}\varrho\right) = \tilde{P}_{m'}^{(1)}(j\omega)\mathcal{H}_{m'}^{(1)}\left(\frac{\omega}{c}\varrho\right) + P_{m'}^{(2)}(j\omega)\mathcal{H}_{m'}^{(2)}\left(\frac{\omega}{c}\varrho\right), \tag{27}$$

where $B_{m'}(x)$ is dependent on the scatterer within the microphone array. If no scatterer is present, $B_{m'}(x)$ is equal to the ordinary Bessel function of the first kind $J_m(x)$ of order m'. The solution for a cylindrical baffle can be found in [19].

Now, transform $T_2$ is explained in more detail. The transform $T_2$ is used to obtain a wave-domain description of the sound pressure measured by the microphones. Using (26) and (27) we obtain $\tilde{P}_{m'}^{(s)}(j\omega)$ as a Fourier series coefficient according to $$B_{m'}\left(\frac{\omega}{c}R_M\right)\tilde{P}_{m'}^{(s)}(j\omega) = \frac{1}{2\pi}\int_0^{2\pi} P(\alpha, R_M, j\omega)e^{jm'\alpha}d\alpha. \tag{28}$$

In contrast to Ref. 13, where sound velocity and sound pressure were used, we only need to consider the sound pressure on a circle for (28) as both, $\tilde{P}_{m'}^{(1)}(j\omega)$ and $\tilde{P}_{m'}^{(2)}(j\omega)$, are replaced by $\tilde{P}_{m'}^{(s)}(j\omega)$. However, we can only sample the wave field at the $N_M$ discrete points described by $\vec{m}_\mu$, so that we approximate the integral in (28) by a sum and obtain $$B_{m'}\left(\frac{\omega}{c}R_M\right)\tilde{P}_{m'}^{(s)}(j\omega) \approx \frac{1}{N_M}\sum_{\mu=0}^{N_M-1} \hat{P}_\mu^{(d)}(j\omega)e^{-jm'\mu\frac{2\pi}{N_M}}, \tag{29}$$

where $\tilde{P}_{\mu}^{(d)}(j\omega)$ denotes the spectrum of the sound pressure measured by microphone μ. The superscript (d) refers to d(n) [in Sec. II] as described later. We will use the right-hand side of (29) as the signal representation of the microphone signals in the wave domain and obtain $$\tilde{P}_{m'}^{(d)}(j\omega) := \frac{1}{N_M}\sum_{\mu=0}^{N_M-1}\hat{P}_{\mu}^{(d)}(j\omega)e^{-jm'\mu\frac{2\pi}{N_M}}, \tag{30}$$

which is referred as the measured wave field. The aliasing due to the spatial sampling as well as the term $$B_{m'}\left(\frac{\omega}{c}R_M\right)$$

is neglected in (30) as it will later be modeled by the wave-domain LEMS. Considering (30) as $T_2$, $T_2$ is equivalent to the spatial DFT and therefore unitary up to a scaling factor. Due to the spatial sampling, the sequence of modes $\tilde{P}_{m'}^{(d)}(j\omega)$ is periodic in m' with a period of $N_M$ orders, so that we can restrict our view to the modes $m'=-N_M/2+1, \ldots, N_M/2$ without loss of generality.

Now, transform $T_1$ is presented in more detail. The transform $T_1$ as derived in this section, is used to obtain a wave-domain description of the sound field at the position of the microphone array as it would be created by the loudspeakers under free-field conditions. One possibility to define $T_1$ is to simulate the free-field point-to-point propagation between loudspeakers and microphones and then transform the obtained signal according to $T_2$, as it was proposed in Ref. 13. This approach has the advantage to implicitly model the aliasing by the microphone array, but it has also some disadvantages: The number of resulting wave field components is limited by the number of microphones and not by the (typically higher) number of loudspeakers and the resulting transform is frequency dependent. As we aim at frequency-independent invertible transforms, we follow an alternative approach, where we determine the free-field wave field components excited by the loudspeakers at the microphone array circumference independently from the actual number of microphones. Unfortunately, determining the desired free-field sound pressure with the three-dimensional Green's function does not lead to a result that can be straightforwardly transformed using (28). So, we describe the sound pressure at the position of the microphones by approximating the wave propagation from the loudspeakers to the microphones in two stages: a three-dimensional wave propagation from the loudspeakers to the origin and a two-dimensional wave propagation along the microphone array located at the origin. As the Green's functions from the loudspeakers to the origin are not dependent on the microphone positions, the integral in (28) has only to be evaluated for the two-dimensional propagation along the microphone array, which is conveniently solvable.

The three-dimensional wave propagation from the individual loudspeaker positions to the center of the microphone array, e.g., the origin of the coordinate system, is described by the free-field Green's function [20]

$$G(\vec{0}\mid\vec{l}_\lambda) = \frac{e^{-jR_L\frac{\omega}{c}}}{R_L}. \tag{31}$$

For the two-dimensional wave-propagation along the microphone array the loudspeaker contributions are regarded as plane waves, which is valid if [21]

$$R_L > \frac{8R_M^2\omega}{2\pi c},\ R_M \ll R_L. \tag{32}$$

The propagation of a loudspeaker contribution along the microphone array is approximated as a plane wave propagation with the incidence angle φ and described by $$G_{PW}(\vec{x},\varphi,j\omega)=e^{-j\varrho\cos(\alpha-\varphi)\omega/c}. \tag{33}$$

Using $$\varphi = \lambda\cdot\frac{2\pi}{N_L},$$

the sound pressure $P(\alpha,R_M, j\omega)$ in the vicinity of the microphone array may be approximated by a superposition of plane waves $$P(\alpha, R_M, j\omega) \approx \sum_{\lambda=0}^{N_L-1}\hat{P}_{\lambda}^{(x)}(j\omega)\cdot G(\vec{0}\mid\vec{l}_\lambda, j\omega)\cdot G_{PW}\left(\vec{x}, \lambda\frac{2\pi}{N_L}, j\omega\right) \tag{34}$$

$$\approx \sum_{\lambda=0}^{N_L-1}\hat{P}_{\lambda}^{(x)}(j\omega)\frac{e^{j\left(R_M\cos\left(\alpha-\lambda\frac{2\pi}{N_L}\right)-R_L\right)\frac{\omega}{c}}}{R_L}, \tag{35}$$

where $\hat{P}_{\lambda}^{(x)}(j\omega)$ is the spectrum of the sound field emitted by loudspeaker λ and $\vec{x}=(\alpha, R_M)^T$. Again, the superscript (x) referring to x(n), as explained above, is used.

As we derive transform $T_1$ using the free-field assumption, $B_{m'}(x)=J_{m'}(x)$ holds for this derivation. We insert (35) into (28), replace the index m' by l' and use the Jacobi-Anger expansion [22] to derive $$\int_0^{2\pi} e^{jR_M\cos\left(\alpha-\lambda\frac{2\pi}{N_L}\right)\frac{\omega}{c}}e^{-jl'\alpha}d\alpha = \sum_{\nu=-\infty}^{\infty} j^{\nu}\mathcal{J}_{\nu}\left(R_M\frac{\omega}{c}\right)e^{-j\nu\lambda\frac{2\pi}{N_L}}\int_0^{2\pi}e^{j(\nu-l')\alpha}d\alpha,$$

which is used to transform (35) to the wave domain:

$$\tilde{P}_{l'}(j\omega) = j^{l'}\sum_{\lambda=0}^{N_L-1}\hat{P}_{\lambda}^{(x)}(j\omega)\frac{e^{-j\left(R_L\frac{\omega}{c}+l'\lambda\frac{2\pi}{N_L}\right)}}{R_L}. \tag{36}$$

The resulting $P_{l'}(j\omega)$ represents $P(\alpha,R_M, j\omega)$ in the wave-domain. According to (31), the wave propagation from the loudspeaker positions to the origin is identical for all loudspeakers, so we may leave it to be incorporated into the LEMS model. The same holds for the term $j^{l'}$, so that the spatial DFT for $T_1$ can be used:

$$\tilde{P}_{l'}^{(x)}(j\omega) := \sum_{\lambda=0}^{N_L-1}\hat{P}_{\lambda}^{(x)}(j\omega)e^{-jl'\lambda\frac{2\pi}{N_L}}, \tag{37}$$

where $\tilde{P}_{l'}^{(x)}(j\omega)$ is now the free-field description of the loudspeaker signals and l' denotes the mode order. Again, we limit our view to $N_L$ non-redundant components $l'=-(N_{L/2}-1), \ldots, N_L/2$ without loss of generality. When obtaining (30) from (29) and (37) from (36), we left the scattering at the microphone array, the delay and the attenuation to be described by the wave-domain LEMS model. For an AEC this is possible because a physical interpretation of the result of the system description is not needed. However, this assumption may change the properties of the LEMS modeled in the wave domain. Fortunately, for the considered array setup, the properties described later remain unchanged.

Now, the LEM System Model in the wave domain is explained. The attractive properties motivating the adaptive filtering in the wave domain are discussed in the following and are compared to the properties of the LEM model when considering the point observation signals. We model the LEMS, e.g., the coupling between the sound p(x) pressure emitted by the loudspeaker $\tilde{P}_{\lambda}^{(x)}(j\omega)$ and the sound pressure measured by the microphones $\tilde{P}_{\mu}^{(d)}(j\omega)$ $$\hat{P}_{\mu}^{(d)}(j\omega) = \sum_{\lambda=0}^{N_L-1} \hat{P}_{\lambda}^{(x)}(j\omega)H_{\mu,\lambda}(j\omega),\ \mu = 0, 1, \ldots, N_M - 1, \tag{38}$$

where $H_{\mu,\lambda}(j\omega)$ is equal to the Green's function between the respective loudspeaker and the microphone position fulfilling the boundary conditions determined by the enclosing room. Using (30) and (37), it is possible to describe (38) in the wave domain:

$$\tilde{P}_{m'}^{(d)}(j\omega) = \sum_{l'=N_L/2+1}^{N_L/2} \tilde{H}_{m',l'}(j\omega)\tilde{P}_{l'}^{(x)}(j\omega), \tag{39}$$

where $H_{m',l'}(j\omega)$ describes the coupling of mode l' in the free-field description and mode m' in the measured wave field. In the free field we would observe $\tilde{H}_{m',l'}(j\omega)\neq 0$ only for m'=l', but in a real room other couplings are expected.

While a conventional AEC aims to identify $H_{\mu,\lambda}(j\omega)$ directly, a WDAF AEC aims to identify $\tilde{H}_{m',l'}(j\omega)$ instead. Whenever identifying $H_{\mu,\lambda}(j\omega)$ does not lead to a unique solution, the same is the case for $\tilde{H}_{m',l'}(j\omega)$ regardless of the used transforms. However, while $H_{\mu,\lambda}(j\omega)$ and $\tilde{H}_{m',l'}(j\omega)$ are equally powerful in their ability to model the LEMS, their properties differ significantly. For illustration, a sample for $\tilde{H}_{\mu,\lambda}(j\omega)$ was obtained by measuring the frequency responses between loudspeakers and microphones located in a real room ($T_{60}\approx 0.25$ s) using the array setup depicted in FIG. 2 with $R_L$=1.5 m, $R_M$=0.05 m, $N_L$=48, $N_M$=10. From $H_{\mu,\lambda}(j\omega)$, $H_{\mu,\lambda}(j\omega)$ was calculated by using (30) and (37). The result is shown in FIG. 4, where it can be clearly seen that the couplings of different loudspeakers and microphones are similarly strong, while there are stronger couplings for modes with a small order difference |m'−l'| in their order. This can be explained by the fact that the wave field as excited by the loudspeakers in the free-field case is also the most dominant contribution to the wave field in a real room. This property may be observed for different LEMSs and was already used by the authors for a reduced complexity modeling of the LEMS [23]. It is proposed to exploit this property to improve the system description. As $\tilde{H}_{m',l'}(j\omega)$ has a reliably predictable structure, we may aim at a solution for the system description where the couplings of modes with a small difference |m'−l'| are stronger than others and reduce the mismatch in a heuristic sense. An adaptation algorithm approaching such a solution is presented later on.

Now, temporal Discretization and Approximation of the LEM System Model is explained. Compatibility between the continuous frequency-domain representations used above with the discrete quantities will be established. The quantities $\hat{P}_{\lambda}^{(x)}(j\omega)$ and $\hat{P}_{\mu}^{(d)}(j\omega)$ may be related to $x_{\lambda}(k)$ and $d_{\mu}(k)$ by a transform to the time domain and appropriate sampling with the sampling frequency $f_x$.

The mode order l' and m' in $\tilde{P}_{l'}^{(x)}(j\omega)$ and $\tilde{P}_{m'}^{(d)}(j\omega)$ may be mapped to the indices of the wave field components $\tilde{x}_l(n)$ and $\tilde{d}_m(n)$ through $$l' = \begin{cases} l & \text{for } l \leq N_L/2, \\ l - N_L & \text{elsewhere} \end{cases} \tag{40}$$

and $$m' = \begin{cases} m & \text{for } m \leq N_M/2, \\ m - N_M & \text{elsewhere.} \end{cases} \tag{41}$$

As the transforms $T_2$ and $T_1$ are frequency-independent, they may be directly applied to the loudspeaker and microphone signals resulting in the matrices $T_2$ and $T_1$ being equal to scaled DFT matrices with respect to the indices μ and λ:

$$[T_2]_{p,q} = \frac{d(p, q, L_D)}{\sqrt{N_M}} e^{-j\lfloor (p-1)/L_D \rfloor \lfloor (q-1)/L_D \rfloor \frac{2\pi}{N_M}}, \tag{42}$$

$$[T_1]_{p,q} = \frac{d(p, q, L_X)}{\sqrt{N_L}} e^{-j\lfloor (p-1)/L_X \rfloor \lfloor (q-1)/L_X \rfloor \frac{2\pi}{N_L}}, \tag{43}$$

where $[M]_{p,q}$ indexes an entry in M located in row p and column q and $$d(p, q, L) = \begin{cases} 1 & \text{if } \mathrm{mod}(p - q, L) = 0 \\ 0 & \text{elsewhere} \end{cases}. \tag{44}$$

The obtained discrete-time signal representations implicitly define discrete-time system representations. Here, $h_{\mu,\lambda}(k)$ and $\tilde{h}_{m',l'}(k)$ are the discrete-time representations of $H_{\mu,\lambda}(j\omega)$ and $\tilde{H}_{m',l'}(j\omega)$ respectively.

In the following, embodiments which employ adaptive filtering are provided. The proposed approach is realized by a modified version of the generalized frequency domain filtering (GFDAF) algorithm like it is described in [14]. At first, this algorithm will shortly be reviewed and then, and then, the modified version will be provided.

At first, GFDAF is explained in more detail. In [14] an efficient adaptation algorithm for the MCAEC was presented. This algorithm shows RLS-like properties and was also used as the basis for the derivation of the algorithm in [15]. For sake of clarity, this algorithm will be described operating on the signals $\tilde{e}_m(n)$ separately for each wave field component indexed by m, as separate and joint minimization of $\|\tilde{e}_m(n)\|_2^2 \forall m$ coincide [14]. It should be noted that we do not consider the modeled impulse responses to be partitioned as it was done in [14]since this is not necessitated to describe the proposed approach.

For the signals $\tilde{x}_l(n)$, $\tilde{e}_m(n)$, and $\tilde{d}_m(n)$ at first the DFT-domain representations are defined by $$\underline{\tilde{x}}_l(n)=F_{2L_B}\tilde{x}_l(n), \tag{45}$$

$$\underline{\tilde{e}}_m(n)=F_{L_B}\tilde{e}_m(n), \tag{46}$$

$$\underline{\tilde{d}}_m(n)=F_{L_B}\tilde{d}_m(n), \tag{47}$$

where $F_L$ is the L×L DFT matrix. It may further be necessitated that $L_X=2L_H$ and $L_B=L_H$. From the signal vector x(n) all wave field components l=0, 1, . . . , $N_L-1$ may be considered for the minimization of $\|\tilde{e}_m(n)\|_2$ for every m respectively.

$$\underline{X}(n)=(\mathrm{diag}\{\underline{\tilde{x}}_0(n)\},\mathrm{diag}\{\underline{\tilde{x}}_1(n)\},\ldots,\mathrm{diag}\{\underline{\tilde{x}}_{N_L-1}(n)\}). \tag{48}$$

For each component m, the error $\tilde{e}_m(n)$ is obtained, using the discrete representation $\underline{\tilde{h}}_m(n)$ of $h_{m,l}(n,k)$ for this particular m and all l:

$$\underline{\tilde{e}}_m(n)=\underline{\tilde{d}}_m(n)-\underline{W}_{01}\underline{X}(n)\underline{W}_{10}\underline{\tilde{h}}_m(n-1), \tag{49}$$

where we use the matrices $\underline{W}_{01}$ and $\underline{W}_{10}$ for the time-domain windowing of the signals:

$$\underline{W}_{01}=F_{L_B}(0_{L_B\times L_B},I_{L_B\times L_B})F_{2L_B}^{-1}, \tag{50}$$

$$\underline{W}_{10}=\mathrm{bdiag}^{N_L}\{F_{2L_B}(I_{L_B\times L_B},0_{L_B\times L_B})^T F_{L_B}^{-1}\}, \tag{51}$$

with the block-diagonal operator $\mathrm{bdiag}^N\{M\}$ forming a block-diagonal matrix with the matrix M repeated N times on its diagonal.

A matrix $\underline{\tilde{H}}(n)$ may be defined by the $N_M$ vectors $\underline{\tilde{h}}_0(n),\ldots,\underline{\tilde{h}}_m(n),\ldots,\underline{\tilde{h}}_{N_M-1}(n)$ which may form the columns of the matrix $\underline{\tilde{H}}(n)$. Thus, the matrix $\underline{\tilde{H}}(n)$ can be considered as a loudspeaker-enclosure-microphone system description of the loudspeaker-enclosure-microphone system description. Moreover, a pseudo-inverse matrix $\underline{H}^{-1}(n)$ of $\underline{\tilde{H}}(n)$ or the conjugate transpose matrix $\underline{H}^T(n)$ of $\underline{\tilde{H}}(n)$ may also be considered as a loudspeaker-enclosure-microphone system description of the LEMS.

The vector $\underline{\tilde{h}}_m(n)$ can be subdivided into $N_L$ parts $\underline{\tilde{h}}_m(n)=(\underline{\tilde{h}}_{m,l}(n),\underline{\tilde{h}}_{m,2}(n),\ldots,\underline{\tilde{h}}_{m,N_L}(n))^T$, where each vector $\underline{\tilde{h}}_{m,l}(n)$ contains the DFT-domain representation of $\tilde{h}_{m,l}(n,k)$.

Thus, the matrix $\underline{\tilde{H}}(n)$ may be considered to comprise a plurality of matrix coefficients $h_{0,1}(n,k)$, $h_{m,2}(n,k)$, . . . , $h_{m,N_L}(n,k)$ The minimization of the cost function $$J_m(n)=(1-\lambda_a)\sum_{i=0}^{n}\lambda_a^{n-i}\underline{\tilde{e}}_m^H(i)\underline{\tilde{e}}_m(i), \tag{52}$$

with $\cdot^H$ being the conjugate transpose leads to the following adaptation algorithm [14]

$$\underline{\tilde{h}}_m(n)=\underline{\tilde{h}}_m(n-1)+(1-\lambda_a)\underline{S}^{-1}(n)\underline{W}_{10}^H\underline{X}^H(n)\underline{W}_{01}^H\underline{\tilde{e}}_m(n) \tag{53}$$

with $$\underline{S}(n)=\lambda_a\underline{S}(n-1)+(1-\lambda_a)\underline{W}_{10}^H\underline{X}^H(n)\underline{W}_{01}^H\underline{W}_{01}\underline{X}(n)\underline{W}_{10}. \tag{54}$$

The described algorithm can be approximated such that $\underline{S}(n)$ is replaced by a sparse matrix which allows a frequency bin-wise inversion leading to a lower computational complexity [14].

For the scenarios considered here, the nonuniqueness problem will usually occur and there are multiple solutions for $\underline{\tilde{h}}_m(n)$ which minimize (52). Consequently, the matrix $\underline{S}(n)$ is singular and has to be regularized for invertibility. In [14], a regularization was proposed which maintains robustness of the algorithm in the case of insufficient power or inactivity of the individual loudspeaker signals. However, in the scenarios considered here, all wave field components are sufficiently exited and this regularization is not effective here. Instead, we propose a different regularization by defining the diagonal matrix $$\underline{D}(n)=\beta\mathrm{Diag}\{\sigma_0^2(n),\sigma_1^2(n),\ldots,\sigma_{L_H N_L-1}^2(n)\} \tag{55}$$

where β is a scale parameter for the regularization. The individual diagonal elements $\sigma_q^2(n)$ are determined such that they are equal to the arithmetic mean of all diagonal entries $s_p^2(n)$ of $\underline{S}(n)$ corresponding to the same frequency bin as $\sigma_q^2(n)$:

$$\sigma_q^2(n)=\frac{1}{N_L}\sum_{l=0}^{N_L-1}s_p^2(n),\ p=\mathrm{mod}(q,L_H)+L_H l, \tag{56}$$

where p and q index the diagonal entries starting with zero. The matrix $\underline{S}(n)$ in (53) is then replaced by $(\underline{S}(n)+\underline{D}(n))$.

In the following, the modified GFDAF according to embodiments is described. Modifications of the GFDAF according to embodiments are presented. These modifications exploit the diagonal dominance of $\tilde{H}_{m,l}(j\omega)$ discussed above. For the derivation, the cost function given in (52) is modified as follows $$J_m^{mod}(n)=\underline{\tilde{h}}_m(n)^H\underline{C}_m(n)\underline{\tilde{h}}_m(n)+(1-\lambda_a)\sum_{i=0}^{n}\lambda_a^{n-i}\underline{\tilde{e}}_m^H(i)\underline{\tilde{e}}_m(i), \tag{57}$$

where the matrix $\underline{C}_m(n)$ is chosen so that components in $\underline{\tilde{h}}_m(n)$ corresponding to non-dominant entries in $\tilde{H}(j,\omega)$ are more penalized than the others. By a derivation and by using $\underline{S}(n)+\underline{C}(n-1)\approx\underline{S}(n)+\underline{C}_m(n)$, the following adaptation rule is obtained for a minimization of this cost function $$\underline{\tilde{h}}_m=\underline{\tilde{h}}_m(n-1)+(1-\lambda_a)(\underline{S}(n)+\underline{C}_m(n))^{-1}\cdot(\underline{W}_{10}^H\underline{X}^H(n)\underline{W}_{01}^H\underline{\tilde{e}}_m(n)-\underline{C}_m(n)\underline{\tilde{h}}_m(n-1) \tag{58}$$

As for the original GFDAF, it is possible to formulate an approximation of this algorithm allowing a frequency bin-wise inversion of $(\underline{S}(n)+\underline{C}_m(n))$. The matrix $\underline{C}_m(n)$ is defined by $$\underline{C}_m(n)=\beta_0\omega_c(n)\mathrm{Diag}\{c_0(n),c_1(n),\ldots,c_{N_L L_H-1}(n)\} \tag{59}$$

with the scale parameter $\beta_0$, $$c_q(n)=\begin{cases}\beta_1 & \text{when } \Delta m(q)=0,\\ \beta_2 & \text{when } \Delta m(q)=1,\\ 1 & \text{elsewhere,}\end{cases} \tag{60}$$

and the weighting function $\omega_c(n)$ explained later, where $$\Delta m(q)=\min(|\lfloor q/L_H\rfloor-m,|\lfloor q/L_H\rfloor-m-N_L|) \tag{61}$$

is the difference of the mode orders |m'−l'| for the couplings described by $\underline{\tilde{h}}_m(n)$.

Thus, each $c_q(n)$ forms a coupling value for a mode-order pair of a loudspeaker-signal-transformation mode order $(q/L_H)$ of the plurality of loudspeaker-signal-transformation mode orders and a first microphone-signal-transformation mode order (m) of the plurality of microphone-signal-transformation mode orders.

The coupling value $c_q(n)$ has a first value $\beta_1$, when the difference between the first loudspeaker-signal-transformation mode order l ($l=\lfloor q/L_H \rfloor$) and the first microphone-signal-transformation mode order m has a first difference value ($\Delta m(q)=0$).

The coupling value $c_q(n)$ has a second value $\beta_2$ different from the first value $\beta_1$, when the difference between the first loudspeaker-signal-transformation mode order ($l=\lfloor q/L_H \rfloor$) and the first microphone-signal-transformation mode order m has a different second difference value ($\Delta m(q)=1$).

In order to exploit the property of stronger weighted mode couplings for a small $|m-l|$, the parameters $\beta^1$ and $\beta_2$ may be chosen inversely to the expected weights for the individual $\underline{\tilde{h}}_{m,l}(n)$, leading to $0 \le \beta_1 \le \beta_2 \le 1$. This choice guides the adaptation algorithm towards identifying a LEMS with mode couplings weighted as shown in FIG. 4. The strength of this non-restrictive constraint may be controlled by the choice of $0 \le \beta_0$. However, given $\underline{C}_m(n) \neq 0$ a minimization of (57) does not lead to a minimization of (52), which is still the main objective of an AEC. Therefore we introduced the weighting function $$w_c(n) = \frac{\sum_{m=0}^{N_M-1} J_m(n-1)}{\max\left\{\sum_{m=0}^{N_M-1} \underline{\tilde{h}}_m^H(n-1)\underline{\tilde{h}}_m(n-1),\ 1\right\}} \tag{62}$$

to ensure an approximate balance of both terms in (57), so that the costs introduced by $\underline{C}_m(n)$ do not hamper the steady state minimization of (52).

The plurality of vectors $\underline{\tilde{h}}_0(n), \ldots, \underline{\tilde{h}}_m(n), \ldots, \underline{\tilde{h}}_{N_M}{}^{-1}(n)$ may be considered as a loudspeaker-enclosure-microphone system description of the loudspeaker-enclosure-microphone system description.

As has been explained above, an adaptation rule for adapting a LEMS description according to an embodiment, e.g. the adaptation rule provided in formula (58) can be derived from a modified cost function, e.g. from the modified cost function of formula (57). For this purpose, the gradient of the modified cost function may be set to zero and the adapted LEMS description is determined such that:

$$\frac{\partial}{\partial \underline{\tilde{h}}_m^H} J_m^{mod2}(n) \stackrel{!}{=} 0 \tag{63}$$

The procedure is to consider the complex gradient of the modified cost function and determine filter coefficients so that this gradient is zero. Consequently, the filter coefficients minimize the modified cost function.

This will now be explained in detail with reference to the modified cost function of formula (57) and the adaptation rule of formula (58) as an example. For this purpose, the complete derivation from (57) to (58) is provided, which is similar to the derivation of the GFDAF in [14]. As already stated above, the procedure followed here is to consider the complex gradient of (57) and determine filter coefficients so that this gradient is zero. Consequently, the filter coefficients minimize the cost function (57).

It should be noted that we exchanged $\lambda_a$ for $\lambda$ in order to increase the readability of the document. The remaining notation is identical to formulae (57) and (58) and all undefined quantities refer to those used there. Starting with formula (57) as $$J_m^{mod}(n) = \underline{\tilde{h}}_m^H(n)\underline{C}_m(n)\underline{\tilde{h}}_m(n) + (1-\lambda)\sum_{i=0}^{n} \lambda^{n-i}\underline{\tilde{e}}_m^H(i)\underline{\tilde{e}}_m(i), \tag{64}$$

the error $\underline{\tilde{e}}_m(n)$ is replaced by the error $\underline{\hat{e}}_m(n)$ if the filter coefficients $\underline{\hat{h}}_m$ would be used (which have to be determined) for all previous input signals. So a slightly modified cost function $$J_m^{mod2}(n) = \underline{\tilde{h}}_m^H C_m(n)\underline{\tilde{h}}_m + (1-\lambda)\sum_{i=0}^{n} \lambda^{n-i}\underline{\tilde{e}}_m^H(i)\underline{\tilde{e}}_m(i) \tag{65}$$

is obtained with $$\underline{\tilde{e}}_m(n) = \underline{\tilde{d}}_m(n) - \underline{W}_{01}\underline{X}(n)\underline{W}_{10}\underline{\tilde{h}}_m, \tag{66}$$

in contrast to formula (49) which is $$\underline{\tilde{e}}_m(n) = \underline{\tilde{d}}_m(n) - \underline{W}_{01}\underline{X}(n)\underline{W}_{10}\underline{\tilde{h}}_m(n-1). \tag{67}$$

This distinction is recommended to avoid ambiguities regarding the not perfectly consistent notation in [14]. Inserting (38) into (37), we obtain $$\begin{aligned} J_m^{mod2}(n) &= \underline{\tilde{h}}_m^H \underline{C}_m \underline{\tilde{h}}_m + \\ &\quad (1-\lambda)\sum_{i=0}^{n} \lambda^{n-i}\left(\underline{\tilde{d}}_m(i) - \underline{W}_{01}\underline{X}(i)\underline{W}_{10}\underline{\tilde{h}}_m\right)^H \cdot \\ &\quad \left(\underline{\tilde{d}}_m(i) - \underline{W}_{01}\underline{X}(i)\underline{W}_{10}\underline{\tilde{h}}_m\right), \\ &= \underline{\tilde{h}}_m^H \underline{C}_m(n)\underline{\tilde{h}}_m + \\ &\quad (1-\lambda)\sum_{i=0}^{n} \lambda^{n-i}\left(\underline{\tilde{d}}_m^H(i)\underline{\tilde{d}}_m(i) - \underline{\tilde{h}}_m^H(i)\underline{W}_{10}^H\underline{X}^H(i)\underline{W}_{01}^H\underline{\tilde{d}}_m(i) - \right. \\ &\quad \underline{\tilde{d}}_m^H(i)\underline{W}_{01}\underline{X}(i)\underline{W}_{10}\underline{\tilde{h}}_m + \\ &\quad \left.\underline{\tilde{h}}_m^H(i)\underline{W}_{10}^H\underline{X}^H(i)\underline{W}_{01}^H\underline{W}_{01}\underline{X}(i)\underline{W}_{10}\underline{\tilde{h}}_m\right) \end{aligned} \tag{68}$$

as function to be minimized by $\underline{\tilde{h}}_m$. The complex gradient of (40) with respect to $\underline{\tilde{h}}_m{}^H$ is given by $$\begin{aligned} \frac{\partial}{\partial \underline{\tilde{h}}_m^H} J_m^{mod2}(n) &= \underline{C}_m(n)\underline{\tilde{h}}_m + (1-\lambda) \\ &\quad \sum_{i=0}^{n} \lambda^{n-i}\left(-\underline{W}_{10}^H\underline{X}^H(i)\underline{W}_{01}^H\underline{\tilde{d}}_m(i) + \underline{W}_{10}^H\underline{X}^H(i)\underline{W}_{01}^H\underline{W}_{01}\underline{X}(i)\underline{W}_{10}\underline{\tilde{h}}_m\right) \end{aligned} \tag{69}$$

Necessitating $$\frac{\partial}{\partial \underline{\tilde{h}}_m^H} J_m^{mod2}(n) \stackrel{!}{=} 0 \tag{70}$$

can be used to determine $\hat{\underline{h}}_m$ such that $J_m^{mod2}(n)$ is minimized. Defining $$\underline{S}(n) = (1-\lambda)\sum_{i=0}^{n}\lambda^{n-i}\underline{W}_{10}^H\underline{X}^H(i)\underline{W}_{01}^H\underline{W}_{01}\underline{X}(i)\underline{W}_{10} = \lambda\underline{S}(n-1) + (1-\lambda)\underline{W}_{10}^H\underline{X}^H(n)\underline{W}_{01}^H\underline{W}_{01}\underline{X}(n)\underline{W}_{10} \tag{71}$$

and $$\underline{s}_m(n) = (1-\lambda)\sum_{i=0}^{n}\lambda^{n-i}\underline{W}_{10}^H\underline{X}^H(i)\underline{W}_{01}^H\tilde{\underline{d}}_m(i) = \lambda\underline{s}_m(n-1) + (1-\lambda)\underline{W}_{10}^H\underline{X}^H(n)\underline{W}_{01}^H\tilde{\underline{d}}_m(n) \tag{72}$$

we may additionally consider (41) and (42) to write $$(\underline{S}(n)+\underline{C}_m(n))\tilde{\underline{h}}_m=\underline{s}_m(n). \tag{73}$$

Now, we assume we have obtained a solution $\tilde{\underline{h}}_m(n-1)$ for $\tilde{\underline{h}}_m$ in the previous iteration which fulfills $$(\underline{S}(n-1)+\underline{C}_m(n-1))\tilde{\underline{h}}_m(n-1)=\underline{s}_m(n-1). \tag{74}$$

and we want to obtain $\tilde{\underline{h}}_m(n)$ such that
Replacing $\underline{s}_m(n)$ and $\underline{s}_m(n-1)$ in (44) by $(\underline{S}(n)+\underline{C}_m(n))\tilde{\underline{h}}_m(n)$ and $(\underline{S}(n-1)+\tilde{C}_m(n-1))\underline{h}_m(n-1)$ respectively, we obtain $$\tilde{\underline{s}}_m(n)=\lambda\tilde{\underline{s}}_m(n-1)-(1-\lambda)\underline{W}_{01}^H\underline{X}^H(n)\underline{W}_{10}^H\tilde{\underline{d}}_m \tag{76}$$

$$(\underline{S}(n)+\underline{C}_m(n)\tilde{\underline{h}}_m(n)=\lambda\underline{S}(n-1)\tilde{\underline{h}}_m(n-1)+\lambda\underline{C}_m(n-1)\tilde{\underline{h}}_m(n-1)+(1-\lambda)\underline{W}_{10}^H\underline{X}^H(n)\underline{W}_{01}^H\tilde{\underline{d}}_m(n) \tag{77}$$

replacing $\lambda\underline{S}(n-1)$ by reformulating (43) to $$\underline{S}(n)-(1-\lambda)\underline{W}_{10}^H\underline{X}^H(n)\underline{W}_{01}^H\underline{W}_{01}\underline{X}(n)\underline{W}_{10}=\lambda\underline{S}(n-1) \tag{78}$$

and by this formula (79) is obtained $$(\underline{S}(n)+\underline{C}_m(n))\tilde{\underline{h}}_m(n)=\underline{S}(n)\tilde{\underline{h}}_m(n-1)+\lambda\underline{C}_m(n-1)\tilde{\underline{h}}_m(n-1)-(1-\lambda)\underline{W}_{10}^H\underline{X}^H(n)\underline{W}_{01}^H\underline{W}_{01}\underline{X}(n)\underline{W}_{10}\tilde{\underline{h}}_m(n-1)+(1-\lambda)\underline{W}_{10}^H\underline{X}^H(n)\underline{W}_{01}^H\tilde{\underline{d}}_m(n) \tag{79}$$

with adding $0=\underline{C}_m(n-1)\tilde{\underline{h}}_m(n-1)-\underline{C}_m(n-1)\tilde{h}_m(n-1)$, we may write $$\begin{aligned}(\underline{S}(n)+\underline{C}_m(n))\tilde{\underline{h}}_m(n)&=(\underline{S}(n)+\underline{C}_m(n-1))\tilde{\underline{h}}_m(n-1)-(1-\lambda)\\ &\underline{C}_m(n-1)\tilde{\underline{h}}_m(n-1)-(1-\lambda)\underline{W}_{10}^H\underline{X}^H(n)\underline{W}_{01}^H\underline{W}_{01}\\ &\underline{X}(n)\underline{W}_{10}\tilde{\underline{h}}_m(n-1)+(1-\lambda)\underline{W}_{10}^H\underline{X}^H(n)\underline{W}_{01}^H\\ &\tilde{\underline{d}}_m(n)=(\underline{S}(n)+\underline{C}_m(n-1))\tilde{\underline{h}}_m(n-1)+(1-\lambda)(\underline{W}_{10}^H\\ &\underline{X}^H(n)\underline{W}_{01}^H\tilde{\underline{d}}_m(n)-\underline{W}_{10}^H\underline{X}^H(n)\underline{W}_{01}^H\underline{W}_{01}\underline{X}(n)\\ &\underline{W}_{10}\tilde{\underline{h}}_m(n-1)-\underline{C}_m(n-1)\tilde{\underline{h}}_m(n-1))\end{aligned} \tag{80}$$

using $$\underline{W}_{10}^H\underline{X}^H(n)\underline{W}_{01}^H\tilde{\underline{e}}_m(n)=\underline{W}_{10}^H\underline{X}^H(n)\underline{W}_{01}^H\tilde{\underline{d}}_m(n)-\underline{W}_{10}^H\underline{X}^H(n)\underline{W}_{01}^H\underline{W}_{01}\underline{X}(n)\underline{W}_{10}\tilde{\underline{h}}_m(n-1) \tag{81}$$

and formula (39), we obtain $$(\underline{S}(n)+\underline{C}_m(n))\tilde{\underline{h}}_m(n)=(\underline{S}(n)+\underline{C}_m(n-1)\tilde{\underline{h}}_m(n-1)+(1-\lambda)(\underline{W}_{10}^H\underline{X}^H(n)\underline{W}_{01}^H\tilde{\underline{e}}_m(n)-\underline{C}_m(n-1)\tilde{\underline{h}}_m(n-1)) \tag{82}$$

and using $\underline{S}(n)+\underline{C}_m(n)\approx\underline{S}(n)+\underline{C}_m(n-1)$, finally $$\tilde{\underline{h}}_m(n)=\tilde{\underline{h}}_m(n-1)+(1-\lambda)(\underline{S}(n)+\underline{C}_m(n))^{-1}\cdot(\underline{W}_{10}^H\underline{X}^H(n)\underline{W}_{01}^H\tilde{\underline{e}}_m(n)-\underline{C}_m(n-1)\tilde{\underline{h}}_m(n-1)) \tag{83}$$

Some of the above-described embodiments provide a loudspeaker-enclosure-microphone system description based on determining an error signal e(n).

Another embodiment, however, provides a loudspeaker-enclosure-microphone system description without determining an error signal.

Considering formula (71) and (72), we may reformulate (73) so that we can obtain the filter coefficients $\tilde{\underline{h}}_m$ without determining an error signal by using $$\tilde{\underline{h}}_m(n)=(\underline{S}(n)+\underline{C}_m(n))^{-1}\underline{s}_m(n) \tag{84}$$

The loudspeaker-enclosure-microphone system description provided by one of the above-described embodiments can be employed for various applications. For example, the loudspeaker-enclosure-microphone system description may be employed for listening room equalization (LRE), for acoustic echo cancellation (AEC) or, e.g. for active noise control (ANC).

At first, it is explained how to employ the above-described embodiments for acoustic echo cancellation (AEC).

The application of the above-described embodiments for AEC has already been described above. For example, in FIG. 3, an error signal e(n) is output as the result of the apparatus. This error signal e(n) is the time-domain error signal of the wave-domain error signal $\tilde{e}(n)$. $\tilde{e}(n)$ itself depends on $\tilde{d}(n)$ being the wave-domain representation of the recorded microphone signals and $\tilde{y}(n)$ being the wave-domain microphone signal estimate. The wave-domain microphone signal estimate $\tilde{y}(n)$ itself may be provided by the system description application unit 150 which generates the wave-domain microphone signal estimate $\tilde{y}(n)$ based on the loudspeaker-enclosure-microphone system description $\tilde{\underline{h}}_0(n), \ldots, \tilde{\underline{h}}_m(n), \ldots, \tilde{\underline{h}}_{N_M-1}(n)$.

If, for example, a speaker, which represents a local source, is located inside a LEMS, then the voices produced by the speaker will not be compensated and still remain in the error signal e(n). All other sounds, however, should be compensated/cancelled in the error signal e(n). Thus, the error signal e(n) represents the voices produced by a local source inside the LEMS, e.g. a speaker, but without any acoustic echos, because these echos have already been cancelled by forming the difference between the actual microphone signals $\tilde{d}(n)$ and the microphone signal estimation $\tilde{y}(n)$ Thus, the quantity e(n) already describes the echo compensated signal.

In the following, the application of the above-described embodiments for active noise control (ANC) is explained.

The application of state-of-the-art WDAF for ANC has already been presented in [15], but in [15], a very limited wave-domain model was used, for which the nonuniqueness problem does not occur. No measures to improve the robustness in the presence of the nonuniqueness problem were presented.

Here, we describe a conventional ANC system in order to point out that the application of this invention is not limited to systems working in the wave domain, although an integration in such a system would be a natural choice. Please note that although the filters for noise cancellation are determined according to a conventional model, the system identification is conducted in the wave domain.

Figure 6A:
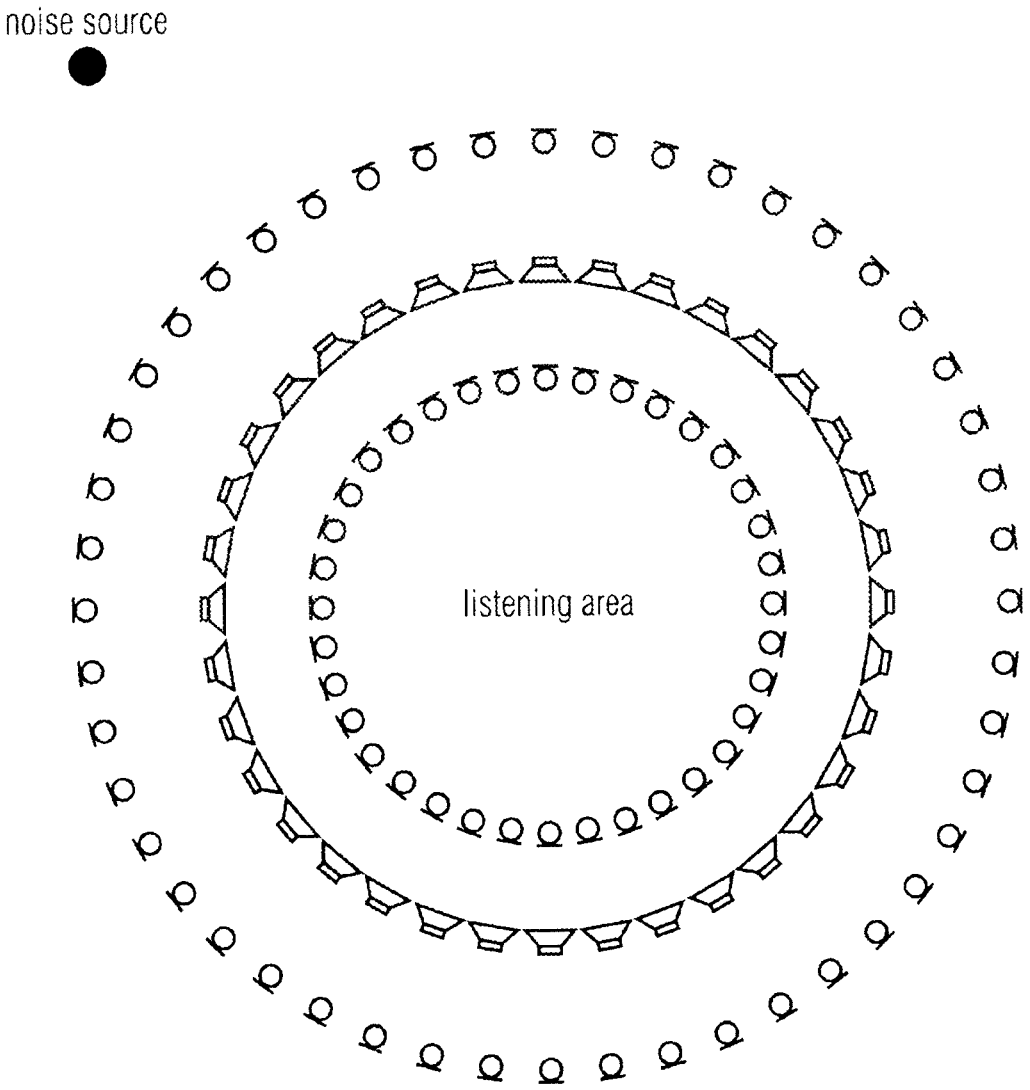
FIG. 6a shows an exemplary loudspeaker and microphone setup used for ANC according to an embodiment.

FIG. 6a shows an exemplary loudspeaker and microphone setup used for ANC. The outer microphone array is termed reference array, the inner microphone array is termed error array. In FIG. 6a, a noise source is depicted emitting a sound field which should ideally be cancelled within the listening area. As the signal of the noise source is unknown, it has to be measured. To this end, an additional microphone array outside the loudspeaker array is needed in addition to the previously considered array setup. This array is referred to as the reference array, while the microphone array inside the loudspeaker array is referred to as the error array.

Figure 6B:
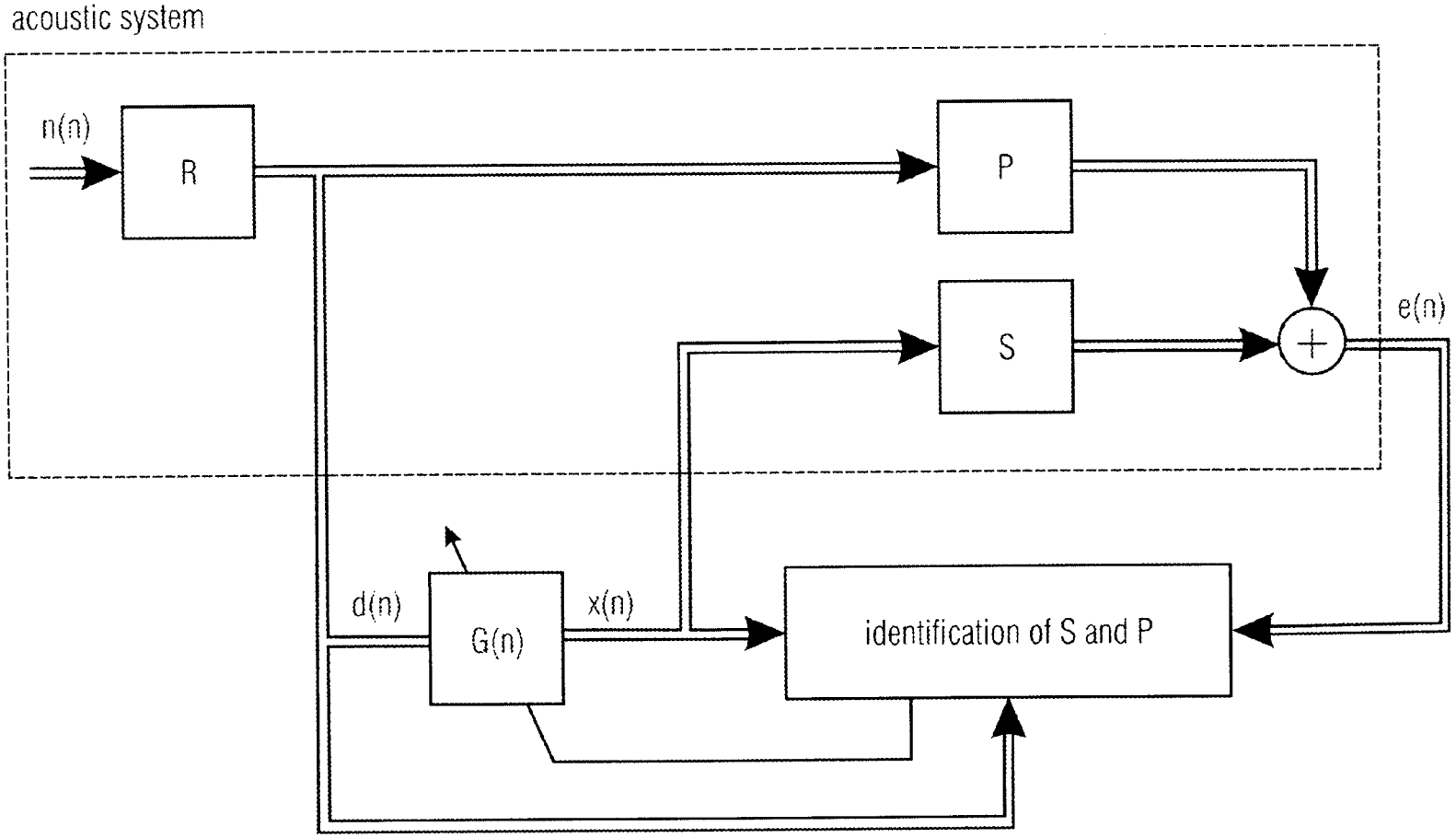
FIG. 6b illustrates a block diagram of an ANC system according to an embodiment.

FIG. 6b illustrates a block diagram of an ANC system. R represents sound propagation from the noise sources to the reference array. G(n) represents prefilters to facilitate ANC. P illustrates the sound propagation from the reference array to the error array (primary path), and S is the sound propagation from the loudspeakers to the error array (secondary path).

In FIG. 6b, the unknown signal of the $N_R$ microphones of the reference array is described by $$d(n)=Rn(n) \tag{85}$$

using the previously introduced vector and matrix notation. Here, d(n) describes the signal we can obtain from the reference array. This signal is filtered according to $$x(n)=G(n)d(n) \tag{86}$$

to obtain the $N_L$ loudspeaker signals x(n), which are then emitted by the loudspeaker array to cancel the noise signal. To ensure a cancellation, the $N_E$ signals from the error array are considered, which capture the superposition $$e(n)=Pd(n)+Sx(n), \tag{87}$$

where the matrix P describes the propagation of the noise from the reference array to the error array and is referred to as the primary path. The matrix S describes the secondary path from the loudspeakers to the error array. For ANC, G(n) is ideally determined in a way such that $$-SG(n)=P \tag{88}$$

so the error signal e(n) vanishes. Since the MIMO impulse responses P and S are in general unknown and may also change over time, both have to be identified. So we consider the identified systems $\hat{S}(n)$ and $\hat{P}(n)$ to obtain G(n) such that $$-\hat{S}(n)G(n)=\hat{P}(n) \tag{89}$$

Typically, there are less noise sources than reference microphones ($N_S<N_R$), so the nonuniqueness problem does occur for the identification of P. This is equivalent to the considered AEC scenario in the prototype description with n(n) in the role of $\hat{x}(n)$ and R in the role of $G_{RS}$ and P in the role of H. Moreover, there is typically also no unique solution for the identification of S, as there are typically more loudspeakers than noise sources ($N_S<N_L$) and x(n) only describes the filtered signals of the noise sources. Obviously, the invention can be used to improve the identification of P and S, which would then increase the robustness of the ANC system. This can be done by obtaining wave-domain identifications $\hat{P}(n)$ and $\hat{S}(n)$ of P and S, which are then transformed to their representation in the conventional domain by $$\hat{P}(n)=T_1\tilde{P}(n)T_2^{-1} \tag{90}$$

$$\hat{S}(n)=T_3\tilde{P}(n)T_2^{-1} \tag{91}$$

with $T_1$ being the transform of the reference signals d(n) to the wave domain and $T_3$ being the transform of the loudspeaker signals x(n) to the wave domain. Given that the error signals e(n) are transformed to the wave domain by $T_2$, $T_2^{-1}$, describes the inverse of this transform or an appropriate approximation.

In the following, listening room equalization is considered. Here, the embodiments for providing a loudspeaker-enclosure-microphone system description may be employed for improving a wave field synthesis (WFS) reproduction by being part of a listening room equalization (LRE) system. WFS (see, e.g. [1]) is used to achieve a highly detailed spatial reproduction of an acoustic scene overcoming the limitations of a sweet spot by using an array of typically several tens to hundreds of loudspeakers. The loudspeaker signals for WFS are usually determined assuming free-field conditions. As a consequence, an enclosing room shall not exhibit significant wall reflections to avoid a distortion of the synthesized wave field.

In a lot of application scenarios, the necessitated acoustic treatment to achieve such room properties may be too expensive or impractical. An alternative to acoustical countermeasures is to compensate for the wall reflections by means of a listening room equalization (LRE), often termed listening room compensation. To this end, the reproduction signals are filtered to pre-equalize the MIMO room system response from the loudspeakers to the positions of multiple microphones, ideally achieving an equalization at any point in the listening area. The equalizers are determined according to the impulse responses for each loudspeaker-microphone path. As the MIMO loudspeaker-enclosure-microphone system (LEMS) is expected to change over time, it has to be continuously identified by adaptive filtering. The task of LRE has often been addressed in the literature. However, systems relying on a system identification of the LEMS have barely been investigated, notably because of the nonuniqueness problem. Employing a loudspeaker-enclosure microphone system description provided according to one of the above-described embodiments can significantly improve the system identification and therefore also the equalization results.

The above-described embodiments may also be employed together with any conventional LRE system. The above-described embodiments are not limited to loudspeaker-enclosure-microphone systems working in the wave domain, although such using the above-described embodiments with such loudspeaker-enclosure-microphone systems is of advantage. It should be noted that although the equalizers are determined according to a conventional model, in the following, the system identification is considered to be conducted in the wave domain.

In the following, a description of a LRE system according to an embodiment is provided. Inter alia, the integration of the invention in an LRE system is explained. For this purpose, reference is made to FIG. 6c.

Figure 6C:
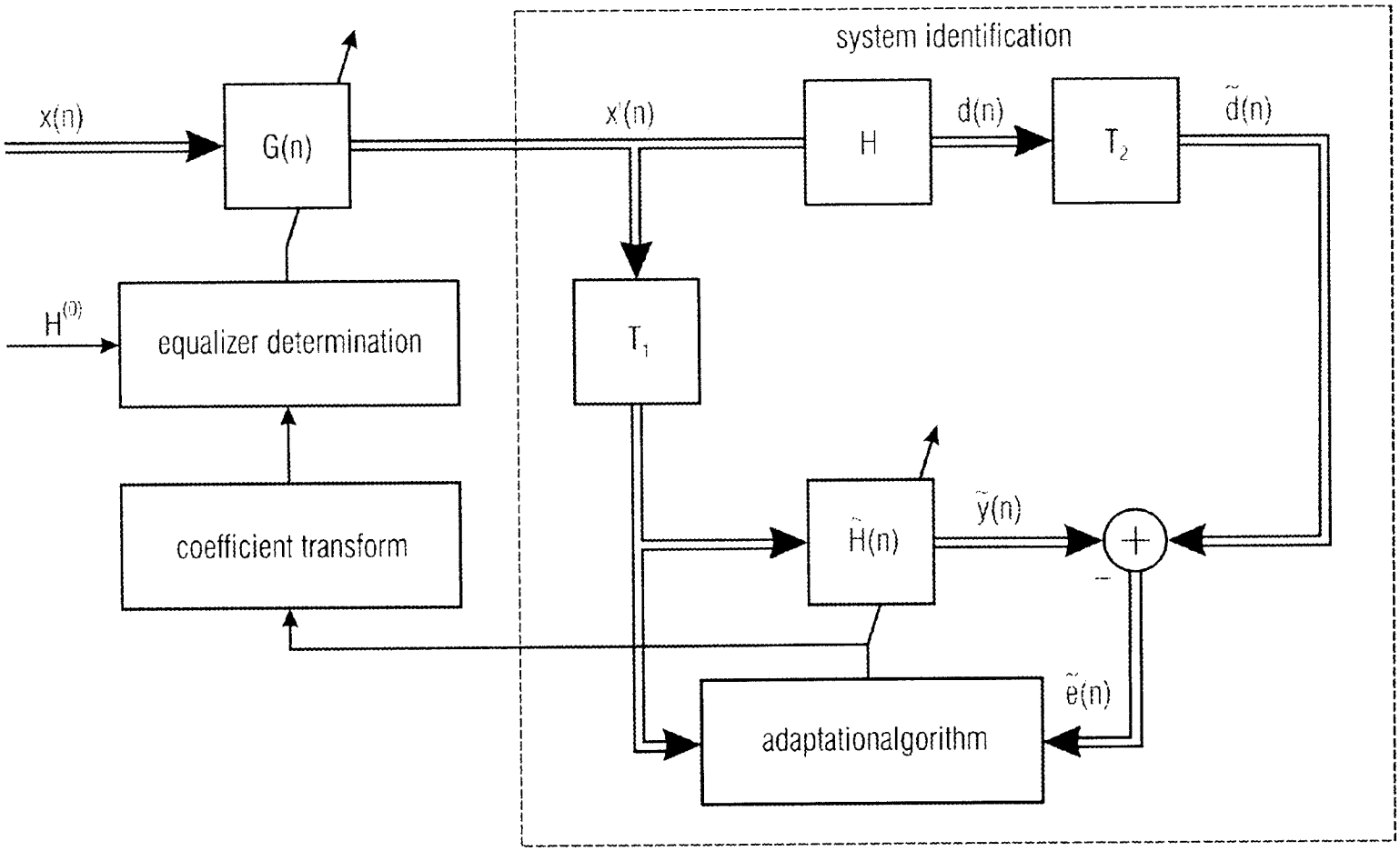
FIG. 6c illustrates a block diagram of an LRE system according to an embodiment.

FIG. 6c illustrates a block diagram of an LRE system. $T_1$ and $T_2$ depict transforms to the wave domain. G(n) depict equalizer. H shows the LEMS. $\tilde{H}(n)$ illustrates the identified LEMS and $H^{(O)}$ depicts the desired impulse response.

In the embodiment of FIG. 6c, an original loudspeaker signal x(n) is equalized such that an equalized loudspeaker signal x'(n) is obtained according to $$x'(n)=G(n)x(n), \tag{92}$$

where $$x'(n)=((x'_0(n))^T,(x'_1(n))^T, \ldots ,(x'_{N_L-1}(n))^T)^T \tag{93}$$

with the components $$x'_{\lambda'}(n)=((x'_{\lambda'}(nL_F-L_X+1),x'_{\lambda'}(nL_F-L_X+2), \ldots ,x'_{\lambda'}(nL_F))^T \tag{94}$$

capturing $L'_X$ time samples $x'_{\lambda'}(k)$ of the equalized loudspeaker signal λ' at time instant k.

Similarly, x(n) is defined as:

$$x(n)=((x_0(n))^T,(x_1(n))^T, \ldots ,(x_{N_L-1}(n))^T)^T \tag{95}$$

with the components $$x_\lambda(x_\lambda(nL_F-L_X+1),x_\lambda(nL_F-L_X+2) \ldots ,x(nL_F) \tag{96}$$

capturing $L_X \leq L'_X$ by time samples $x_\lambda(k)$ of the unequalized loudspeaker signal k at time instant k.

The matrix G(n) is structured such that it describes a convolution operation according to $$x'_{\lambda'}(n) = \sum_{\lambda=0}^{N_L-1} \sum_{\kappa=0}^{L_H-1} x_\lambda(k-\kappa) g_{\lambda',\lambda}(\kappa, n), \tag{97}$$

where $g_{\lambda',\lambda}(k,n)$ is the equalizer impulse response from the original loudspeaker signal λ to the equalized loudspeaker signal λ'. The matrix and vector notation above acts as a prototype for all considered system and signal descriptions. Although the dimensions of other signal vectors and system matrices may differ, the underlying structure remains the same.

Ideally, an LRE system achieves equalizers such that $$H^{(0)}=HG(n), \tag{98}$$

where $H^{(0)}$ is the desired free field impulse response between the loudspeakers and the microphone. As the true LEMS impulse responses H are usually not known, this is achieved for the identified system $\hat{H}(n)$ such that $$\hat{H}(n)G(n)=H^{(0)}, \tag{99}$$

where we assume a coefficient transform according to $$\hat{H}(n)=T_1\hat{H}(n)T_2^{-1} \tag{100}$$

with $T_1$ being the transform of the equalized loudspeaker signals to the wave domain and $T_2^{-1}$ being the matrix formulation of the appropriate inverse transform of $T_2$, which transforms the microphone signals to the wave domain.

As $\hat{H}(n)$ is the identified system, there may be indefinitely many solutions for $\hat{H}(n)$ for a given LEMS H, depending on the correlation properties of the loudspeaker signals. As the solution for G(n) according to (99) depends on $\hat{H}(n)$ and the set of possible solutions for $\hat{H}(n)$ can vary with changing correlation properties of the loudspeaker signals, an LRE system shows a very poor robustness against the nonuniqueness problem. At this point, the proposed invention can improve the system identification and therefore also the robustness of the LRE.

In the following, a description of two algorithms to obtain G(n) from $\hat{H}(n)$ and $H^{(0)}$ is provided. At first, however, the LRE signal model referred to for the description of the two algorithms is described. In particular, the signal model of a multichannel LRE system is explained considering FIG. 6d.

Figure 6D:
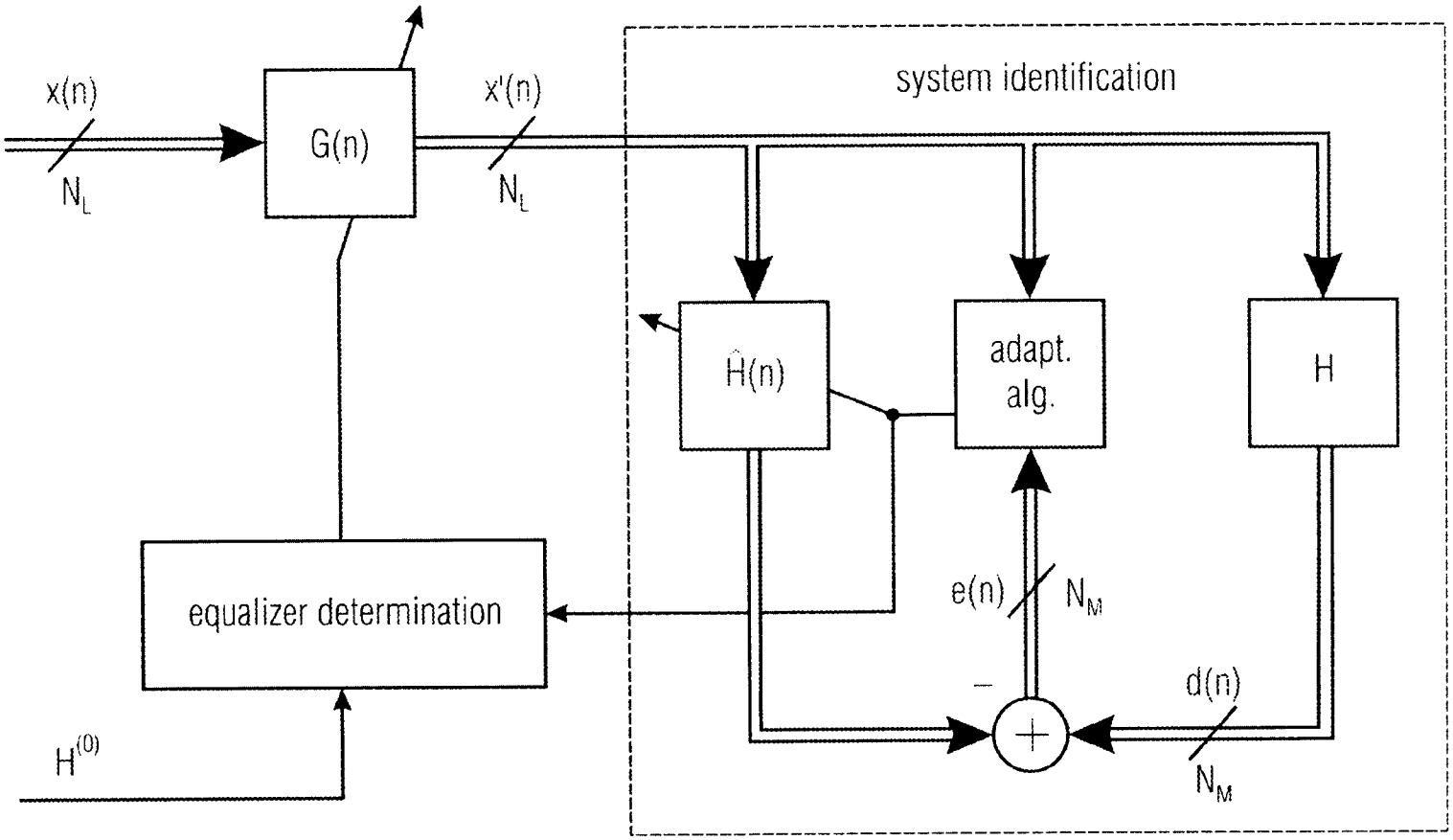
FIG. 6d illustrates an algorithm of a signal model of an LRE system according to an embodiment.

FIG. 6d illustrates an algorithm of a signal model of an LRE system. In FIG. 6d, G(n) represents equalizers, H is a LEMS, $\hat{H}(n)$ represents an identified LEMS, $H^{(0)}$ is a desired impulse response, x(n) depicts an original loudspeaker signal, x'(n): equalized loudspeaker signal and d(n) illustrates the microphone signal.

The loudspeaker signal vector x(n) in FIG. 6d is illustrated comprising a block, indexed by n, of $L_X$ time-domain samples of all $N_L$ loudspeaker signals:

$$x(n)=(x_1(nL_F-L_X+1), \ldots, x_1(nL_F), x_2(nL_F-L_X+1), \ldots, x_2(nL_F), \ldots, x_{N_L}(nL_F)), \tag{101}$$

where $x_l(k)$ is a time-domain sample of the l-th loudspeaker signal at time instant k and $L_F$ is the frame shift. This signal should be optimally reproduced under free-field conditions. To remove the unwanted influence of the enclosing room on the reproduced sound field, we pre-equalize these signals through G(n) such that $$x'(n) = G(n)x(n), \tag{102}$$

$$x'_\lambda(k) = \sum_{l=0}^{N_L-1} \sum_{\kappa=0}^{L_G-1} x_l(k-\kappa) g_{\lambda,l}(\kappa, n)$$

where x'(n) has the same structure as x(n), but comprises only the latest $L_X-L_G+1$ time samples $x'_\lambda(k)$ of the equalized loudspeaker signals.

It should be noted that in formulae (102) to (124) and the part of the description that refers to formulae (102) to (124) index l may be used as an index for a loudspeaker signal rather than an index for a wave-field component. Moreover, it should be noted, that in formulae (102) to (124) and the part of the description that refers to formulae (102) to (124) index m may be used as an index for a microphone signal rather than an index for a wave-field component.

The unequalized loudspeaker signals x(n) are referred to as original loudspeaker signals in the following. The equalizer impulse responses $g_{\lambda,l}(k, n)$, of length $L_G$ from the original loudspeaker signal l to the actual loudspeaker signal λ have to be determined via identifying the LRE system first. To this end, the signals x'(n) are fed to the LEMS and the resulting microphone signals are observed:

$$d(n) = Hx'(n), \tag{103}$$

$$d_m(k) = \sum_{\lambda=0}^{N_L-1} \sum_{\kappa=0}^{L_H-1} x'_\lambda(k-\kappa) h_{m,\lambda}(\kappa)$$

where $h_{m,\lambda}(k)$ describes the room impulse response of length $L_H$ from loudspeaker λ to microphone m and is assumed to be time-invariant in this paper. Here, $L_X-L_G-L_H+2$ time samples $d_m(k)$ of the $N_M$ microphone signals are comprised in d(n). Using the observations of x'(n) and d(n), the system. H is identified by $\tilde{H}(n)$ by means of an adaptive filtering algorithm, e. g., the GFDAF [1] which minimizes the squared error term $$\sum_{i=0}^{n} \lambda_a^{n-i} e^H(i)e(i), \tag{104}$$

with $$e(n) = d(n) - \hat{H}(n)x'(n)$$

with the exponential forgetting factor $\lambda_a$. The coefficients contained in $\tilde{H}(n)$ are used for the equalizer determination as explained in the following section.

In the following, the determination of the equalizer coefficients is explained starting with the FxGFDAF, which was the inspiration for the proposed approach explained afterward.

Figure 6E:
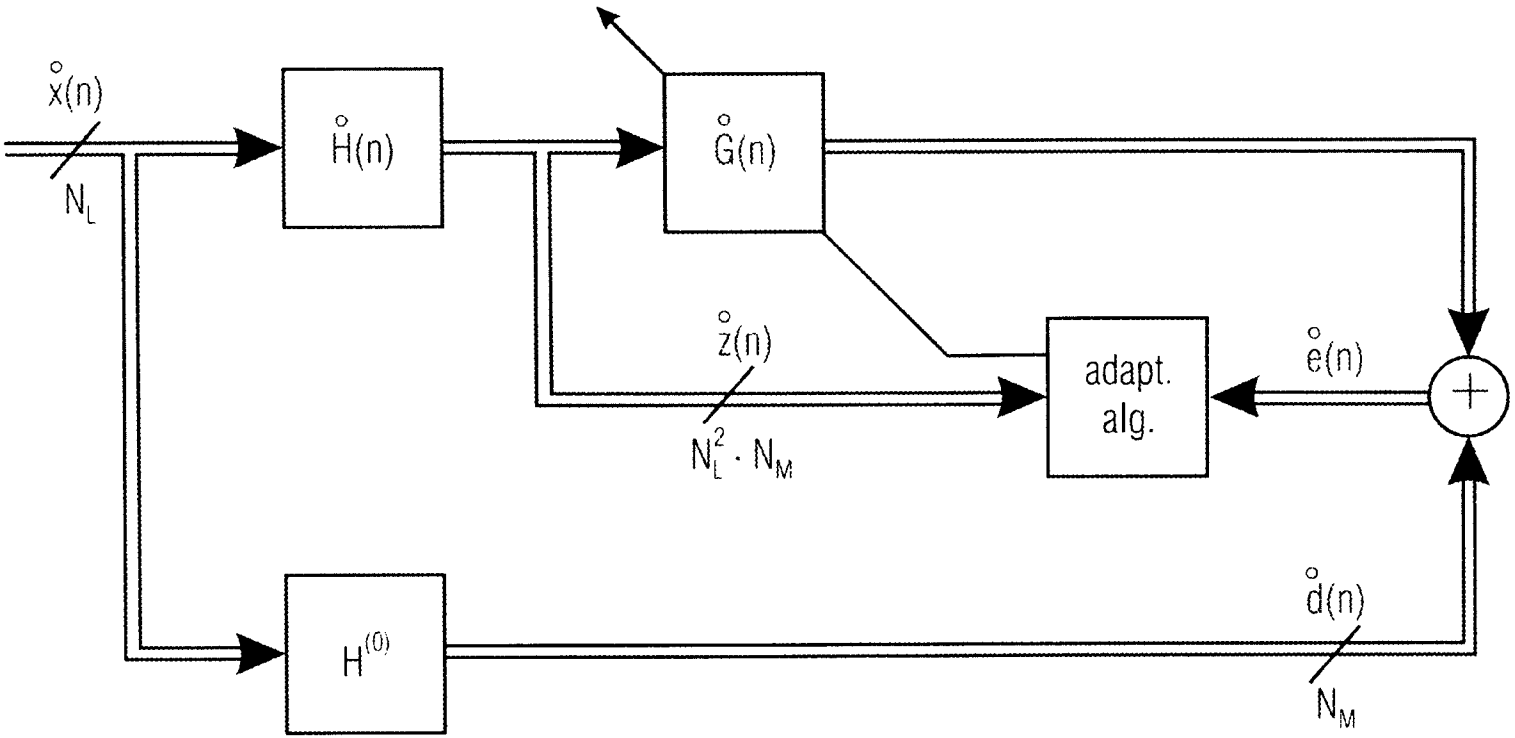
FIG. 6e illustrates a signal model for the Filtered-X GFDAF according to an embodiment.

The signal model for the Filtered-X GFDAF (FxGFDAF) is shown in FIG. 6e. In FIG. 6e, a filtered-X structure is illustrated. $\tilde{H}(n)$ depicts an identified LEMS, $\hat{G}(n)$ shows equalizers, $H^{(0)}$ is a free-field impulse responses, $\hat{x}(n)$ is an excitation signal, $\hat{z}(n)$ depicts a filtered excitation signal, $\hat{d}(n)$ is a desired microphone signal.

The excitation signal $\hat{x}(n)$ of FIG. 6e is structured as x(n) but comprising $2L_G+L_H-1$ samples for each l and may be equal to x(n) or simply a white-noise signal [25]. The desired microphone signals comprise $2L_G$ samples for each m and are obtained according to $$d_l(n)=H^{(0)}\hat{x}_l \tag{105}$$

where $H^{(0)}$ is structured like H containing the desired free-field impulse responses $h_{m,1}^{(0)}$ and $\hat{x}_1(n)$ defined as $\hat{x}(n)$ for a sole excitation of loudspeaker 1 and with all other components set to zero. The equalizers for every original loudspeaker signal are determined separately, assuming that not only the superposition of all signals, but also each individual original signal should be equalized. This sufficient (although not necessary) requirement for a global equalization increases the robustness of the solution against changing correlation properties of the loudspeaker signals and reduces the dimensions of the inverse in formula (114). The equalizer responses $g_{\lambda,1}(k,n)$ are captured by the vectors $g_{1,\lambda}(n)$ and then transformed to the DFT-domain and concatenated $$g_{\lambda,1}=(g_{\lambda,1}(0,n),g_{\lambda,1}(1,n),\ldots,g_{\lambda,1}(L_G-1,n))^T \tag{106}$$

$$\underline{g}_l=((F_{L_G}g_{0,1}(n))^T,\ldots,(F_{L_G}g_{N_L,l}(n))^T)^T \tag{107}$$

using the unitary $L_G\times L_G$ DFT matrix $F_{L_G}$. For time-domain zero padding and windowing operations, the following definitions are provided:

$$\underline{W}_{01}=I_{N_M}\otimes\left(F_{L_G}(0,I_{L_G})F_{2L_G}^H\right) \tag{108}$$

$$\underline{W}_{10}=I_{N_L}\otimes\left(F_{2L_G}(0,I_{L_G},0)^TF_{L_G}^H\right) \tag{109}$$

with the Kronecker product denoted by $\otimes$ and the $N_M\times N_M$ identity matrix $I_{N_M}$. Thus, the error may be defined to be minimized in the DFT domain by $$\hat{e}_l(n)=(I_{N_M}\otimes F_{L_G})\hat{d}_l(n)-\tilde{\underline{W}}_{01}\tilde{Z}_l(n)\tilde{\underline{W}}_{10}\underline{g}_l(n-1) \tag{110}$$

Here, the matrix $\hat{\underline{Z}}_l(n)$ is constructed from the components of $\hat{z}(n)$ $$\tilde{\underline{Z}}_{m,\lambda,l}(n)=\mathrm{Diag}\{F_{2L_G}\tilde{z}_{m,\lambda,l}(n)\} \tag{111}$$

according to the following example for $N_L=3$, $N_M=2$:

$$\mathring{Z}_l(n)=\begin{pmatrix}\mathring{Z}_{0,0,l}(n) & \mathring{Z}_{0,1,l}(n) & \mathring{Z}_{0,2,l}(n)\\ \mathring{Z}_{1,0,l}(n) & \mathring{Z}_{1,1,l}(n) & \mathring{Z}_{1,2,l}(n)\end{pmatrix} \tag{112}$$

The $N_L^2N_M$ components $\hat{z}_{m,\lambda,1}(n)$ of $\hat{\underline{Z}}_l(n)$ are obtained by filtering each component of $\hat{x}(n)$ (indexed by l) with every input-output path $\hat{h}_{m,\lambda}(k,n)$ (indexed by $\lambda$ and m, respectively) of the identified LEMS $\hat{H}(n)$. This implies a considerable computational effort scaling with approximately $O(N_L^2N_M(L_H+2L_G)\log(L_H+2L_G))$ when using fast convolution. This is comparable to the effort for determining $\hat{\underline{s}}_l^{-1}(n)$ $\hat{\underline{z}}_l^H(n)$ in formula (114) which scales approximately with $O(N_L^3L_G)$, when using the recursive realization proposed in [14].

The cost function to be minimized for optimizing $\underline{g}_l(n)$ is then $$\mathring{J}_l(n)=(1-\lambda_b)\sum_{i=0}^{n}\lambda_b^{n-i}\mathring{\underline{e}}_l^H(i)\mathring{\underline{e}}_l(i) \tag{113}$$

With a derivation and an approximation similar to [14] we obtain the update rule $$\underline{g}_l(n)=\underline{g}_l(n-1)+\mu_b(1-\lambda_b)\tilde{\underline{W}}_{10}^H\underline{S}_l^{-1}(n)\tilde{\underline{Z}}_l^H(n)\tilde{\underline{W}}_{01}^H\tilde{\underline{e}}_l(n) \tag{114}$$

with the step size parameter $0\le\mu_b\le1$ and $$\mathring{\underline{S}}_l(n)=\lambda_b\mathring{\underline{S}}_l(n-1)+(1-\lambda_b)\frac{1}{2}\left(\mathring{\underline{Z}}_l^H(n)\mathring{\underline{Z}}_l(n)+\mathring{\underline{R}}_l(n)\right) \tag{115}$$

where we use a Tikhonov regularization with a weighting factor $\delta_b$ by defining $$\mathring{\underline{R}}_l(n)=\frac{\delta_b}{N_L}I_{N_L}\otimes\sum_{\lambda=0}^{N_L-1}\sum_{\mu=0}^{N_M-1}\mathring{Z}_{m,\lambda,l}(n)\mathring{Z}_{m,\lambda,l}^H(n) \tag{116}$$

The matrix $\hat{\underline{S}}(n)$ is a sparse matrix, which reduces the computational effort drastically [14].

In the following, the provided DFT-Domain Approximate Inverse Filtering, and the DFT-domain equalizer determination is presented. Similarly to the FxGFDAF, this algorithm is formulated for each original loudspeaker signal l independently, but in contrast to the FxGFDAF description, we consider the difference of the overall system response $\underline{H}(n)$ $\tilde{\underline{W}}_{10}\underline{g}_l(n)$ to the desired system responses $\underline{h}_l^{(0)}(n)$ directly and obtain $$\tilde{\underline{e}}_l=\underline{h}_l^{(0)}(n)-\underline{H}(n)\tilde{\underline{W}}_{10}\underline{g}_l(n-1) \tag{117}$$

with $$h_{m,l}^{(0)}=(h_{m,l}^{(0)}(0),h_{m,l}^{(0)}(1),\ldots,h_{m,l}^{(0)}(2L_G))^T, \tag{118}$$

$$h_l^{(0)}(n)=((F_{2L_G}h_{0,l}^{(0)}(n))^T,\ldots,(F_{2L_G}h_{N_M-1,t}^{(0)}(n))^T)^T$$

The identified system responses of the LEMS are captured in H(n) according to the following example for $N_L=3$, $N_M=2$:

$$\underline{H}(n)=\begin{pmatrix}\underline{H}_{0,0}(n) & \underline{H}_{0,1}(n) & \underline{H}_{0,2}(n)\\ \underline{H}_{1,0}(n) & \underline{H}_{1,1}(n) & \underline{H}_{1,2}(n)\end{pmatrix} \tag{119}$$

with $$\underline{H}_{m,\lambda}(n)=\mathrm{Diag}\{F_{2L_G}(I_{L_G},0)^T\hat{h}_{m,\lambda}(n)\} \tag{120}$$

where $\hat{h}_{m,\lambda}(n)$ describes the identified impulse response from loudspeaker $\lambda$ to microphone m, zero-padded or truncated to length $L_G$. In contrast to formula (110) we need no windowing by $\underline{W}_{01}$ in formula (117) because of the chosen impulse response lengths. To iteratively minimize the cost function $$\tilde{J}_l(n)=\tilde{\underline{e}}_l^H(n)\tilde{\underline{e}}_l(n) \tag{121}$$

we again follow a derivation similar to [14] and set the gradient to zero. From this the formula $$\underline{\tilde{W}}_{10}^{H}\mathrm{H}^{H}(n)\underline{\tilde{W}}_{10}\underline{g}_{l}(n) = \underline{\tilde{W}}_{10}^{H}\mathrm{H}^{H}(n)\underline{\tilde{W}}_{10}\underline{g}_{l}(n+1) + \underline{\tilde{W}}_{10}^{H}\underline{H}^{H}(n)\underline{\tilde{e}}_{l}(n) \tag{122}$$

is obtained as the system of equations to be solved for obtaining the optimum $\underline{g}_l(n)$. For multichannel systems this means an enormous computational effort. Therefore we propose the following adaptation rule for iteratively determining the optimum equalizer:

$$\underline{g}_l(n) := \underline{g}_l(n-1) + \mu_c \underline{\tilde{W}}_{10}^{H}(\underline{H}^{H}(n)\underline{H}(n) + \underline{R}(n))^{-1}\cdot\underline{H}^{H}(n)\underline{\tilde{e}}_l(n), \tag{123}$$

where we introduced a Tikhonov regularization with a weighting factor $\delta_c$ with $$R(n) = \frac{\delta_b}{N_L} I_{N_L} \otimes \sum_{\lambda=0}^{N_L-1}\sum_{\mu=0}^{N_M-1} H_{m,\lambda}(n)H_{m,\lambda}^{H}(n) \tag{124}$$

Here, $\underline{H}^{H}(n)\underline{H}(n)$ is a sparse matrix like $\underline{\hat{S}}_l(n)$, allowing a computationally inexpensive inversion (see [26]). The update rule of formula (123) is similar to the approximation in [26], but in addition we introduce an iterative optimization of $g_l(n)$ which becomes possible due the consideration of $\underline{e}_l(n)$.

Figure 6F:
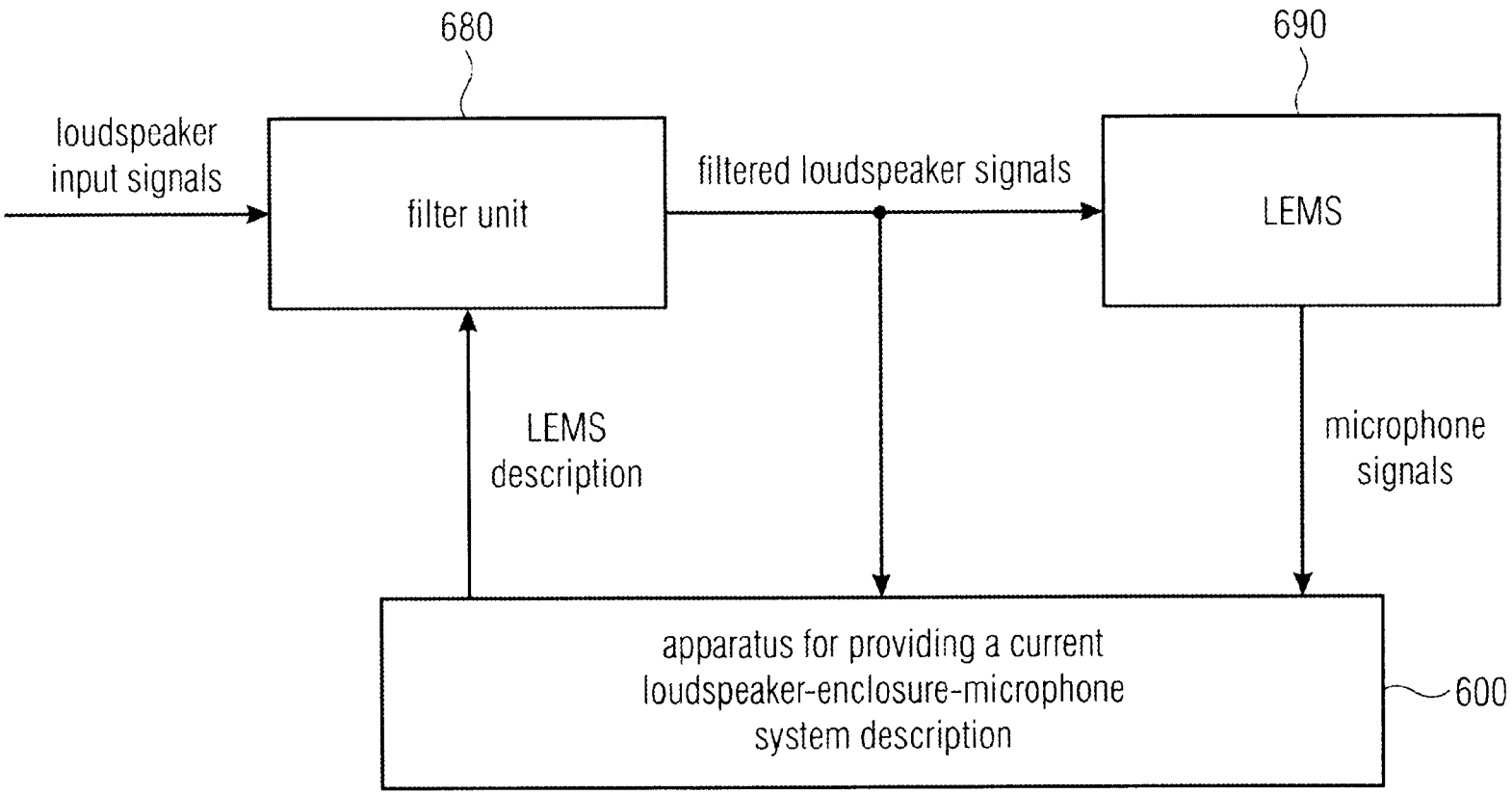
FIG. 6f illustrates a system for generating filtered loudspeaker signals for a plurality of loudspeakers of a loudspeaker-enclosure-microphone system according to an embodiment.

FIG. 6f illustrates a system for generating filtered loudspeaker signals for a plurality of loudspeakers of a loudspeaker-enclosure-microphone system according to an embodiment. In an embodiment, the system of FIG. 6f may be configured for listening room equalization, for example as described with reference to FIG. 6c, FIG. 6d or FIG. 6e. In another embodiment, the system of FIG. 6f may be configured for active noise cancellation, for example as described with reference to FIG. 6b.

The system of the embodiment of FIG. 6f comprises a filter unit 680 and an apparatus 600 for providing a current loudspeaker-enclosure-microphone system description. Moreover, FIG. 6f illustrates a LEMS 690.

The apparatus 600 for providing the current loudspeaker-enclosure-microphone system description is configured to provide a current loudspeaker-enclosure-microphone system description of the loudspeaker-enclosure-microphone system to the filter unit (680).

The filter unit 680 is configured to adjust a loudspeaker signal filter based on the current loudspeaker-enclosure-microphone system description to obtain an adjusted filter. Moreover, the filter unit 680 is arranged to receive a plurality of loudspeaker input signals. Furthermore, the filter unit 680 is configured to filter the plurality of loudspeaker input signals by applying the adjusted filter on the loudspeaker input signals to obtain the filtered loudspeaker signals.

Figure 6G:
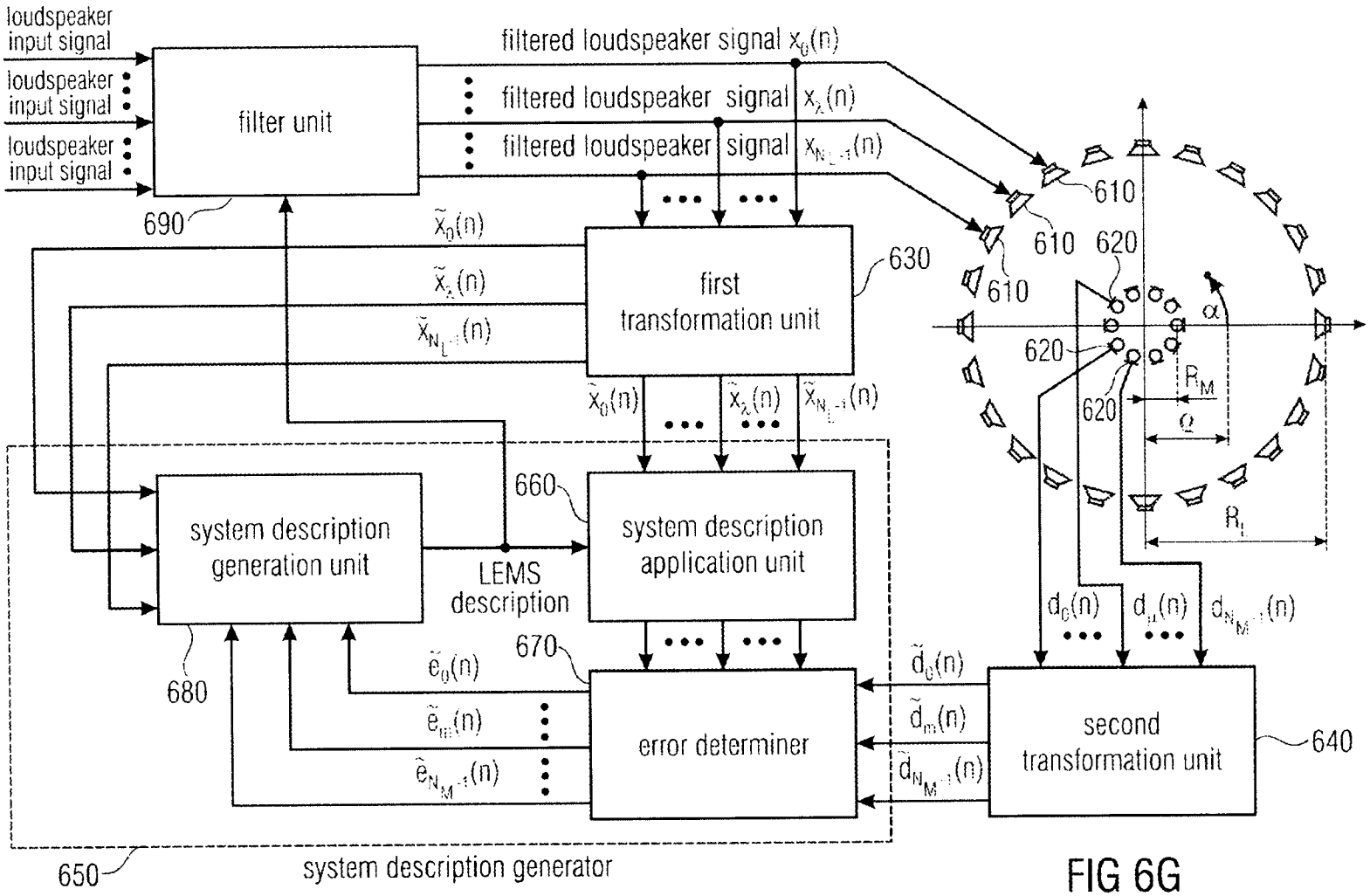
FIG. 6g illustrates a system for generating filtered loudspeaker signals for a plurality of loudspeakers of a loudspeaker-enclosure-microphone system according to an embodiment showing more details.

FIG. 6g illustrates a system for generating filtered loudspeaker signals for a plurality of loudspeakers of a loudspeaker-enclosure-microphone system according to an embodiment showing more details. The system of FIG. 6g may be employed for listening room equalization. In FIG. 6g, the first transformation unit 630, the second transformation unit 640, the system description generator 650, its system description application unit 660, its error determiner 670 and its system description generation unit 680 correspond to the first transformation unit 130, the second transformation unit 140, the system description generator 150, the system description application unit 160, the error determiner 170 and the system description generation unit 180 of FIG. 1b, respectively.

Furthermore, the system of FIG. 6g comprises a filter unit 690. As already described with reference to FIG. 6f, the filter unit 690 is configured to adjust a loudspeaker signal filter based on the current loudspeaker-enclosure-microphone system description to obtain an adjusted filter. Moreover, the filter unit 690 is arranged to receive a plurality of loudspeaker input signals. Furthermore, the filter unit 690 is configured to filter the plurality of loudspeaker input signals by applying the adjusted filter on the loudspeaker input signals to obtain the filtered loudspeaker signals.

In an embodiment, a method for determining at least two filter configurations of a loudspeaker signal filter for at least two different loudspeaker-enclosure-microphone system states is provided.

For example, the loudspeakers and the microphones of the loudspeaker-enclosure-microphone system may be arranged in a concert hall. When the concert hall is crowded with people and all seats of the concert hall, the loudspeaker-enclosure-microphone system may be in a first state, e.g. the impulse responses regarding the output loudspeaker signals and the recorded microphone signals may have first values. When only half of the seats of the concert hall are covered by people, the loudspeaker-enclosure-microphone system may be in a second state, e.g. the impulse responses regarding the output loudspeaker signals and the recorded microphone signals may have second values.

According to the method, a first loudspeaker-enclosure-microphone system description of the loudspeaker-enclosure-microphone system is determined, when the loudspeaker-enclosure-microphone system has a first state (e.g. the impulse responses of the loudspeaker signals and the recorded microphone signals have first values, e.g. the concert hall is crowded). Then a first filter configuration of a loudspeaker signal filter is determined based on the first loudspeaker-enclosure-microphone system description, for example, such that the loudspeaker signal filter realizes acoustic echo cancellation. The first filter configuration is then stored in a memory.

Then, a second loudspeaker-enclosure-microphone system description of the loudspeaker-enclosure-microphone system is determined, when the loudspeaker-enclosure-microphone system has a second state, e.g. the impulse responses of the loudspeaker signals and the recorded microphone signals have second values, e.g. only half of the concert hall are occupied. Then, a second filter configuration of the loudspeaker signal filter is determined based on the second loudspeaker-enclosure-microphone system description, for example, such that the loudspeaker signal filter realizes acoustic echo cancellation. The second filter configuration is then stored in the memory.

The loudspeaker signal itself filter may be arranged to filter a plurality of loudspeaker input signals to obtain a plurality of filtered loudspeaker signals for steering a plurality of loudspeakers of a loudspeaker-enclosure-microphone system.

For example, under test conditions, a first filter configuration may be determined when the loudspeaker-enclosure-microphone system has a first state, and a second filter configuration may be determined when the loudspeaker-enclosure-microphone system has a second state. Later, under real conditions, either the first or the second filter configuration may be used for acoustic echo cancellation depending on whether, e.g. the concert hall is crowded or whether only half of the seats are occupied.

The performance and the properties of the algorithms according to the above-described embodiments for providing a loudspeaker-enclosure-microphone system description will now be evaluated. To this end, the results from an experimental evaluation of the proposed approach are presented. At first, the results for an experiment under optimal conditions are considered.

For the simulation of the LEMS, we used the measured impulse responses for the LEMS described above with $N_L$=48 loudspeakers and $N_M$=10 microphones. Using a sampling frequency of $f_s$=11025 Hz, the impulse responses were truncated to 3764 samples. This is slightly shorter than the modeled length of the impulse responses which is $L_H$=4096, so effects resulting from an unmodeled impulse response tail are absent. The loudspeaker signals were determined by using WFS [1] so that plane waves could be synthesized within the loudspeaker array. The incidence angles of the plane waves were chosen to be $\varphi_1 1=0$ and $\varphi_2=\pi/2$, where the plane waves were alternatingly or simultaneously synthesized to simulate a change of $G_{RS}$ over time. The length of all FIR filters used for the WFS was $L_G$=135. To reduce the computational complexity, we used the approximations of both algorithms described by (53) and (58), respectively such that the respective matrices can be inverted frequency bin-wise [14]. Furthermore, we used a frame shift $L_F$ of 512 samples and a forgetting factor of $\lambda_a$ of 0.95, while both algorithms were regularized with $\beta$=0.05. For the modified GFDAF the parameters $\beta_0$=2, $\beta_1$=0.01, and $\beta_2$=0.1 were chosen. To avoid divergence at the beginning of the adaptation we used $\underline{S}(0)=\hat{\sigma}I$ with the identity matrix I of appropriate dimensions and $\hat{\sigma}$ being an approximation of the steady state mean value of the diagonal entries of $\underline{S}(n)$ after the first four seconds of the experiment. This can be considered as a nearly optimum initialization value. For the comparison the ERLE (17) and the normalized misalignment (22) for the different approaches are shown.

Now, model validation is provided. The results shown are used to validate the proposed model and the improved system description performance of the proposed algorithm.

Mutually uncorrelated white noise signals were used as source signals for the synthesized plane waves. The timeline for this experiment can be described as follows: For the time span $0 \leq t < 5$ s only one plane wave with an incidence angle of $\varphi_1$ was synthesized. For the time span $5 \leq t < 10$ s another plane wave with an incidence angle of $\varphi_1$ was synthesized. For $10 \leq t < 15$ s both plane waves were simultaneously synthesized.

Figure 7:
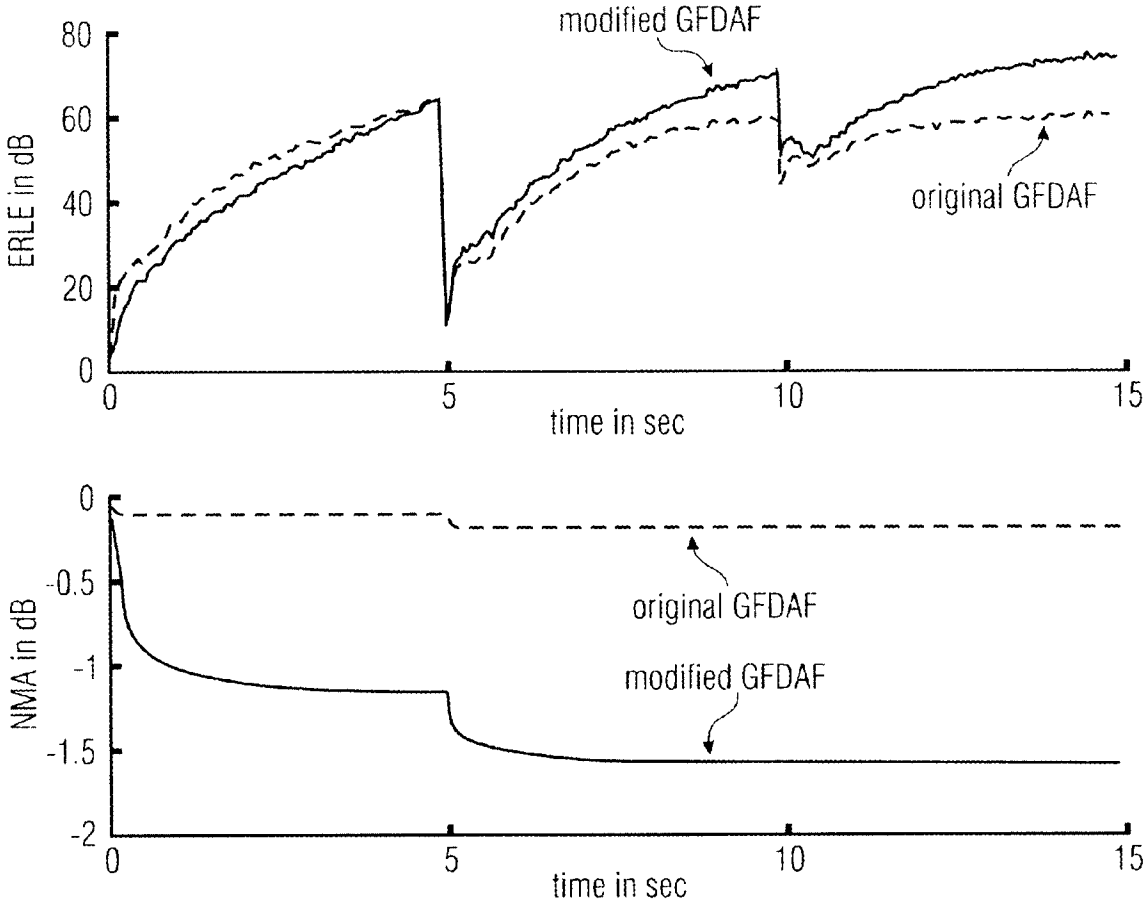
FIG. 7 illustrates ERLE and the normalized misalignment (NMA) for a first WDAF AEC according to the state of the art and for a second WDAF AEC according to an embodiment.

The results for this experiment are shown in FIG. 7. It can be seen that there is a breakdown in ERLE for both considered approaches at t=5 s when the first plane wave is no longer synthesized and the second one is synthesized instead. A smaller breakdown can be seen at t=10 s when the first plane wave is synthesized again in addition to the second one. The breakdown at t=5 s can be expected for any approach because new properties of the LEMS are revealed when the second plane wave is synthesized. Those properties are then to be identified by the respective adaptation algorithm. The second breakdown can, at least in theory, be avoided because solutions for both plane waves were already found separately. Hence, this breakdown only depends on how much of the solution for the first plane wave an algorithm "forgets" to obtain a solution for the second plane wave.

As cost for the reduced misalignment shown in the lower plot, the modified GFDAF shows a slightly slower increasing ERLE during the first five seconds. However, whenever the source activity changes, there is a somewhat lower breakdown in ERLE for the modified GFDAF. Additionally, the modified GFDAF shows a larger steady state ERLE, compared to the original GFDAF. This is due to the fact that both algorithms were approximated and only an exact implementation of (53) would be guaranteed to reach the global optimum e.g. maximize ERLE. So both algorithms converge to a local minimum and the lower misalignment of the modified GFDAF is an advantage, as it denotes a lower distance to the perfect solution, which is a global optimum.

In the lower part of FIG. 7, it can be clearly seen that the modified GFDAF outperforms the original GFDAF regarding the normalized misalignment. The relatively low absolute performance of both algorithms is not surprising as the identification of the LEMS is a severely underdetermined problem in the given scenario, according to (21). Evaluating (23) we obtain only −0.2 dB as a lower bound for the normalized misalignment in this scenario. From this we can see that the original GFDAF can exploit almost all information provided by the observed signals when achieving −0.16 dB. The reduction of the misalignment by additional 1.4 dB by the modified version can be accounted to the information provided by the wave-domain assumptions on $\tilde{H}(n)$. As the misalignment is relatively high for both approaches, no correlation with the results for the ERLE can be seen.

For the comparison with a conventional AEC we repeated the same experiment using $T_1$=I and $T_2$=I with the respective dimensions and the original GFDAF. As the obtained results almost perfectly coincide with the results for wave-domain AEC with the original GFDAF, they are not shown in FIG. 7. This behaviour is remarkable as the conclusion may be drawn that a transformation of the used signal representations to the wave-domain alone does not automatically lead to a different convergence behaviour. Nevertheless, using WDAF is still advantageous regardless of the used adaptation algorithm, as the computational effort for adaptation can be concluded by an approximative LEMS model.

In the following, results for two experiments with suboptimal conditions are presented to show the gain in robustness of the concepts provided by embodiments.

Up to now the experiments were conducted under almost optimal conditions, e.g., in absence of noise or interferences in the microphone signal and using a nearly optimum initialization value for $\underline{S}(0)$. In this section we present results for documenting the robustness of the proposed approach with two different experiments under suboptimal conditions.

At first, the experiment of the previous subsection was repeated, starting the adaptation with an suboptimal initialization value $\underline{S}(0)=\hat{\sigma}I/10000$. Such an suboptimal choice is more realistic because the chosen initialization value for $\underline{S}(n)$ used in the previous section depends on knowledge which is not available in practice. The results for this experiment are depicted in FIG. 8.

The ERLE curves show for both approaches a slower convergence in the first 5 seconds compared to the previous experiment, although the modified GFDAF is less affected in this regard. After the transition, the difference between both algorithms becomes even more evident. While the modified GFDAF only shows a short breakdown in ERLE, the original GFDAF takes significantly longer to recover. Moreover, the original GFDAF shows a significantly lower steady state ERLE than the modified version during the entire experiment. Considering the achieved misalignment for both approaches, this behavior can be explained: The original GFDAF suffers from a bad initial convergence and cannot recover throughout the whole experiment, while the modified GFDAF is only slightly affected.

In the second experiment short impulses (50 ms) of noise were introduced into the microphone signal, leading to two adaptation steps in the presence of an interfering signal. This experiment was chosen because in practice an undetected double-talk situation may also lead to an adaptation in the presence of an interfering signal and double-talk detectors are usually not perfectly reliable. Although the signals used here differ significantly from the signals present in practice, the effect on the convergence behaviour of the adaptation algorithms can be expected to be similar. The interfering signal used was generated by convolving a single white noise signal with impulse responses measured for the considered microphone array in a completely different setup. This was done to model an interferer recorded by the microphone array rather than an interference taking effect on the microphone signals directly. The noise power was chosen to be 6 dB relative to the unaltered microphone signal. The results for this experiment can be seen in FIG. 9. The timeline for this experiment differs from the previous ones. We introduced the noise interferences at t=5 s and t=15 s. From the beginning to t=25 s the first plane wave ($\varphi_1=0$) was synthesized and from t=25 s until the end the second plane wave (($\varphi_2=\pi/2$) was synthesized. It can be seen that both algorithms are equally affected by the impulsive noise. However, in contrast to the original GFDAF, the modified GFDAF shows a significantly larger ERLE when having recovered from the disturbances. The difference in behavior is even more evident, when there is a transition between both waves. There, the original GFDAF shows a pronounced breakdown in ERLE while the modified GFDAF can recover quickly. Again, the normalized misalignment may be used to explain the observed behaviour. It can be clearly seen that the original GFDAF shows a growing misalignment with every disturbance while the modified GFDAF is not sensitive to this interference.

Adaptation algorithms based on robust statistics (see [24]) could also be used to increase robustness in such a scenario. However, as they only use the information provided by the observed signals, they can be expected to principally show the same behaviour as the original GFDAF, although the misalignment introduced by the interferences should be smaller.

Improved concepts for AEC in the wave domain maintaining robustness in the presence of the nonuniqueness problem have been presented.

It has been shown that the nonuniqueness problem is typically highly relevant for AEC in combination with massive multichannel reproduction systems. Considering a concentric setup of a circular loudspeaker array and a circular microphone array, it was shown that the spatial DFT can be used as transform to the wave domain. Using a model based on these transforms, distinct properties of the LEMS model were investigated. A modified version of the GFDAF was presented to exploit these properties in order to significantly reduce the consequences of the nonuniqueness problem. Results from an experimental evaluation support the claim of an increased robustness and showed an improved system description performance.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] A. Berkhout, D. De Vries, and P. Vogel, "Acoustic control by wave field synthesis", J. Acoust. Soc. Am. 93, 2764-2778 (1993).

[2] J. Daniel, "Spatial sound encoding including near field effect: Introducing distance coding filters and a variable, new ambisonic format", in 23rd International Conference of the Audio Eng. Soc. (2003).

[3] M. Sondhi and D. Berkley, "Silencing echoes on the telephone network", Proceedings of the IEEE 68, 948-963 (1980).

[4] B. Kingsbury and N. Morgan, "Recognizing reverberant speech with RASTA-PLP", in IEEE International Conference on Acoustics, Speech, and Signal Processing (ICASSP), volume 2, 1259-1262 (Munich, Germany) (1997).

[5] M. Sondhi, D. Morgan, and J. Hall, "Stereophonic acoustic echo cancellation—an overview of the fundamental problem", IEEE Signal Process. Lett. 2, 148-151 (1995).

[6] J. Benesty, D. Morgan, and M. Sondhi, "A better understanding and an improved solution to the specific problems of stereophonic acoustic echo cancellation", IEEE Trans. Speech Audio Process. 6, 156-165 (1998).

[7] A. Gilloire and V. Turbin, "Using auditory properties to improve the behaviour of stereophonic acoustic echo cancellers", in IEEE International Conference on Acoustics, Speech, and Signal Processing (ICASSP), volume 6, 3681-3684 (Seattle, Wash.) (1998).

[8] T. Gänsler and P. Eneroth, "Influence of audio coding on stereophonic acoustic echo cancellation", in IEEE International Conference on Acoustics, Speech, and Signal Processing (ICASSP), volume 6, 3649-3652 (Seattle, Wash.) (1998).

[9] D. Morgan, J. Hall, and J. Benesty, "Investigation of several types of nonlinearities for use in stereo acoustic echo cancellation", IEEE Trans. Speech Audio Process. 9, 686-696 (2001).

[10] M. Ali, "Stereophonic acoustic echo cancellation system using time-varying all-pass filtering for signal decorrelation", in IEEE International Conference on Acoustics, Speech, and Signal Processing (ICASSP), volume 6, 3689-3692 (Seattle, Wash.) (1998).

[11] J. Herre, H. Buchner, and W. Kellermann, "Acoustic echo cancellation for surround sound using perceptually motivated convergence enhancement", in IEEE International Conference on Acoustics, Speech, and Signal Processing (ICASSP), volume 1, 1-17-1-20 (Honolulu, Hi.) (2007).

[12] S. Shimauchi and S. Makino, "Stereo echo cancellation algorithm using imaginary input-output relationships", in IEEE International Conference on Acoustics, Speech, and Signal Processing (ICASSP), volume 2, 941-944 (Atlanta, Ga.) (1996).

[13] H. Buchner, S. Spors, and W. Kellermann, "Wave-domain adaptive filtering: acoustic echo cancellation for full duplex systems based on wave-field synthesis", in IEEE International Conference on Acoustics, Speech, and Signal Processing (ICASSP), volume 4, IV-117-IV-120 (Montreal, Canada) (2004).

[14] H. Buchner, J. Benesty, and W. Kellermann, "Multichannel frequency-domain adaptive algorithms with application to acoustic echo cancellation", in Adaptive Signal Processing: Application to Real-World Problems, edited by J. Benesty and Y. Huang (Springer, Berlin) (2003).

[15] H. Buchner and S. Spors, "A general derivation of wave-domain adaptive filtering and application to acoustic echo cancellation", in Asilomar Conference on Signals, Systems, and Computers, 816-823 (2008).

[16] Y. Huang, J. Benesty, and J. Chen, Acoustic MIMO Signal Processing (Springer, Berlin) (2006).

[17] C. Breining, P. Dreiseitel, E. Hinsler, A. Mader, B. Nitsch, H. Puder, T. Schertler, G. Schmidt, and J. Tilp, "Acoustic echo control: An application of very-high-order adaptive filters", IEEE Signal Process. Mag. 16, 42-69 (1999).

[18] S. Spors, H. Buchner, R. Rabenstein, and W. Herbordt, "Active listening room compensation for massive multichannel sound reproduction systems using wave-domain adaptive filtering", J. Acoust. Soc. Am. 122, 354-369 (2007).

[19] H. Teutsch, Modal Array Signal Processing: Principles and Applications of Acoustic Wavefield Decomposition (Springer, Berlin) (2007).

[20] P. Morse and H. Feshbach, Methods of Theoretical Physics (McGraw-Hill, New York) (1953).

[21] C. Balanis, Antenna Theory (Wiley, New York) (1997).

[22] M. Abramovitz and I. Stegun, Handbook of Mathematical Functions (Dover, New York) (1972).

[23] M. Schneider and W. Kellermann, "A wave-domain model for acoustic MIMO systems with reduced complexity", in Third Joint Workshop on Hands-free Speech Communication and Microphone Arrays (HSCMA) (Edinburgh, UK) (2011).

[24] H. Buchner, J. Benesty, T. Gänsler, and W. Kellermann, "Robust Extended Multidelay Filter and Double-Talk Detector for Acoustic Echo Cancellation", IEEE Trans. Audio, Speech, Language Process. 14, 1633-1644 (2006).

[25] S. Goetze, M. Kallinger, A. Mertins, and K. D. Kammeyer, "Multichannel listening-room compensation using a decoupled filtered-X LMS algorithm," in Proc. Asilomar Conference on Signals, Systems, and Computers, October 2008, pp. 811-815.

[26] O. Kirkeby, P. A. Nelson, H. Hamada, and F. Orduna-Bustamante, "Fast deconvolution of multichannel systems using regularization," Speech and Audio Processing, IEEE Transactions on, vol. 6, no. 2, pp. 189-194, March 1998.

[27] Spors, S.; Buchner, H.; Rabenstein, R.: A novel approach to active listening room compensation for wave field synthesis using wave-domain adaptive filtering. In: Proc. Int. Conf. Acoust., Speech, Signal Process. (ICASSP) Bd. 4, 2004.—ISSN 1520-6149, S. IV-29-IV-32.

[28] Spors, S.; Buchner, H.: Efficient massive multichannel active noise control using wave-domain adaptive filtering. In: Communications, Control and Signal Processing, 2008. ISCCSP 2008. 3rd International Symposium on IEEE, 2008, S. 1480-1485.

The invention claimed is:

1. An apparatus for providing a current loudspeaker-enclosure-microphone system description of a loudspeaker-enclosure-microphone system, wherein the loudspeaker-enclosure-microphone system comprises a plurality of loudspeakers and a plurality of microphones, and wherein the apparatus comprises:

a first transformation unit for generating a plurality of wave-domain loudspeaker audio signals, wherein the first transformation unit is configured to generate each of the wave-domain loudspeaker audio signals based on a plurality of time-domain loudspeaker audio signals and based on one or more of a plurality of loudspeaker-signal-transformation values[, said one or more of the plurality of loudspeaker-signal-transformation values being assigned to said generated wave-domain loudspeaker audio signal], a second transformation unit for generating a plurality of wave-domain microphone audio signals, wherein the second transformation unit is configured to generate each of the wave-domain microphone audio signals based on a plurality of time-domain microphone audio signals and based on one or more of a plurality of microphone-signal-transformation values[, said one or more of the plurality of microphone-signal-transformation values being assigned to said generated wave-domain loudspeaker audio signal], and a system description generator for generating the current loudspeaker-enclosure-microphone system description based *on* the plurality of wave-domain loudspeaker audio signals, and based on the plurality of wave-domain microphone audio signals, wherein the system description generator is configured to generate the *current* loudspeaker-enclosure-microphone system description based on a plurality of coupling values, wherein each of the plurality of coupling values is assigned to one of a plurality of wave-domain pairs, each of the plurality of wave-domain pairs being a pair of one of the plurality of loudspeaker-signal-transformation values and one of the plurality of microphone-signal-transformation values, wherein the system description generator is configured to determine each coupling value assigned to a wave-domain pair of the plurality of wave-domain pairs by determining for said wave-domain pair at least one relation indicator indicating a relation between *said* one of the [one or more] loudspeaker-signal-transformation values of said wave-domain pair and *said* one of the microphone-signal-transformation values of said wave-domain pair to generate the *current* loudspeaker-enclosure-microphone system description.

2. The apparatus according to claim 1, wherein the system description generator comprises a system description application unit, an error determiner and a system description generation unit, wherein the system description application unit is configured to generate a plurality of wave-domain microphone estimation signals based on the wave-domain loudspeaker audio signals and based on a previous loudspeaker-enclosure-microphone system description of the loudspeaker-enclosure-microphone system, wherein the error determiner is configured to determine a plurality of wave-domain error signals based on the plurality of wave-domain microphone audio signals and based on the plurality of wave-domain microphone estimation signals, wherein the system description generation unit is configured to generate the current loudspeaker-enclosure-microphone system description based on the wave-domain loudspeaker audio signals, based on the plurality of error signals and based on the plurality of coupling values.

3. The apparatus according to claim 2, wherein the first transformation unit is configured to generate each of the wave-domain loudspeaker audio signals based on the plurality of time-domain loudspeaker audio signals and based on the one or more of the plurality of loudspeaker-signal-transformation values, wherein the plurality of loudspeaker-signal-transformation values is a plurality of loudspeaker-signal-transformation mode orders, wherein the second transformation unit is configured to generate each of the wave-domain microphone audio signals based on the plurality of time-domain microphone audio signals and based on the one or more of the plurality of microphone-signal-transformation values, wherein the plurality of microphone-signal-transformation values is a plurality of microphone-signal-transformation mode orders, and wherein the system description generation unit is configured to generate the loudspeaker-enclosure-microphone system description based on a first coupling value of the plurality of coupling values, when a first relation value indicating a first difference between a first loudspeaker-signal-transformation mode order of the plurality of loudspeaker-signal-*transformation* mode orders and a first microphone-signal-transformation mode order of the plurality of microphone-signal mode orders comprises a first difference value, wherein the system description generation unit is configured to assign the first coupling value to a first wave-domain pair of the plurality of wave-domain pairs, when the first relation value comprises the first difference value, wherein the first wave-domain pair is a pair of the first loudspeaker-signal-*transformation* mode order and the first microphone-signal-*transformation* mode order, and wherein the first relation value is one of the plurality of relation indicators, and wherein the system description generation unit is configured to generate the loudspeaker-enclosure-microphone system description based on a second coupling value of the plurality of coupling values, when a second relation value indicating a second difference between a second loudspeaker-signal-transformation mode order of the plurality of loudspeaker-signal-transformation mode orders and a second microphone-signal-transformation mode order of the plurality of microphone-signal-transformation mode orders comprises a second difference value, being different from the first difference value, wherein the system description generation unit is configured to assign the second coupling value to the second wave-domain pair of the plurality of wave-domain pairs, when the second relation value comprises the second difference value, wherein the second wave-domain pair is a pair of the second loudspeaker-signal-*transformation* mode order of the plurality of loudspeaker-signal-*transformation* mode orders and the second microphone-signal-*transformation* mode order of the plurality of microphone-signal-*transformation* mode orders, wherein the second wave-domain pair is different from the first wave-domain pair, and wherein the second relation value is one of the plurality of relation indicators.

4. The apparatus according to claim 3, wherein the system description generation unit is configured to generate the current loudspeaker-enclosure-microphone system description based on the first coupling value of the first wave-domain pair, when the first loudspeaker-signal-transformation mode order is equal to the first microphone-signal-transformation mode order, and wherein the system description generation unit is configured to generate the current loudspeaker-enclosure-microphone system description based on the second coupling value of the second wave-domain pair, when the second loudspeaker-signal-transformation mode order is not equal to the second microphone-signal-transformation mode order.

5. The apparatus according to claim 3, wherein the system description generation unit is configured to generate the current loudspeaker-enclosure-microphone system description based on the first coupling value of the first wave-domain pair, when the first loudspeaker-signal-transformation mode order is equal to the first microphone-signal-transformation mode order, wherein the system description generation unit is configured to generate the current loudspeaker-enclosure-microphone system description based on the second coupling value of the second wave-domain pair, when the second loudspeaker-signal-transformation mode order is not equal to the second microphone-signal-transformation mode order, and when the absolute difference between the second loudspeaker-signal-transformation mode order and the second microphone-signal-transformation mode order is [smaller than or] equal to a predefined threshold value, and wherein the system description generation unit is configured to generate the current loudspeaker-enclosure-microphone system description based on a third coupling value of a third wave-domain pair being a pair of a third loudspeaker-signal-*transformation* mode order of the plurality of loudspeaker-signal-*transformation* mode orders and a third microphone-signal-*transformation* mode order of the plurality of microphone-signal-*transformation* mode orders, when the third loudspeaker-signal-transformation mode order is not equal to the third microphone-signal-transformation mode order, and when an absolute difference between the third loudspeaker-signal-transformation mode order and the third microphone-signal-transformation mode order is greater than the predefined threshold value.

6. The apparatus according to claim 5, wherein the first coupling value is a first number $\beta_1$, wherein the second coupling value is a second value $\beta_2$, wherein [$0<\beta_1<\beta_2\leq 1$] $0\leq\beta_1<\beta 2\leq 1$, and wherein the third coupling value is 1.0.

7. The apparatus according to claim 3, wherein the system description generation unit is configured to generate a current loudspeaker-enclosure-microphone system description matrix based on a previous loudspeaker-enclosure-microphone system description matrix, wherein the previous loudspeaker-enclosure-microphone system description matrix represents the previous loudspeaker-enclosure-microphone system description, and wherein the current loudspeaker-enclosure-microphone system description matrix represents the current loudspeaker-enclosure-microphone system description.

8. The apparatus according to claim 7, wherein the system description generation unit is configured to generate the current loudspeaker-enclosure-microphone system description matrix based on the previous loudspeaker-enclosure-microphone system description matrix, wherein the current loudspeaker-enclosure-microphone system description matrix comprises a plurality of current matrix components [$\tilde{\underline{h}}_m(n)$] $\tilde{\underline{h}}_m(n)$, wherein the previous loudspeaker-enclosure-microphone system description matrix comprises a plurality of previous matrix components [$\tilde{\underline{h}}_m(n)$] $\tilde{\underline{h}}_m(n-1)$, and wherein the system description generation unit is configured to determine the current matrix components [$\tilde{\underline{h}}_m(n)$] $\tilde{\underline{h}}_m(n)$ according to the formula $$[\tilde{\underline{h}}_m(n)=\tilde{\underline{h}}_m(n-1)+(1-\lambda_a)(\underline{S}(n)+\underline{C}_m(n))^{-1}\cdot(\underline{W}_{10}{}^H\underline{X}^H(n)\underline{W}_{01}{}^H\tilde{\underline{e}}_m(n)-\underline{C}_m(n)\tilde{\underline{h}}_m(n-1))]\ \tilde{\underline{h}}_m(n)=\tilde{\underline{h}}_m(n-1)+(1-\lambda_a)(\underline{S}(n)+\underline{C}_m(n))^{-1}\cdot(\underline{W}_{10}{}^H\underline{X}^H(n)\underline{W}_{01}{}^H\tilde{\underline{e}}_m(n)-\underline{C}_m(n)\tilde{\underline{h}}_m(n-1)),$$

wherein [$\underline{C}_m(n)$] $\underline{C}_m(n)$ is a coupling matrix, comprising a plurality of coupling matrix coefficients, wherein [$\underline{X}^H(n)$] $\underline{X}^H(n)$ is the conjugate transpose matrix of loudspeaker signal matrix [$\underline{X}(n)$] $\underline{X}(n)$, wherein [$\underline{X}(n)$] $\underline{X}(n)$ is a loudspeaker signal matrix depending on the plurality of wave-domain loudspeaker audio signals, wherein [$\underline{W}_{01}$] $\underline{W}_{01}$is a first windowing matrix for time-domain windowing, wherein [$\underline{W}_{10}$] $\underline{W}_{10}$is a second windowing matrix for time-domain windowing, and wherein the system description generation unit is configured to determine the matrix [$\underline{S}(n)$] $\underline{S}(n)$ according to the formula $$\underline{S}(n)=\lambda_a\underline{S}(n-1)+(1-\lambda_a)\underline{W}_{10}{}^H\underline{X}^H(n)\underline{W}_{01}{}^H\underline{W}_{01}\underline{X}(n)\underline{W}_{10},$$

wherein $\lambda_a$ is a number, wherein $0\leq\lambda_a<1$.

9. The apparatus according to claim 8, wherein the weighting function $\omega_c$ is defined by the formula $$w_c(n)=\frac{\sum_{m=0}^{N_M-1} J_m(n-1)}{\max\left\{\sum_{m=0}^{N_M-1}\tilde{\underline{h}}_m^H(n-1)\tilde{\underline{h}}(n-1),\ 1\right\}},$$

wherein $$J_m(n)=(1-\lambda_a)\sum_{i=0}^{n}\lambda_a^{n-i}\tilde{\underline{e}}_m^H(i)\tilde{\underline{e}}_m(i),$$

wherein $\tilde{\underline{e}}_m{}^H(i)$ represents the conjugate transpose of $\tilde{\underline{e}}_m{}^H(i)$, and wherein $\tilde{\underline{e}}_m{}^H(i)$ indicates one of the plurality of error signals.

10. The apparatus according to claim 8, wherein the coupling matrix $\underline{C}_m(n)$ is defined by the formula $$\underline{C}_m(n)=\beta_0\omega_c(n)\mathrm{Diag}\{c_0(n),c_1(n),\ldots,c_{N_LL_H-1}(n)\},$$

wherein $\mathrm{Diag}\{c_0(n),\ c_1(n),\ \ldots\ c_{N_LL_H-1}(n)\}$ indicates a diagonal matrix, wherein $c_0(n)$ is the first coupling value or the second coupling value indicated by the coupling information or another coupling value, being different from the first and the second coupling value, and being indicated by the coupling information, wherein $c_1(n)$ is the first coupling value or the second coupling value indicated by the coupling information or another coupling value, being different from the first and the second coupling value, and being indicated by the coupling information, wherein $c_{N_L L_H-1}(n)$ is the first coupling value or the second coupling value indicated by the coupling information or another coupling value, being different from the first and the second coupling value, and being indicated by the coupling information, wherein $\beta_0$ is a scale parameter, wherein $0 \leq \beta_0$, wherein $\omega_c(n)$ is a weighting function returning a number which is greater than 0, and wherein n is a time index.

11. The apparatus according to claim 10, wherein the system description generation unit is configured to determine the coupling matrix $\underline{C}_m(n)$ defined by the formula $$\underline{C}_m(n)=\beta_0\omega_c(n)\mathrm{Diag}\{c_0(n),c_1(n), \ldots ,c_{N_L L_H-1}(n)\},$$

wherein $c_0(n)$, $c_1(n)$, . . . , $c_{N_L L_H-1}(n)$ are defined by:

$$c_q(n) = \begin{cases} \beta_1 & \text{when } \Delta m(q) = 0, \\ \beta_2 & \text{when } \Delta m(q) = 1, \\ 1 & \text{elsewhere,} \end{cases} \quad (60)$$

wherein $0 \leq \beta_1 < \beta_2 \leq 1$, wherein $\beta_1$ is the first coupling value, wherein $\beta_2$ is the second coupling value, wherein q indicates the first wave-domain pair, the second wave-domain pair or a different wave-domain pair of one of the plurality of loudspeaker-signal-transformation mode orders and one of the plurality of microphone-signal-transformation mode orders, and wherein $\Delta m(q)$ is a relation indicator of said wave-domain pair q, wherein $\Delta m(q)$ indicates a difference between the loudspeaker-signal-transformation mode order of said wave-domain pair q and the microphone-signal-transformation mode order of said wave-domain pair q.

12. The apparatus according to claim 11, wherein $\underline{\Delta m}(q)$ is defined by the formula:

$$[\Delta m(q)=\min(|\lfloor q/L_H\rfloor-m|,|\lfloor q/L_H\rfloor-m-N_L)] \; \Delta m(q) = min(|\lfloor q/L_H\rfloor-m|,|\lfloor q/L_H\rfloor-m-N_L),$$

wherein m indicates one of the plurality of microphone-signal-transformation mode orders, wherein $N_L$ indicates the number of loudspeakers of the *loudspeaker* enclosure microphone system, and wherein $L_H$ indicates a length of the discrete-time impulse response of the loudspeaker-enclosure-microphone system from one of the plurality of loudspeakers of the loudspeaker-enclosure-microphone system to one of the microphones of the loudspeaker-enclosure-microphone system.

13. The apparatus according to claim 3, wherein the first transformation unit is configured to generate the plurality of wave-domain loudspeaker audio signals by employing the formula $$\sum_{\lambda=0}^{N_L-1} \hat{P}_\lambda^{(x)}(j\omega)e^{-jl'\lambda\frac{2\pi}{N_L}}$$

wherein $N_L$ indicates the number of loudspeakers of the loudspeaker-enclosure-microphone system, wherein l' indicates one of the plurality of loudspeaker-signal-transformation mode orders, and wherein $\hat{P}_\lambda^{(x)}(j\omega)$ indicates a spectrum of a sound field emitted by loudspeaker λ.

14. The apparatus according to claim 3, wherein the second transformation unit is configured to generate the plurality of wave-domain microphone audio signals by employing the formula $$\sum_{\mu=0}^{N_M-1} \hat{P}_\mu^{(x)}(j\omega)e^{-jm'\mu\frac{2\pi}{M}}$$

wherein $N_M$ indicates the number of microphones of the loudspeaker-enclosure-microphone system, wherein m' indicates one of the plurality of microphone-signal-transformation mode orders, and wherein $\hat{P}_\mu^{(d)}(j\omega)$ indicates a spectrum of a sound pressure measured by microphone μ.

15. A system, comprising:

a plurality of loudspeakers of a loudspeaker-enclosure-microphone system, a plurality of microphones of the loudspeaker-enclosure-microphone system, and an apparatus according to claim 1, wherein the plurality of loudspeakers are arranged to receive a plurality of loudspeaker input signals, wherein the apparatus according to claim 1 is arranged to receive the plurality of loudspeaker input signals, wherein the plurality of microphones are configured to record a plurality of microphone input signals, wherein the apparatus according to claim 1 is arranged to receive the plurality of microphone input signals, and wherein the apparatus according to claim 1 is configured to adjust a loudspeaker-enclosure-microphone system description based on the received loudspeaker input signals and based on the received microphone input signals.

16. A system for generating filtered loudspeaker signals for a plurality of loudspeakers of a loudspeaker-enclosure-microphone system, wherein the system comprises:

a filter unit, and an apparatus according to claim 1, wherein the apparatus according to claim 1 is configured to provide a current loudspeaker-enclosure-microphone system description of the loudspeaker-enclosure-microphone system to the filter unit, wherein the filter unit is configured to adjust a loudspeaker signal filter based on the current loudspeaker-enclosure-microphone system description to achieve an adjusted filter, wherein the filter unit is arranged to receive a plurality of loudspeaker input signals, and wherein the filter unit is configured to filter the plurality of loudspeaker input signals by applying the adjusted filter on the loudspeaker input signals to acquire the filtered loudspeaker signals.

17. A method for providing a current loudspeaker-enclosure-microphone system description of a loudspeaker-enclosure-microphone system, wherein the loudspeaker-enclosure-microphone system comprises a plurality of loudspeakers and a plurality of microphones, and wherein the method comprises:

generating a plurality of wave-domain loudspeaker audio signals by generating each of the wave-domain loudspeaker audio signals based on a plurality of time-domain loudspeaker audio signals and based on one or more of a plurality of loudspeaker-signal-transformation values[, said one or more of the plurality of loudspeaker-signal-transformation values being assigned to said generated wave-domain loudspeaker audio signal], generating a plurality of wave-domain microphone audio signals by generating each of the wave-domain microphone audio signals based on a plurality of time-domain microphone audio signals and based on one or more of a plurality of microphone-signal-transformation values[, said one or more of the plurality of microphone-signal-transformation values being assigned to said generated wave-domain loudspeaker audio signal], and generating the current loudspeaker-enclosure-microphone system description based *on* the plurality of wave-domain loudspeaker audio signals, and based on the plurality of wave-domain microphone audio signals, wherein the *current* loudspeaker-enclosure-microphone system description is generated based on a plurality of coupling values, wherein each of the plurality of coupling values is assigned to one of a plurality of wave-domain pairs, each of the plurality of wave-domain pairs being a pair of one of the plurality of loudspeaker-signal-transformation values and one of the plurality of microphone-signal-transformation values, wherein each coupling value assigned to a wave-domain pair of the plurality of wave-domain pairs is determined by determining for said wave-domain pair at least one relation indicator indicating a relation between *said* one of the [one or more] loudspeaker-signal-transformation values of said wave-domain pair and *said* one of the microphone-signal-transformation values of said wave-domain pair to generate the *current* loudspeaker-enclosure-microphone system description.

18. A method for determining at least two filter configurations of a loudspeaker signal filter for at least two different loudspeaker-enclosure-microphone system states, wherein the loudspeaker signal filter is arranged to filter a plurality of loudspeaker input signals to acquire a plurality of filtered loudspeaker signals for steering a plurality of loudspeakers of a loudspeaker-enclosure-microphone system, wherein the method comprises:

determining a first loudspeaker-enclosure-microphone system description of a loudspeaker-enclosure-microphone system according to the method of claim 17, when the loudspeaker-enclosure-microphone system comprises a first state, determining a first filter configuration of the loudspeaker signal filter based on the first loudspeaker-enclosure-microphone system description, storing the first filter configuration in a memory, determining a second loudspeaker-enclosure-microphone system description of the loudspeaker-enclosure-microphone system according to the method of claim 17, when the loudspeaker-enclosure-microphone system [second] *comprises* a second state, determining a second filter configuration of the loudspeaker signal filter based on the second loudspeaker-enclosure-microphone system description, and storing the second filter configuration in the memory.

19. A non-transitory computer-readable medium comprising a computer program for implementing when being executed by a computer or processor a method for providing a current loudspeaker-enclosure-microphone system description of a loudspeaker-enclosure-microphone system, wherein the loudspeaker-enclosure-microphone system comprises a plurality of loudspeakers and a plurality of microphones, and wherein the method comprises:

generating a plurality of wave-domain loudspeaker audio signals by generating each of the wave-domain loudspeaker audio signals based on a plurality of time-domain loudspeaker audio signals and based on one or more of a plurality of loudspeaker-signal-transformation values,

[said one or more of the plurality of loudspeaker-signal-transformation values being assigned to said generated wave-domain loudspeaker audio signal, and]

*generating a plurality of wave-domain microphone audio signals by generating each of the wave-domain microphone audio signals based on a plurality of time-domain microphone audio signals and based on one or more of a plurality of microphone-signal-transformation values, and* generating the current loudspeaker-enclosure-microphone system description based on the plurality of wave-domain loudspeaker audio signals, and based on the plurality of wave-domain microphone audio signals, wherein the *current* loudspeaker-enclosure-microphone system description is generated based on a plurality of coupling values, wherein each of the plurality of coupling values is assigned to one of a plurality of wave-domain pairs, each of the plurality of wave-domain pairs being a pair of one of the plurality of loudspeaker-signal-transformation values and one of the plurality of microphone-signal-transformation values, wherein each coupling value assigned to a wave-domain pair of the plurality of wave-domain pairs is determined by determining for said wave-domain pair at least one relation indicator indicating a relation between *said* one of the [one or more] loudspeaker-signal-transformation values of said wave-domain pair and *said* one of the microphone-signal-transformation values of said wave-domain pair to generate the loudspeaker-enclosure-microphone system description.

20. A non-transitory computer-readable medium comprising a computer program for implementing when being executed by a computer or processor a method for determining at least two filter configurations of a loudspeaker signal filter for at least two different loudspeaker-enclosure-microphone system states, wherein the loudspeaker signal filter is arranged to filter a plurality of loudspeaker input signals to acquire a plurality of filtered loudspeaker signals for steering a plurality of loudspeakers of a loudspeaker-enclosure-microphone system, wherein the method comprises:

determining a first loudspeaker-enclosure-microphone system description of a loudspeaker-enclosure-microphone system according to the method of claim 17, when the loudspeaker-enclosure-microphone system comprises a first state, determining a first filter configuration of the loudspeaker signal filter based on the first loudspeaker-enclosure-microphone system description, storing the first filter configuration in a memory, determining a second loudspeaker-enclosure-microphone system description of the loudspeaker-enclosure-microphone system according to the method of claim 17, when the loudspeaker-enclosure-microphone system [second] *comprises* a second state, determining a second filter configuration of the loudspeaker signal filter based on the second loudspeaker-enclosure-microphone system description, and storing the second filter configuration in the memory.

* * * * *